United States Patent [19]
Vaidyanathan et al.

[11] Patent Number: 5,579,409
[45] Date of Patent: Nov. 26, 1996

[54] METHODS FOR DETERMINING THE EXTERIOR POINTS OF AN OBJECT IN A BACKGROUND

[75] Inventors: Akhileswar G. Vaidyanathan; Hooshmand M. Kalayeh, both of Hockessin, Del.

[73] Assignee: E. I. Du Pont de Nemours and Company, Wilmington, Del.

[21] Appl. No.: 159,641

[22] Filed: Nov. 30, 1993

Related U.S. Application Data

[63] Continuation-in-part of Ser. No. 999,702, Dec. 31, 1992, Pat. No. 5,371,810, which is a continuation-in-part of Ser. No. 767,339, Sep. 27, 1991, Pat. No. 5,481,620.

[51] Int. Cl.⁶ .................................................. G06K 9/46
[52] U.S. Cl. .......................................... 382/203; 382/199
[58] Field of Search .................................. 382/48, 21, 22, 382/26, 25, 197, 199, 201, 203, 276, 282, 204; 395/141

[56] References Cited

U.S. PATENT DOCUMENTS

| | | | |
|---|---|---|---|
| 3,736,432 | 5/1973 | Sweet | 250/222 PC |
| 3,811,036 | 5/1974 | Perry | 235/92 PC |
| 3,873,974 | 3/1975 | Bouton et al. | 382/48 |
| 3,999,047 | 12/1976 | Green | 382/51 |
| 4,097,845 | 6/1978 | Bacus | 340/146.3 |
| 4,183,013 | 1/1980 | Agrawala | 377/10 |
| 4,334,274 | 6/1982 | Agui et al. | 382/22 |
| 4,453,266 | 6/1984 | Bacus | 382/6 |
| 4,493,165 | 1/1985 | Beall et al. | 382/25 |
| 4,574,393 | 3/1986 | Blackwell et al. | 382/17 |
| 4,618,989 | 10/1986 | Tsukune et al. | 382/25 |
| 4,637,053 | 1/1987 | Schalkowsky | 382/6 |
| 4,747,153 | 5/1988 | Kouno et al. | 382/25 |
| 4,763,119 | 8/1988 | Matsubara et al. | 340/747 |
| 4,809,349 | 2/1989 | Herby et al. | 382/50 |
| 4,956,704 | 9/1990 | Yamada | 358/513 |

(List continued on next page.)

FOREIGN PATENT DOCUMENTS

| | | |
|---|---|---|
| 0308956 | 3/1989 | European Pat. Off. ........ G06F 15/72 |
| 0313789 | 5/1989 | European Pat. Off. . |
| 2602074 | 7/1986 | France . |
| 62-60069 | 12/1987 | Japan . |
| 2136996 | 9/1984 | United Kingdom ............ G06F 15/20 |
| 2178628 | 2/1987 | United Kingdom . |

OTHER PUBLICATIONS

Grant G. and A. F. Reid, "An Efficient Algorithm for Boundary Tracing and Feature Extraction", *Computer Graphics and Image Processing*, 17, 225–237, (1981).

Marr, D, "Early Processing of Visual Information", *Image Understanding 1984*, Ullman, S. et al Eds., Ablex Publishing Company, 1984.

Shannon, C. E., "A Mathematical Theory of Communication", *Bell Syst. Tech. J.*, 27, 379–423, Jul. 1948.

Pun, T., "Entropic Thresholding, A New Approach", *Comp. Graphics and Image Proc.*, 16, 210–239, 1981.

(List continued on next page.)

*Primary Examiner*—Yon J. Couso

[57] ABSTRACT

Accessing the exterior points of an object is used in the area of object identification when it is important to use the information in the local exterior environment of an object in order to extract a feature which may be useful for object recognition. Examples of this type of feature which are important for recognizing and classifying objects occur in the area if bacterial detection. Adaptive classification is a way of making the analysis independent of variations in imaging conditions, such as lighting, positioning, electronic amplification, etc. Two general methods can be used to access the local exterior environment of an object, knowing the perimeter points of the object. In the first method, the shape of an annular exterior region around the object of interest can be made to follow the shape of the object itself. In the second method, an known exterior shape, such as a circle, is used to characterize the exterior contour region, approximating the shape of the object.

22 Claims, 46 Drawing Sheets

U.S. PATENT DOCUMENTS

| | | | |
|---|---|---|---|
| 4,958,217 | 9/1990 | Kimura et al. | 358/75 |
| 4,959,869 | 9/1990 | Hongo | 382/51 |
| 4,998,211 | 3/1991 | Hamada et al. | 340/747 |
| 5,014,223 | 5/1991 | Tanimori | 364/521 |
| 5,029,106 | 7/1991 | Kai et al. | 364/518 |
| 5,038,385 | 8/1991 | Kasahara | 382/22 |
| 5,046,118 | 9/1991 | Ajewole et al. | 382/51 |
| 5,073,960 | 12/1991 | Nakai et al. | 382/22 |
| 5,083,313 | 1/1992 | Reinsch | 382/8 |
| 5,202,935 | 4/1993 | Kanamori et al. | 382/17 |
| 5,206,918 | 4/1993 | Levene | 382/17 |
| 5,216,498 | 6/1993 | Matsunawa et al. | 382/17 |
| 5,222,154 | 6/1993 | Graham et al. | 382/17 |
| 5,371,810 | 12/1994 | Vaidyanathan | 382/48 |

OTHER PUBLICATIONS

Kapur, J. N. et al,. "A New Method for Gray–Level Picture Thresholding Using the Entropy of the Histogram", *Comp. Graphics and Image Proc.*, 29, 273–285, 1985.

Pal, S. K. et al, "Entropic Thresholding", *Signal Processing*, 16, 97–108, 1989.

Haralick, R. M. et al, "Textural Features for Image Classification", *IEEE Transactions on Systems, Man & Cybernetics*, SMC–3(6), 610–621, 1973.

Wang, S. et al, "Automatic Multithreshold Selection", *Computer Vision Graphics and Image Processing*, 25, 46–67, 1984.

Fernandes, M. A. et al, "Detection and Quantification of Microorganisms in a Heterogeneous Foodstuff by Image Analysis", *Cabios*, 4(2), 291–295, 1988.

Johannsen, G. et al, "A Threshold Selection Method Using Information Measures", Proc. 6th Int. Conf. on Pattern Recognition, 1982.

Sahoo, P. K. et al, "A Survey of Thresholding Techniques", *Computer Vision, Graphics and Image Processing*, 41, 233–260, 1988.

Abutaleb, A. S., "Automatic Thresholding of Grey–Level Pictures Using Two Dimensional Entropy", *Computer Vision, Graphics and Image Processing*, 47, 22–32, 1989.

Lee, S. U. et al, "A Comparative Performance Study of Several Global Thresholding Techniques for Segmentation", *Computer Vision, Graphics, and Image Processing*, 52, 171–190, 1990.

Wong, A. K. C., et al, "A Gray Level Threshold Selection Method Based on Maximum Entropy Principle", *IEEE Transactions on System, Man and Cybernetics*, 19, 866–871, 1989.

Mehmet Celenk, "A Color Clustering Technique for Image Segmentation", *Computer Vision, Graphics and Image Processing*, 52, 145–170, 1990.

Miyamoto, S. et al, "Enhancement of Laser Radar Images By A Class of Piecewise Linear Transformations of Gray Levels Based on Entropy Criteria", *1985 IEEE Workshop on Languages for Automation*, Jun. 29, 1985, Palma De Mallorca, Spain, 265–269.

Pal, et al. "Entropic Thresholding", *Signal Processing*, 16, 97–108, 1989.

Chang, L. W. et al, "A Fast Algorithm for the Restoration of Images Based on Chain Codes Description and Its Applications", *Computer Vision, Graphics and Image Processing*, 50, 296–307, 1990.

Landeweerd, G. H. et al, "Pattern Recognition of Nucleated Cells from the Peripheral Blood", *Pattern Recognition*, 16(2), 131–140, 1983.

Freeman, H., "Computer Processing of Line–Drawing Images", *Computing Surveys*, 6(1), 57–97, Mar. 1974.

Wang et al, "Automatic Multithreshold Selection", *Computer Vision, Graphics and Image Processing*, 25, 46–67, 1984.

Barba et al, "Automatic Region Construction by Edge Detection and Contour Following in Image Segmentation", *Proceedings of the Eight Inter. Conf. on Pattern Recog.*, Paris, France, IEEE Press, 681–683, Oct. 27–31, 1986.

Iwata et al, "A Discrimination Method of the Interior and Exterior of a Closed Curve", *System, Computers, Controls*, 11(6), 11–20, Nov.–Dec. 1980.

Ali et al, "A New Algorithm for Extracting the Interior of Bounded Regions Based on Chain Coding", *Computer Vision, Graphics and Image Processing*, 43(2), 256–264, Aug. 1988.

| POINT | ROW (X) | COLUMN (Y) | NEXT$_i$ | PREV.$_i$ |
|---|---|---|---|---|
| 1 | 1 | 2 | 3 | 1 |
| 2 | 2 | 3 | 3 | 3 |
| 3 | 3 | 4 | 1 | 3 |
| 4 | 2 | 5 | 1 | 1 |
| 5 | 1 | 6 | 3 | 1 |
| 6 | 2 | 7 | 4 | 3 |
| 7 | 3 | 7 | 5 | 4 |
| 8 | 4 | 6 | 5 | 5 |
| 9 | 5 | 5 | 6 | 5 |
| 10 | 5 | 4 | 7 | 6 |
| 11 | 4 | 3 | 7 | 7 |
| 12 | 3 | 2 | 7 | 7 |
| 13 | 2 | 1 | 1 | 7 |

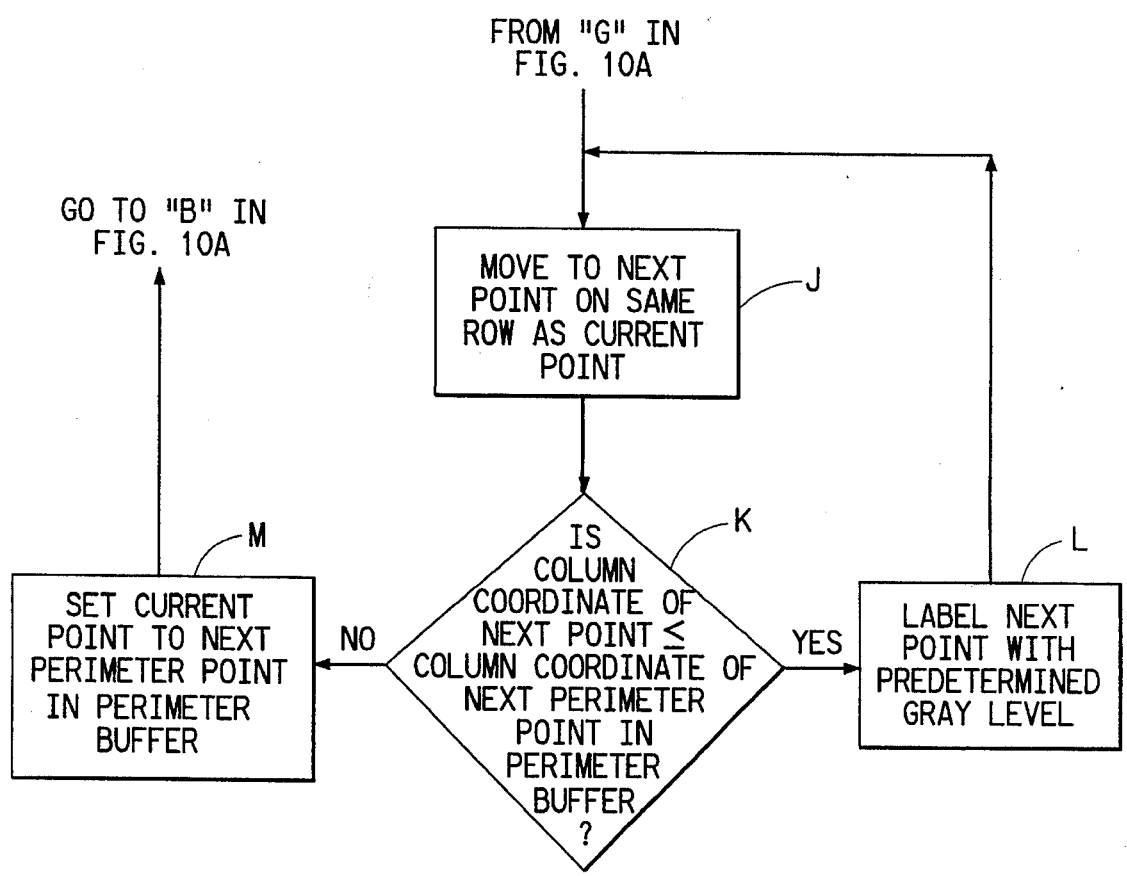

FIG.9

LUT CLOCKWISE

DIRECTION CODE

| | NEXT | 0 | 1 | 2 | 3 | 4 | 5 | 6 | 7 |
|---|---|---|---|---|---|---|---|---|---|
| PREVIOUS 0 | | F | F | F | NF | NF | F | F | F |
| 1 | | F | F | F | NF | NF | NF | F | F |
| 2 | | F | F | F | NF | NF | NF | NF | F |
| 3 | | F | F | F | NF | NF | NF | NF | NF |
| 4 | | NF | F | F | NF | NF | NF | NF | NF |
| 5 | | NF | NF | F | NF | NF | NF | NF | NF |
| 6 | | F | F | F | F | F | F | F | F |
| 7 | | F | F | F | NF | F | F | F | F |

DIRECTION CODE

FIG.10

LUT COUNTERCLOCKWISE

DIRECTION CODE

| PREVIOUS \ NEXT | 0 | 1 | 2 | 3 | 4 | 5 | 6 | 7 |
|---|---|---|---|---|---|---|---|---|
| 0 | NF | NF | F | F | F | NF | NF | NF |
| 1 | NF | NF | F | F | F | F | NF | NF |
| 2 | NF | NF | F | F | F | F | NF | NF |
| 3 | NF | NF | F | F | F | F | F | NF |
| 4 | NF | NF | F | F | F | F | F | F |
| 5 | NF | NF | F | F | F | F | F | F |
| 6 | F | F | F | F | F | F | F | F |
| 7 | NF | NF | F | F | NF | NF | NF | NF |

DIRECTION CODE

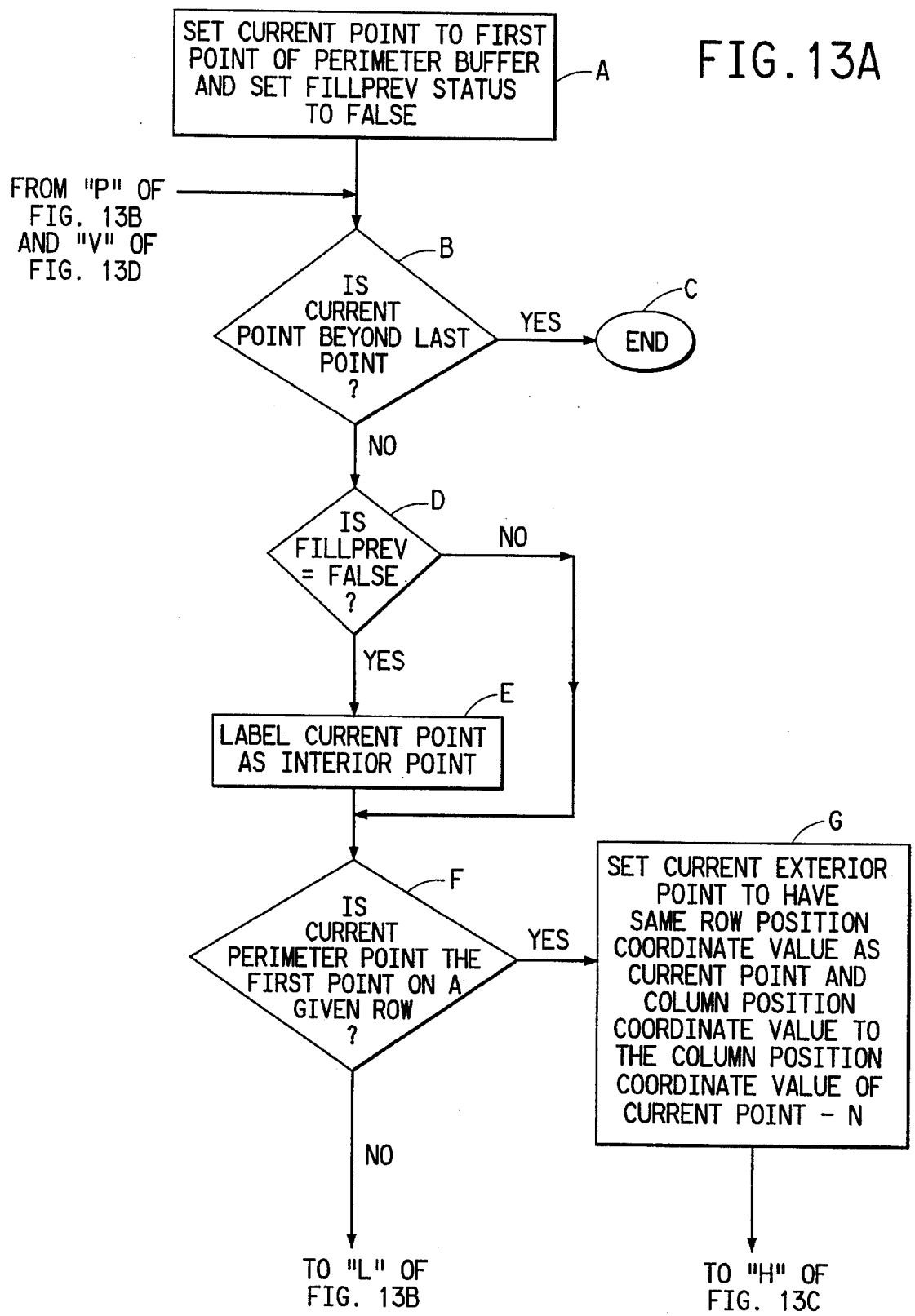

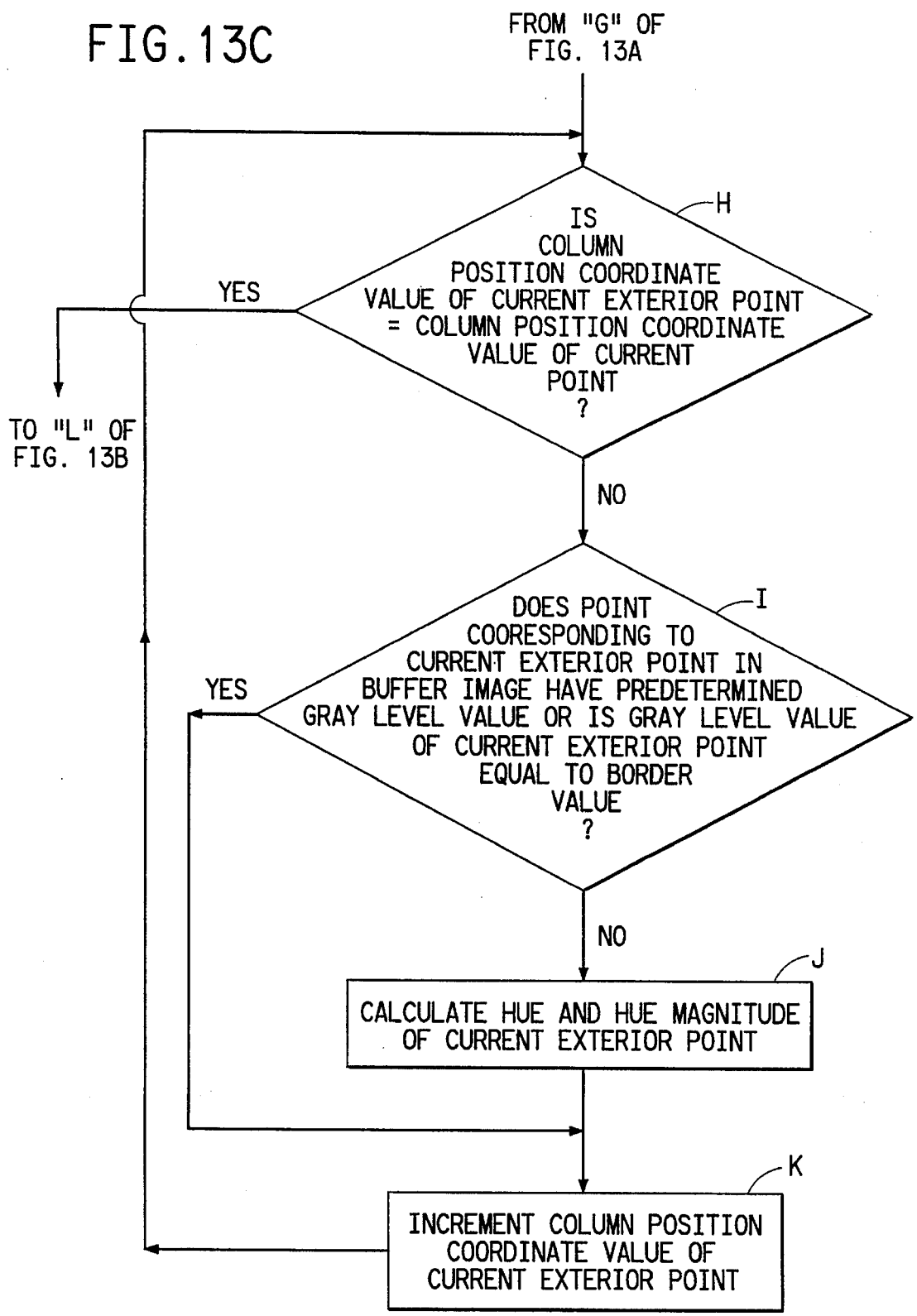

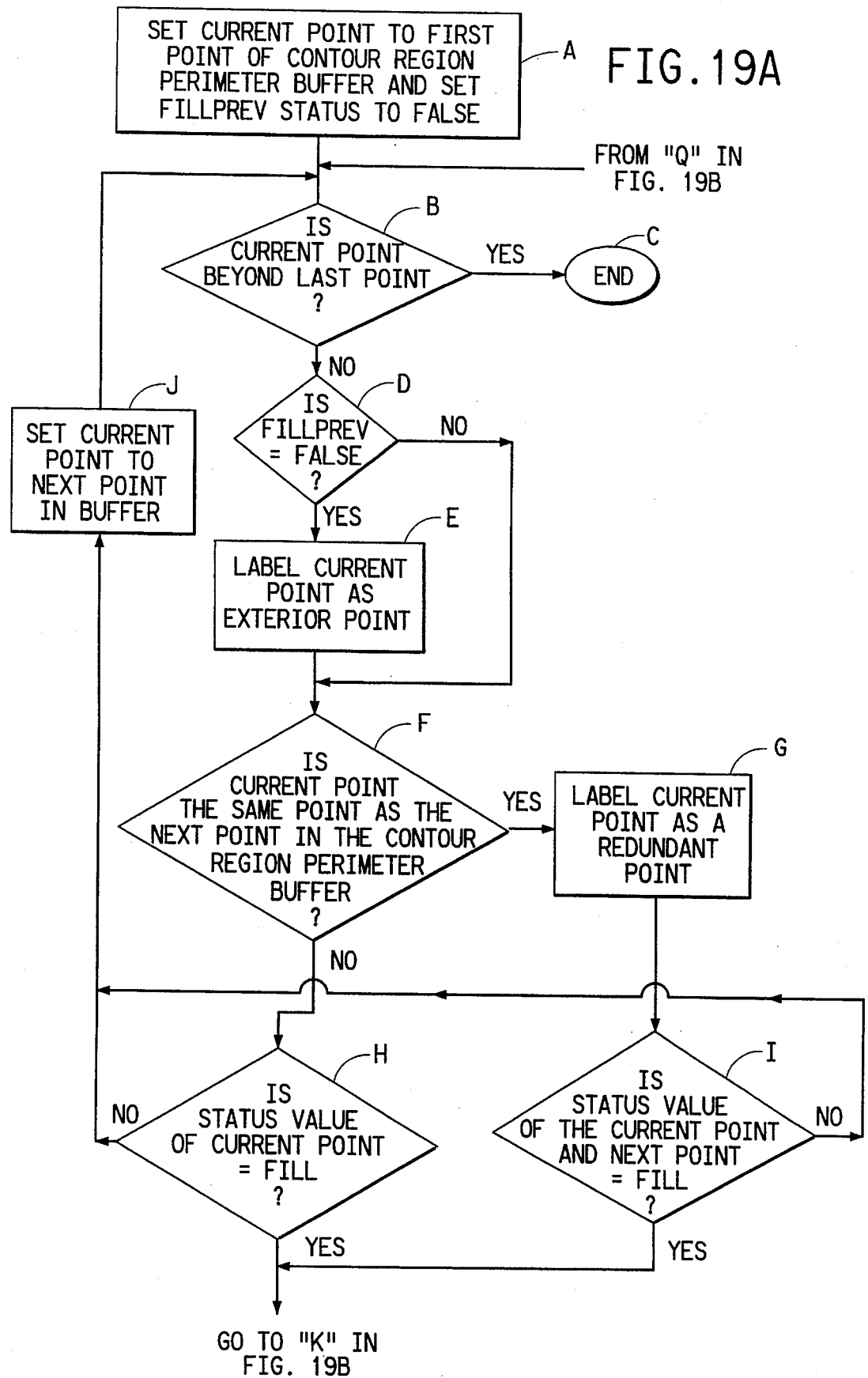

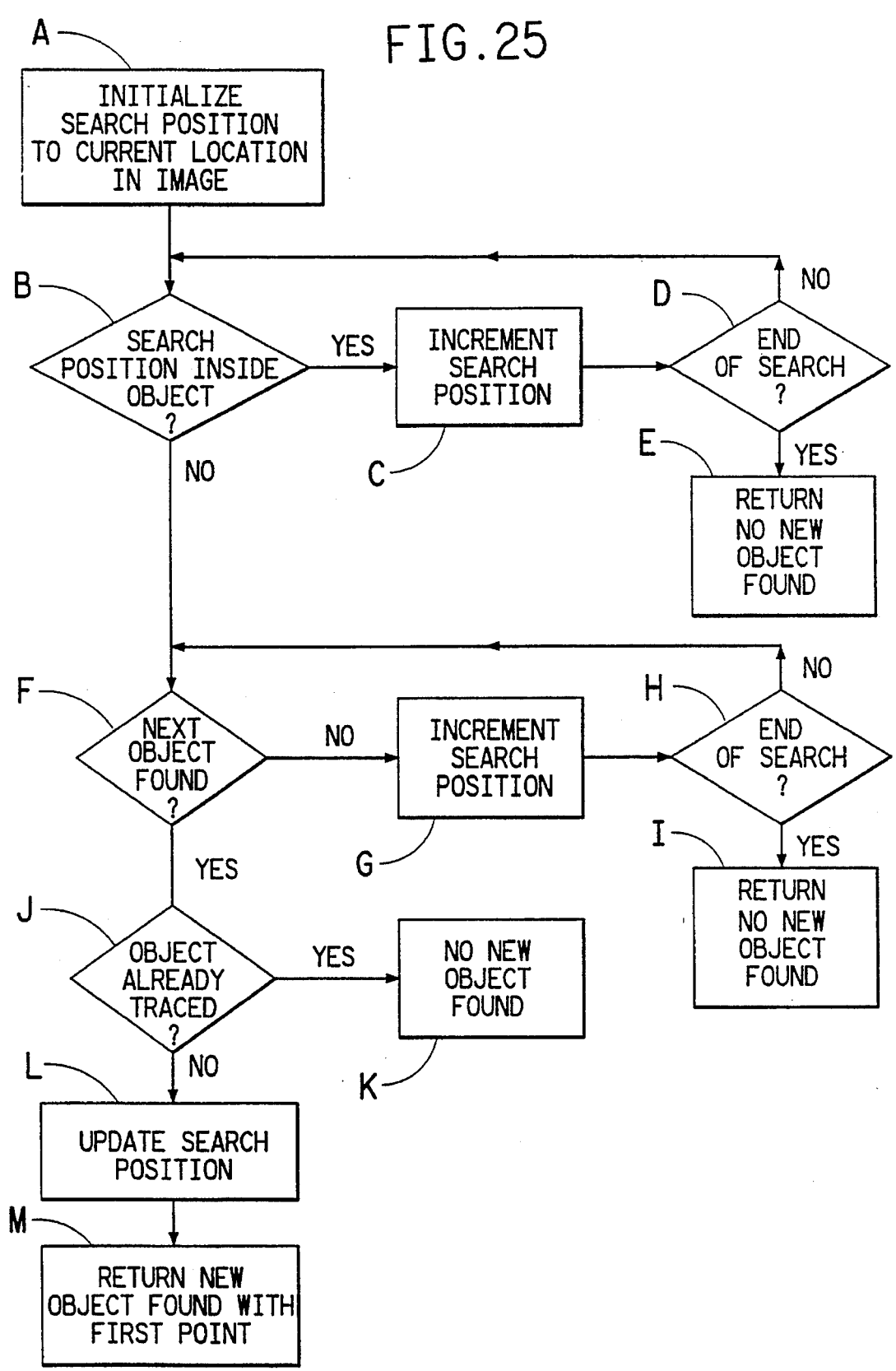

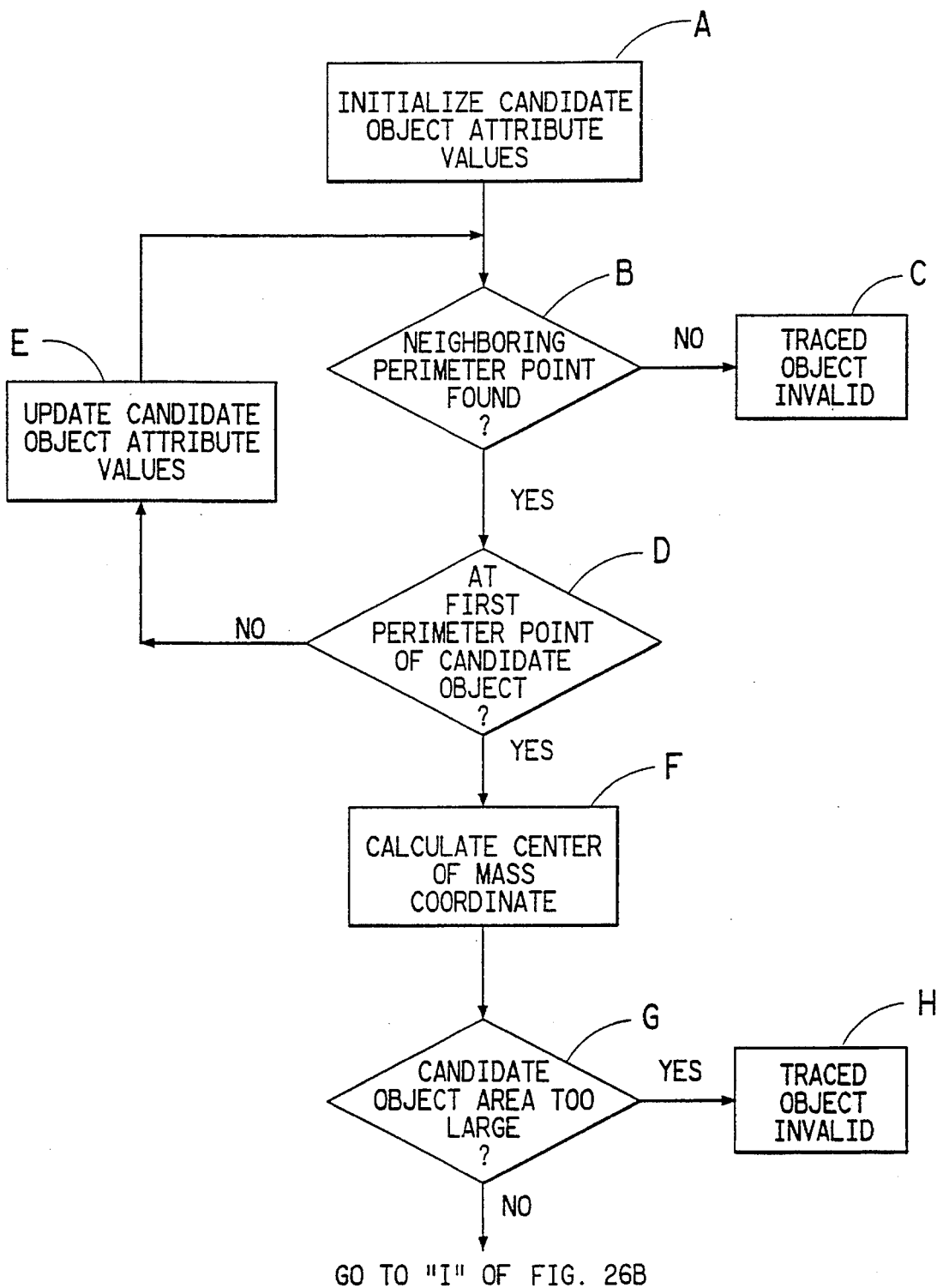

METHODS FOR DETERMINING THE EXTERIOR POINTS OF AN OBJECT IN A BACKGROUND

This application is a continuation-in-part of application Ser. No. 07/999,702, filed Dec. 31, 1992, now U.S. Pat. No. 5,371,810 which is a continuation-in-part of application Ser. No. 07/767,339, filed Sep. 27, 1991 now U.S. Pat. No. 5,481,620.

BACKGROUND OF THE INVENTION

1. Field of the Invention

The present invention relates to image analysis methods for determining the exterior points of an object in a background. The present invention also relates to a a method for identifying at least one valid object having at least one valid object predetermined attribute value in a background using automatically calculated thresholds by using the methods for determining the exterior points of the object.

2. Description of the Related Art

The ability to access interior points of a region when its contour is given is a classic problem in image processing. Previous solutions to this problem have been described by L. W. Chang and K. L. Leu in an article entitled "A Fast Algorithm for the Restoration of Images Based on Chain Codes Description and Its Applications", Computer Vision, Graphics, and Image Processing 50, 296–307 (1990). One algorithm described, connectivity filling, requires that every pixel in the object be interrogated. Since the number of pixels within an object is greater than the number of pixels which comprise the perimeter of the object, such a technique is relatively slow. Another method described is parity checking which is based on the fact that the intersection of a straight line with the contour regions of an object delineates an even number of points on the perimeter of the object. Designation of the interior points is determined by an arbitrary filling rule where all points between each odd point and the next even point on the contour in each line of the image are designated as interior points. Such a parity checking algorithm will not work with objects of complex shape.

The the same article cited above, Chang and Leu propose an enhanced parity checking algorithm which relies on characterizing the perimeter points into one of four categories based on direction code values. Characterizing the points leads to the creation of a new buffer of perimeter points wherein some points have been duplicated and others eliminated. By applying the parity checking algorithm to the newly created buffer, interior points of objects with complex shapes may be identified.

U.S. Pat. No. 5,029,106 to Kai discloses.a pattern data generating system for generating pattern data in which an arbitrary closed graphic pattern whose boundary data is defined on a two-dimensional bit map is filled. Kai examines all the points of the pattern to determine the interior points of the pattern. Kai does not deal with determining exterior points of the pattern.

Japanese Patent Publication Number 62-60069 to Hitachi Electronic Engineering Co. Ltd., published Dec. 14 1987, discloses a colony screening device which distinguishes colonies based on color. Colonies are identified by pattern recognition using a predetermined threshold and a small number of points in the center of a colony are arbitrarily selected. U.S. Pat. No. 4,453,266 to Bacus discloses a method for measuring the optical density of a cell using the sum of gray level values within the closed boundaries of the cell.

None of these references discloses a method for determining the exterior points of an object. Furthermore, none of these references discloses a method of identifying at least one valid object having at least one valid object predetermined attribute value in a background using automatically calculated thresholds by determining the exterior points of the object.

SUMMARY OF THE INVENTION

The present invention provides methods for accessing the exterior points of an object and methods for identifying objects using a respective method for accessing the exterior points. The accessing of exterior points of an object is an important problem in areas of object identification, when it is important to use the information in the local exterior environment of an object B in order to extract a feature which may be useful for object recognition. Examples of this type of feature which are important for recognizing objects and classifying or categorizing objects occur in the area of bacterial detection. For example, with listeric, it is very important to be able to detect the presence of annular rings exterior to a colony of listeria which have been discolored. These rings, known as escaline rings, have characteristic darkening which is indicative of the presence of listeria.

Another useful reason for being able to determine the local exterior of objects is to allow for measurement of the relative difference between the local exterior and the interior of an object. Relative difference is a robust measure which can be used, for example, in colony identification, where the growth media contribute to variations in the properties of a colony. The method of determining exterior points is used to perform adaptive characterization. Adaptive characterization involves using local differences interior to and exterior to an object of interest for the purposes of classification. This characterization complements characterization of an object based on absolute values derived for properties interior and exterior to an object.

There are two general methods for accessing the local exterior environment (i.e., the exterior points) of an object knowing the perimeter points. In the first method for determining the exterior points of an object, the shape of the exterior contour region around the object of interest can be made to follow the shape of the object itself. In the second method for determining the exterior points of an object, a known exterior shape such as a circle is used to characterize the exterior contour, often approximating the shape of the object.

For the first method, where the shape of the exterior contour region parallels the shape of the object, the present invention may access both the exterior and the interior points of the object on one pass. The perimeter points of an object are determined and are sorted by row and subsequently by column to end up with a row-column sorted perimeter buffer. Once one has obtained such a row-column sorted perimeter buffer, one can go to each row in this row-column sorted perimeter buffer, and, in each row, access a predetermined number, N, of pixels before the starting column for that row from this initial point. All points on the row are then accessed until the starting column for that row is reached. Similarly, pixels beyond the end column starting from the end column for the given row can be accessed. As a result, a predetermined number of pixels, N, prior to the start column and a predetermined number of pixels, M, (where M may be equal to N) beyond the end column for a given row can be accessed. One then goes to the next row in the row-column sorted perimeter buffer and the same process is repeated. Thus, in one pass through all the rows in the row-column sorted perimeter buffer one can access the local exterior contour region of the object, as well as preserve the shape of the interior contour in at least one direction.

By varying the number of pixels, N or M, which are used to go into the local exterior of an object, the size of the exterior contour region being sampled can be varied. If it is desirable to examine just the immediate local exterior region of an object, N or M can be made very small. Larger regions surrounding the object of interest can be sampled by increasing N or M. With this first method, both interior as well as exterior feature extraction can be performed in one pass, if the objects being evaluated are significantly separated. In accessing N or M pixels prior to the starting column and obtaining the gray level information for these N or M pixels to characterize the local exterior region for that row, one may sequentially access all pixels between the start column for that row and the ending column to obtain gray level information for the interior region as well. In this way, the N or N pixels prior to the starting column for a given row and the N or N pixels beyond the end column of a given row will be used to access exterior point information. Pixels between the start column and the end column for the given row can be used to access interior point information.

According to the second method of the present invention, an external contour region is sampled using a predetermined shape, such as a circle, often approximating the contour of the object. The second method involves two steps, or passes. In the first pass, each interior point of the object is accessed, and each interior point is labeled with a predetermined gray level value. A size parameter is then calculated for this object. This size parameter may be based, for example, on the area of the object, from which an equivalent radius can be derived if the object is somewhat circular. Alternatively, the size parameter can be based on a direct measure of extremum point distances for irregularly shaped objects. Nevertheless, once the size parameter is obtained for the object, a second larger size parameter, based on the original size parameter can then be calculated to determined the contour of the larger surrounding region. Once the external contour has been determined, the method of determining interior points can then be used to once again access the interior points of the larger exterior contour region.

The second pass accesses all the interior points of the larger exterior region but ignores those points which are labeled with the predetermined gray level during the first pass. In other words, the points which have been labeled in the first pass with the predetermined gray level are no longer considered for analysis in the second pass. However, all other points which are contained in the larger exterior area of the object are considered for analysis. In this way, during the second pass, only those points exterior to the object of interest are included, since the pixels corresponding to the object of interest have been labeled with the predetermined gray level and are thus ignored for analysis during the second pass.

Moreover, the first pass of the second method can actually be used to perform two tasks. In addition to labeling the interior points with the predetermined gray level, the first pass can also be used to access the interior points of the object in order to perform calculations of features which are interior to that object. In other words, when the interior points of the object are accessed during the first pass, interior point gray level information can initially be extracted in order to compute an interior feature such as color, texture or the presence of some known pattern. After accessing the interior gray level information, the interior points can be labeled with the predetermined gray level. Having performed these two steps, the second pass is then performed, which accesses the interior points of the larger exterior contour and ignores those points which have the predetermined gray level. Hence, after the second pass, in addition to getting the local exterior information surrounding the object, the interior features of the object are calculated during the first pass.

Two passes may be desirable for the first method described above if objects are spaced in close proximity to each other or the object is complex. The reason one needs to do this is to assure that the interior points of an adjacent object or interior points of the same object, where the shape is complex, are not identified as exterior points of the object being evaluated. For this case, the first pass determines the interior points of the object being evaluated and labels them with a predetermined gray level. The second pass is as described above, which delineates the N or M pixels from the start of every row or column.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explaining the principles of the invention.

FIGS. 8A and 8B are a flow chart showing the steps of part of a module, WRITE BUF, which determines the interior points of an object and labels them with a predetermined gray level.

FIG. 9 is a FILL look-up table for objects traced in the clockwise direction.

FIG. 10 is a FILL look-up table for objects traced in the counterclockwise direction.

FIGS. 13A–13D are a flow chart showing the steps of part of the module READ COLOR which designates the exterior points of an object in accordance with the first method of the present invention.

FIGS. 19A and 19B are a flow chart showing the steps of a module, READ COLOR, which designates the exterior points of an object in accordance with the second embodiment of the present invention.

FIG. 25 is a flow chart illustrating the steps of a module, FIND OBJECT, which is also used to search the image.

FIGS. 26A–26B are a flow chart showing the steps of a module, TRACE OBJECT, which is used to trace objects.

DETAILED DESCRIPTION OF THE PREFERRED EMBODIMENTS

Reference will now be made in detail to the present preferred embodiments of the invention as illustrated in the accompanying drawings.

Figure 1:
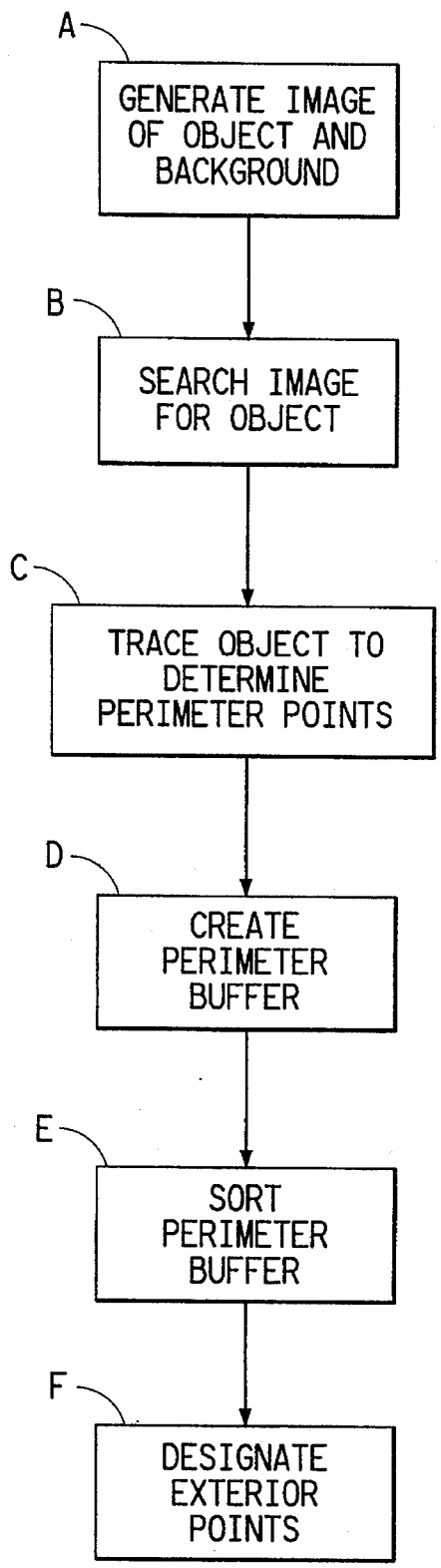
FIG. 1 is a block diagram showing the steps of a first method for determining the exterior points of an object according to a first embodiment of the present invention.

In accordance with the a first embodiment of the present invention, there is provided a first method for determining the exterior points of an object in a background. FIG. 1 is a block diagram showing the overall method of the present invention. The method comprises the step of generating an image of the object and the background as shown in block A of FIG. 1. In any of the methods of the present invention, the background may be either fixed or varying. Also, in any of the methods of the present invention, the hardware used to implement these methods must first be initialized when the image is generated. The image of the object and the background may be generated by a camera. Although a CCD camera is generally used with any of the methods of the present invention, any type of camera may be used without departing from the general principles of the present invention. The image is then digitized and stored by a frame grabber or a video digitizer.

The first method for determining exterior points of the present invention also comprises the step of searching the image for the object as shown in block B of FIG. 1. The searching step may comprise searching the entire object. In instances where it is known that an identifying feature of an object in question lies in a particular portion of an object, the searching step may comprise searching only that portion of the object. The searching step may be done in any manner, for instance, using an automatically calculated threshold or a user selected threshold.

Figure 3:
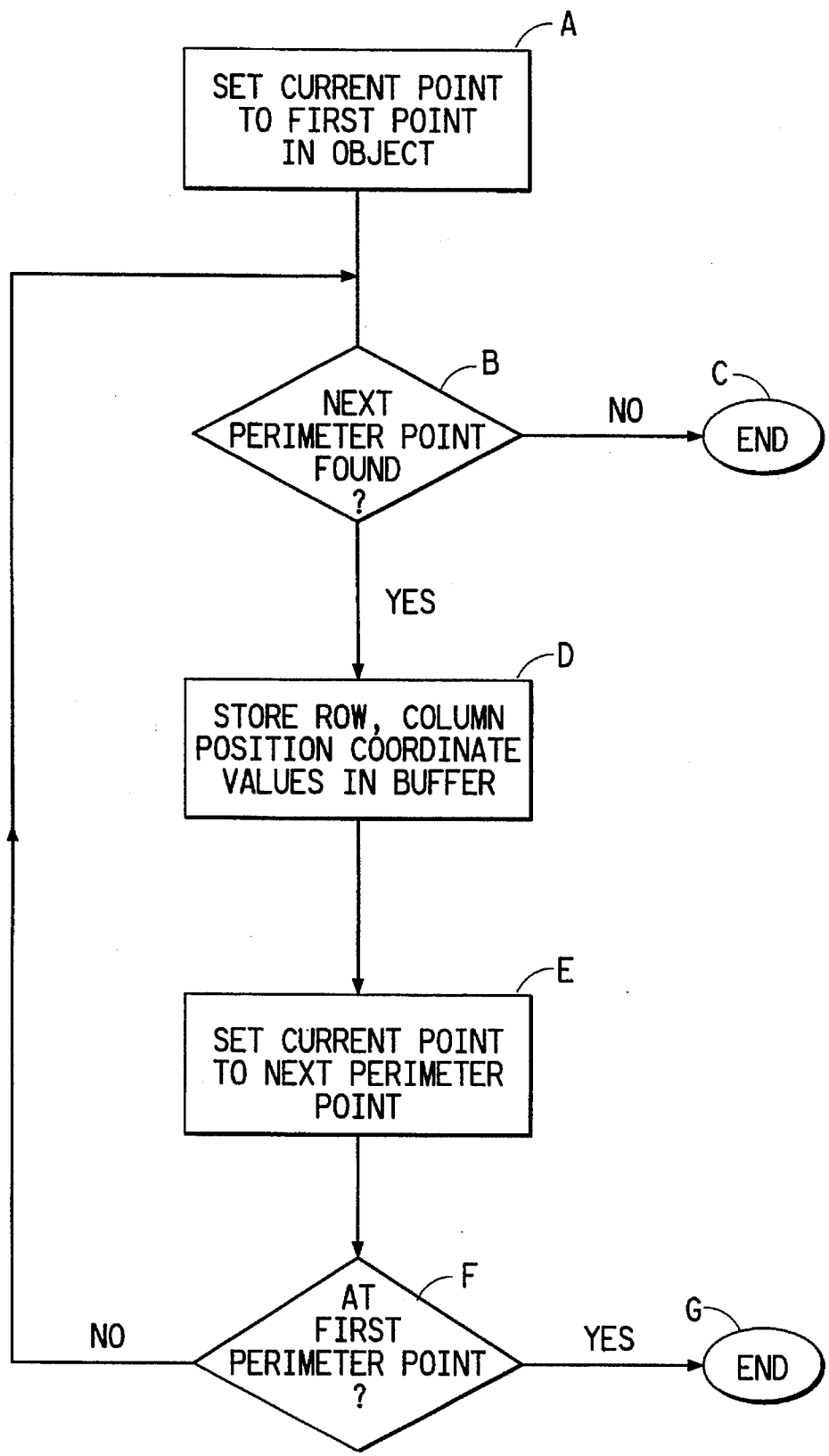
FIG. 3 is a flow chart showing the steps of a module, GET PERIM, for determining the coordinates of each perimeter point of an object.

The first method for determining exterior points further comprises the step of determining the perimeter points of the object, which is done by tracing the object. This step is shown in block C of FIG. 1. The coordinates of each perimeter point are determined by a module GET PERIM. The steps of GET PERIM are illustrated in FIG. 3. The basic principles of the GET PERIM module are similar to those described in "Digital Image Processing" by Rafael C. Gonzalez and Paul Wintz, Second Ed., Addison-Wesley Publishing Company, Reading, Massachusetts (1987). In one instance, the step of determining the perimeter points of the object comprises tracing the object sequentially in a clockwise direction. In another instance, the step of determining the perimeter points of the object comprises tracing the object sequentially in a counterclockwise direction.

The first method for determining exterior points also comprises the step of creating a perimeter buffer. This step is shown generally by block D of FIG. 1 and is performed by a module, LOAD BUFFER, as shown specifically in FIGS. 6A and 6B as described below. The perimeter buffer comprises the perimeter points as determined by the module GET PERIM.

Figures 2A, 2B:
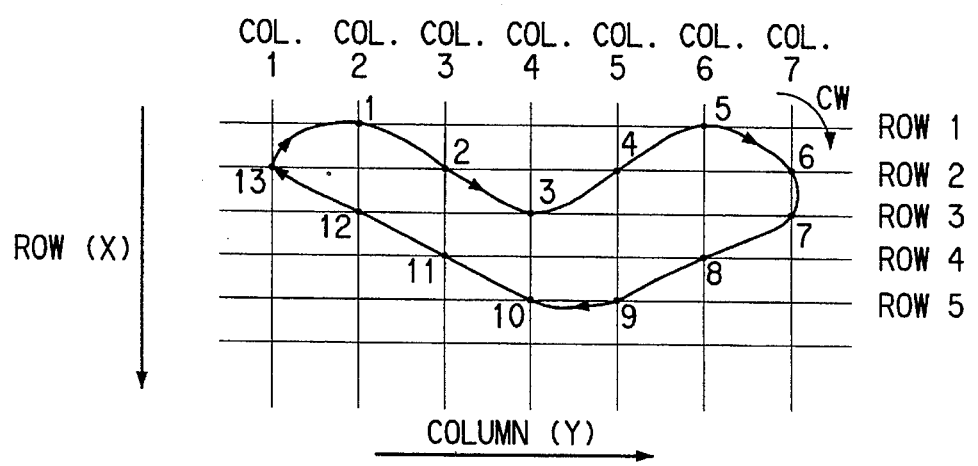
FIG. 2A is a schematic diagram, with rows and columns designated, which represent the row and column-position coordinate values, of a simple object traced in a clockwise direction.
FIG. 2B is a chart showing the row-position coordinate value, the column-position coordinate value and the direction code values for the thirteen points illustrated in FIG. 2A.

FIG. 2A shows a schematic for a simple object traced in a clockwise direction. For purposes of illustration, thirteen perimeter points are shown. Each perimeter point has a row position coordinate value, a column-position coordinate value and a direction code vector. It should be noted that in this context, row and column do not have to be horizontal rows and vertical columns. Rather, any line segment through the object can be translated into a row or column by specifying the proper coordinate axes. The direction code vector comprises a first and a second direction code value for each perimeter point. The first direction code value describes the relationship of each respective perimeter point to the next perimeter point as determined by the GET PERIM module, and the second direction code value describes the relationship of each respective perimeter point to the previous perimeter point, as determined by the GET PERIM module. The definition of "next or previous point", as discussed below, depends on the direction in which the object is traced. The i'th member of the perimeter buffer is denoted by the direction code descriptor $(x_i, y_i, \text{vector}_i)$, where $x_i$ is the row position coordinate value, $Y_i$ is the column-position coordinate value and vector$_i$ is the direction code vector which contains the following information:

(i) next$_i$ is the direction code value to the next perimeter point; and (ii) prev$_i$ is the direction code value from the previous point to the current point.

FIG. 2B is a chart showing the row-position coordinate value, the column-position coordinate value, and the first and second direction code values for the thirteen points illustrated in FIG. 2A. For example, point 13 is denoted as having a row-position coordinate value of 2, a column-position coordinate value of 1, a first direction code value of 1 and a second direction code value of 7.

Figure 4:
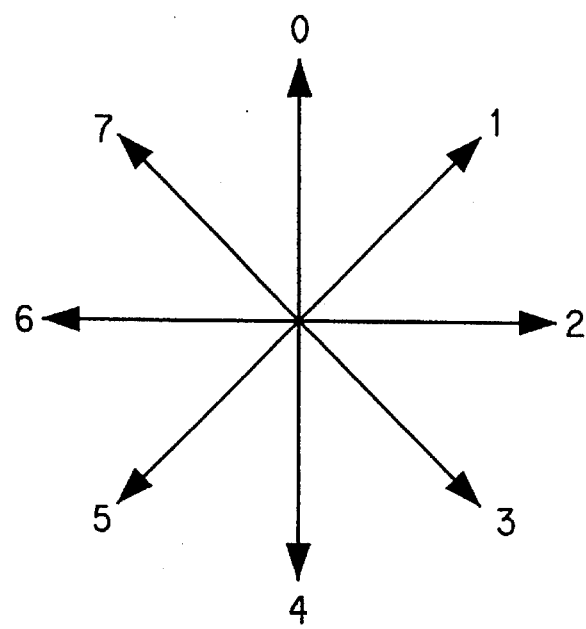
FIG. 4 is a schematic view illustrating the direction code values for an object which is traced in the clockwise direction.
Figure 5:
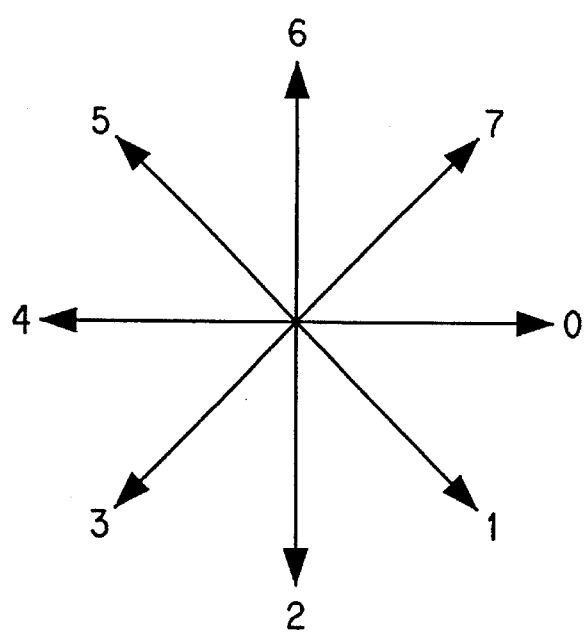
FIG. 5 is a schematic view illustrating the direction code values for an object which is traced in the counterclockwise direction.

In the present invention, the direction code values can range from 0–7, depending on the direction of one perimeter point to an adjacent perimeter point (either the next perimeter point or the previous perimeter point). The direction code values for the present invention are shown in FIGS. 4 and 5. FIG. 5 direction code values are derived by rotating the values illustrated in FIG. 4 by 90°. The application of the set of direction code values as illustrated in FIG. 4 as opposed to the direction code values as illustrated in FIG. 5 is dependent upon the method of sorting the perimeter buffer to be discussed below. As can be seen from FIG. 4, if next$_i$ is equal to zero, the next perimeter point would be vertically above the current perimeter point and in the same column. It is important to realize that the value of a direction code from one perimeter point to the next depends on the sense in which the object is traced by the module GET PERIM. If the object is traced in the clockwise direction, the direction codes associated with the perimeter points are different than if the object is traced in the counterclockwise direction.

The steps of the module GET PERIM are shown in FIG. 3. As illustrated in FIG. 3, block A sets the current point to the first point in the object. Decision diamond B then asks whether the next perimeter point has been found. If not, then the traced object is invalid, and the module is done as shown in block C. If the next perimeter point has been found, then the row and column-position coordinate values are stored in the perimeter buffer as illustrated in block D of FIG. 3. The current point is set to the next perimeter point as shown in block E of FIG. 3. Decision diamond F then asks whether the current point is at the first perimeter point. If not, then the loop through decision diamond B, blocks C–E and decision diamond F is repeated until the current point is at the first perimeter point. If the answer to decision diamond F is yes, the module GET PERIM is done.

Figure 6A:
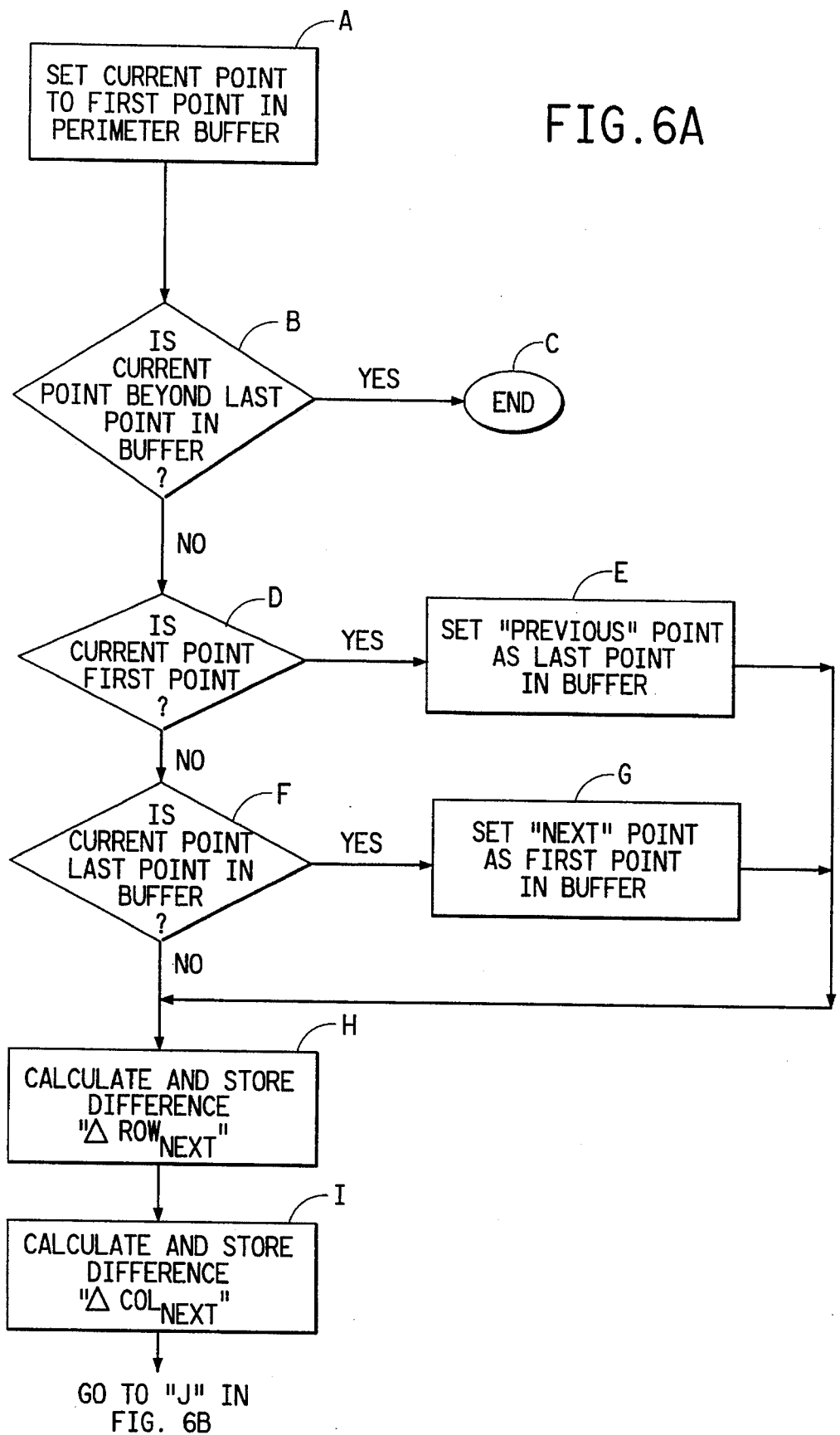
FIGS. 6A and 6B are a flow chart showing the steps of a module, LOAD BUFFER, which creates a perimeter buffer comprising the perimeter points of an object.
Figure 6B:
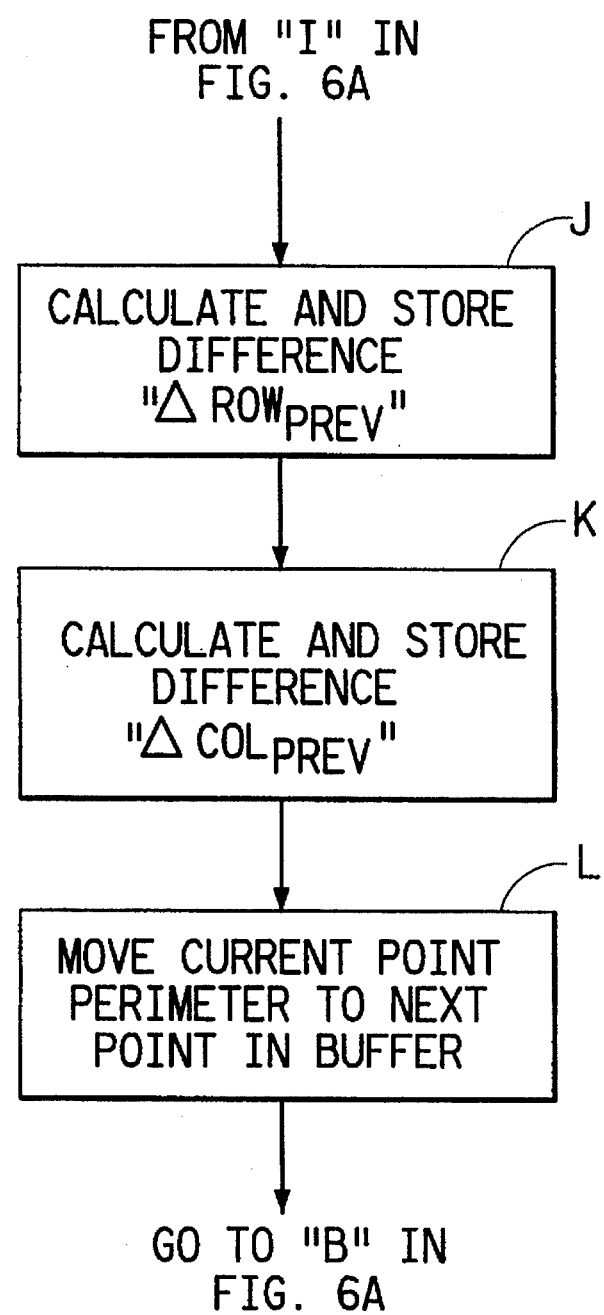

The steps of the module LOAD BUFFER, which creates a perimeter buffer, are illustrated in FIGS. 6A and 6B. In the first step as shown in block A, the current point is set to the first point in the perimeter buffer. Decision diamond B then asks whether the current point is beyond the last point in the buffer. If it is, then the LOAD BUFFER module is done as illustrated in block C of FIG. 6A. If the current point is not beyond the last point in the buffer, then decision diamond D asks if the current point is the first point in the buffer. If it is, then block E sets the previous point as the last point in the buffer. If the current point is not the first point in the buffer, then decision diamond F asks if the current point is the last point in the buffer. If it is, then block G sets the next point as the first point in the buffer. After the previous point is set as the last point in the perimeter buffer, and if the current point is the first point in the perimeter buffer, or the next point is set as the first point in the perimeter buffer, and if the current point is the last point in the perimeter buffer, the difference in the row coordinate value between the next point and the current point is calculated and stored in the buffer as shown in block H in FIG. 6A. This difference is designated as $\Delta \text{ROW}_{NEXT}$. The difference in the column coordinate value between the next point and the current point is then calculated and stored in the buffer as shown in block I in FIG. 6A. This difference is designated as $\Delta \text{COL}_{NEXT}$. The difference in the row coordinate value between the current point and the previous point is then calculated and stored in the buffer as shown in block J in FIG. 6B. This difference is designated as $\Delta \text{ROW}_{PREV}$. Next, the difference in the column coordinate value between the current point and the previous point is calculated and stored in the buffer as shown in block K. This difference is designated as $\Delta \text{COL}_{PREV}$. The current point is then moved to the next perimeter point in the buffer as shown in block L, and the module returns to decision diamond B of FIG. 6A. The loop through B and D–L continues until the current point is beyond the last point in the buffer, at which point the LOAD BUFFER module is done as shown in block C.

A first version of the first method for determining exterior points also comprises the step of sorting the perimeter points in the perimeter buffer first by row and then by column to create a row-column sorted perimeter buffer. This step is shown in block E in FIG. 1. This sorting step is performed for tracing the object in either the clockwise or the counterclockwise direction. This sorting step is performed by the standard "Shell Sort" technique described by Robert Sedgewick in his textbook Algorithms in C, Addison Wesley, 1990. It should be noted that the "vector$_i$" information associated with each perimeter point moves with the point during the sort.

In one implementation of the first version of the first method for determining exterior points, the object is traced in the clockwise direction, and the perimeter points are sorted first by row to create a row-sorted perimeter buffer comprising at least one row-sorted perimeter point. The perimeter points are sorted in ascending order such that the points with the lowest row-position coordinate values are placed at the start (meaning the first element of the sequence of the buffer) of the buffer. Alternatively, the perimeter points are sorted in descending order such that the points with the highest row-position coordinate values are placed at the start of the buffer.

In this one implementation of the first version of the first method, the perimeter points in the row-sorted perimeter buffer are then sorted by column in order to create a row-column sorted perimeter buffer comprising at least one row-column sorted perimeter point. The step of sorting the perimeter points by column comprises sorting the perimeter points in ascending order. In the case where the buffer has been sorted by row in ascending order and subsequently by column, the point with the lowest column-position coordinate value and the lowest row-position coordinate value is placed at the start of the buffer. In the case where the buffer has been sorted by row in descending order and subsequently by column, the point with the lowest column-position coordinate value and the highest row-position coordinate value is placed at the start of the buffer.

In another implementation of the first version of the first method for determining exterior points, the object is traced in the counterclockwise direction, and the perimeter points in the perimeter buffer are sorted by row to create a row-sorted perimeter buffer comprising at least one row-sorted perimeter point. The step of sorting the perimeter points by row comprises sorting the perimeter points in ascending order such that the points with the lowest row-position coordinate values are placed at the start of the buffer. Alternatively, the step of sorting the perimeter points by row comprises sorting the perimeter points in descending order such that the points with the highest row-position coordinate values are placed at the start of the buffer.

In this other implementation of the first version, the perimeter points in the row-sorted perimeter buffer are then sorted by column in order to create a row-column sorted perimeter buffer comprising at least one row-column sorted perimeter point. The step of sorting the row-sorted perimeter points by column comprises sorting the perimeter points in descending order. In the case where the buffer has been sorted first by row in ascending order and subsequently by column, the point with the highest column-position coordinate and lowest row-position coordinate is placed at the start of the buffer. In the case where the buffer has been sorted first by row in descending order and then by column, the point with the highest column-position coordinate and highest rowposition coordinate is placed at the start of the buffer.

In one implementation of a second version of the first method for determining exterior points, the object is traced in the clockwise direction, and the perimeter points in the perimeter buffer are sorted by column in order to create a column-sorted perimeter buffer comprising at least one column-sorted perimeter point. The step of sorting the perimeter points by column comprises sorting the perimeter points in ascending order such that the points with the lowest column-position coordinate values are placed at the start of the buffer. Alternatively, the step of sorting the perimeter points by column comprises sorting the perimeter points in descending order such that the points with the highest column-position coordinate values are placed at the start of the buffer.

In this implementation of the second version, the perimeter points in the column-sorted buffer are then sorted by row in order to create a column-row sorted perimeter buffer comprising at least one column-row sorted perimeter point. The step of sorting the perimeter points by row comprises sorting the column-sorted perimeter points in descending order. In the case where the buffer has been sorted by column in ascending order and subsequently by row, the point with the highest row-position coordinate and lowest column-position coordinate is placed at the start of the buffer. In the case where the buffer has been sorted by column in descending order and then by row, the point with the highest row coordinate value and highest column coordinate value is placed at the start of the buffer.

In another implementation of the second version of the first method for determining exterior points, the object is traced in the counterclockwise direction, and the perimeter points in the perimeter buffer are sorted by column to create a column-sorted perimeter buffer comprising at least one column-sorted perimeter point. The step of sorting the perimeter points by column comprises sorting the perimeter points in ascending order such that the points with the lowest column-position coordinate values are placed at the start of the buffer. Alternatively, the step of sorting the perimeter points by column comprises sorting the perimeter points in descending order such that the points with the highest column-position coordinate values are placed at the start of the buffer.

In this other implementation of the second version, the perimeter points in a column-sorted perimeter buffer are then sorted by row to create a column-row sorted perimeter buffer comprising at least one column-row sorted perimeter point. The step of sorting the perimeter points by row in the column-sorted buffer comprises sorting the perimeter points in ascending order. In the case where the buffer has been sorted first by column in ascending order and subsequently by row, the point with the lowest row-position coordinate value and lowest column-position coordinate value is placed at the start of the buffer. In the case where the buffer has been sorted first by column in descending order and subsequently by row, the point with the lowest row-position coordinate value and highest-column-position coordinate value is placed at the start of the buffer.

Figure 11:
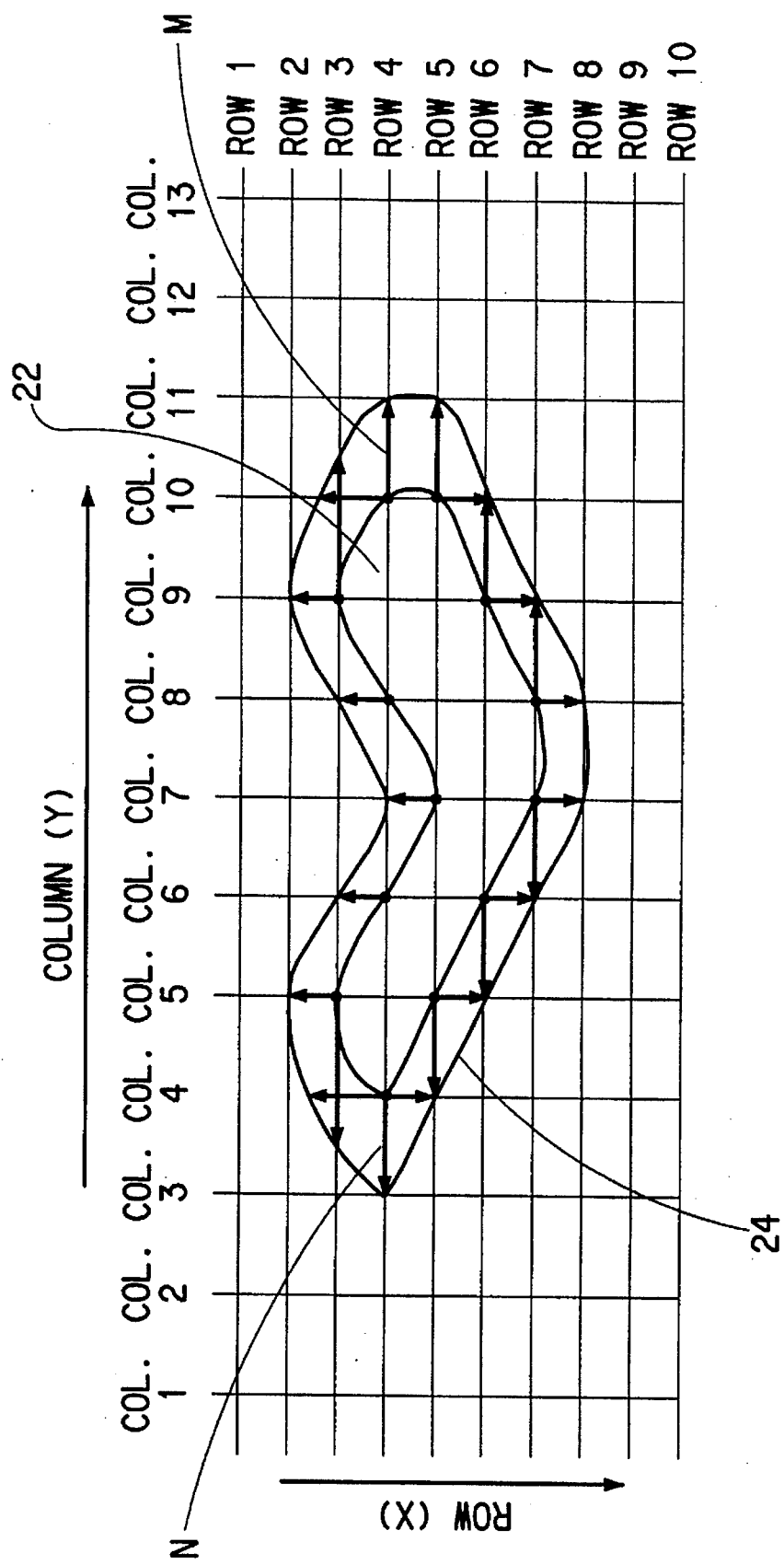
FIG. 11 is a schematic diagram of an object and a contour region for which the methods of the first embodiment are used to determine the exterior points of the object.

The first method of the present invention also comprises the step of designating the exterior points of the object. This step is shown generally in block F of FIG. 1 and will be explained in greater detail with respect to FIGS. 13A–13D. An irregularly-shaped object 22, with its exterior contour region 24 as defined by the first method, is illustrated in FIG. 11. In the first version of the first method, where the perimeter points in the perimeter buffer are first sorted by row, then by column, the designating step comprises designating as the exterior points of the object all the points on each row which are a predetermined number, N, of pixels before the perimeter point having the lowest column-position coordinate value and a predetermined number, M, of pixels beyond the perimeter point having the highest column-position coordinate value for each row. Pixels "before" in this context means the pixels having column coordinate values less than the perimeter point with the lowest column coordinate value on a respective row. Pixels "beyond" in this context means the pixels having column coordinate values greater than the perimeter point with the highest column coordinate value on a respective row. In the second version, where the perimeter points in the perimeter buffer are first sorted by column, then by row, the designating step comprises designating as the exterior points of the object all the points in the column which are a predetermined number, which can be either M or N, or another value, P, of pixels before the perimeter point having the lowest row-position coordinate value and a predetermined number, which can be either M, N, P or another value, Q, of pixels beyond the perimeter point having the highest row-position coordinate value for each column.

In order to derive information in both orthogonal directions, it may be necessary to sort the perimeter points in the original perimeter buffer in two orthogonal directions. Accordingly, the first version of the first method of the present invention may further comprise the additional step of sorting the perimeter points in the perimeter buffer by column and then by row to create a column-row sorted perimeter buffer. The designating step then comprises designating as the exterior points of the object all the points in each column which are a predetermined number, which can be either M, N, P, Q or another value, R, of pixels before the perimeter point having the lowest row-position coordinate value and a predetermined number of pixels, which can be either M, N, P, Q, R or another value, S, beyond the perimeter point having the highest row-position coordinate value for each respective column. The second version of the first method of the present invention may further comprise the additional step of sorting the perimeter points in the perimeter buffer by row and then by column to create a row-column sorted perimeter buffer. The designating step then comprises designating as the exterior points of the object all the points in each column which are a predetermined number, which can be either M, N, P, Q, R, S or another value, T, of pixels before the perimeter point having the lowest colulmn-position coordinate value and a predetermined number of pixels, which can be either M, N, P, Q, R, S, T or another value, V, beyond the perimeter point having the highest column-position coordinate value for each respective row. It should be noted that while M, N, P, Q, R, S, T or V can be different values, in robust, practical applications, these variables are often chosen to be equal to the same value, say M.

Further in accordance with the first method of the first embodiment present invention, there is provided another method for determining the exterior points of an object in a background by "ignoring" the interior points of the object. By "ignoring" is meant determining the interior points and assigning to them a predetermined gray level value which can then be discounted, as will be explained below. The steps of this method are shown generally in the block diagram of FIG. 7. The method comprises the step of generating an image of the object and the background, as shown in block A of FIG. 7. The image is generated as described above with respect to the first method for determining exterior points.

Figure 7:
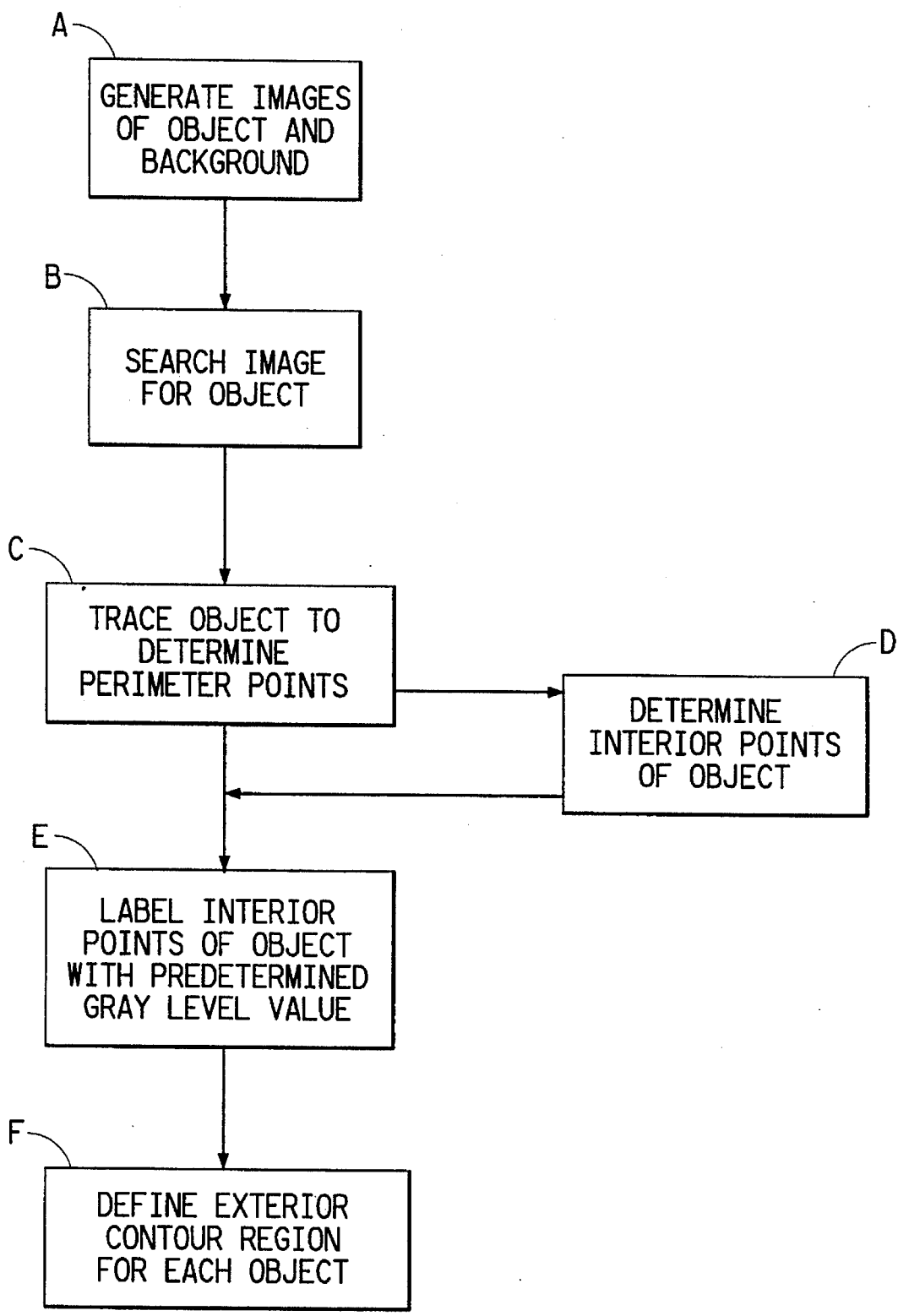
FIG. 7 is a block diagram showing the steps of an alternative method for determining the exterior points of an object according to a first embodiment of the present invention.

The method for determining exterior points by ignoring interior points also comprises the step of searching the image for the object as shown in block B of FIG. 7. As in the first method, the searching step may comprise searching each entire object. Or, in instances where it is known that an identifying feature of an object in question lies in a particular portion of an object, the searching step may comprise searching only that portion of the object. As noted above with respect to the first method, the searching step may be done in any manner, for instance, using an automatically calculated threshold or a user-selected threshold.

The method for determining exterior points by ignoring interior points further comprises the step of determining the perimeter points of the object, which is done by tracing the object. This step is shown in block C of FIG. 7. The coordinates of each perimeter point are determined by the module GET PERIM as described above with respect to FIG. 3.

The method for determining exterior points by ignoring interior points also comprises the step of determining the interior points of the object. This step is shown in block D of FIG. 7. This may be done by a variety of methods, for example, the method described in Chang and Leu, or in Kai, supra. Alternatively, the interior points may be determined by determining the status variable of a perimeter point and from that variable, designating interior points on the same line segment.

More specifically, when the status variable of a perimeter point is determined, and from that variable, the interior points on the same line segment are designated when determining exterior points by ignoring interior points, the interior points of the object are determined by assigning to each perimeter point a status variable having one of a first and a second value. This step is performed in a module, WRITE BUF, as shown in the flow chart of FIGS. 8A and 8B, which shows the steps of the first pass of this method. The first value of the status variable is "FILL", and the second value of the status variable is "NO FILL". The value of the status variable is determined by the first and second direction code values $next_i$ and $prev_i$. Direction code values are determined in accordance with FIGS. 4 and 5, depending on the version of sorting the perimeter buffer which is employed. If the points in the perimeter buffer are sorted first by row and then by column, such as in the first version of the first method, the direction code values in FIG. 4 are employed. If the points in the perimeter buffer are sorted first by column and then by row, such as in the second version of the first method, then the direction code values illustrated in FIG. 5 are used. The rules for mapping $next_i$ and $prev_i$ to FILL or NO FILL are summarized for objects traced in a clockwise direction in a FILL look-up table (LUT) as shown in FIG. 9. The rules for mapping $next_i$ and $prev_i$ to FILL or NO FILL are summarized for objects traced in a counter-clockwise direction in a FILL look-up table (LUT) as shown in FIG. 10. In the look-up tables of FIGS. 9 and 10, F stands for FILL and NF stands for NO FILL. The look-up tables of FIGS. 9 and 10 are empirically derived, based on the local concavity or convexity of the object.

Figure 8A:
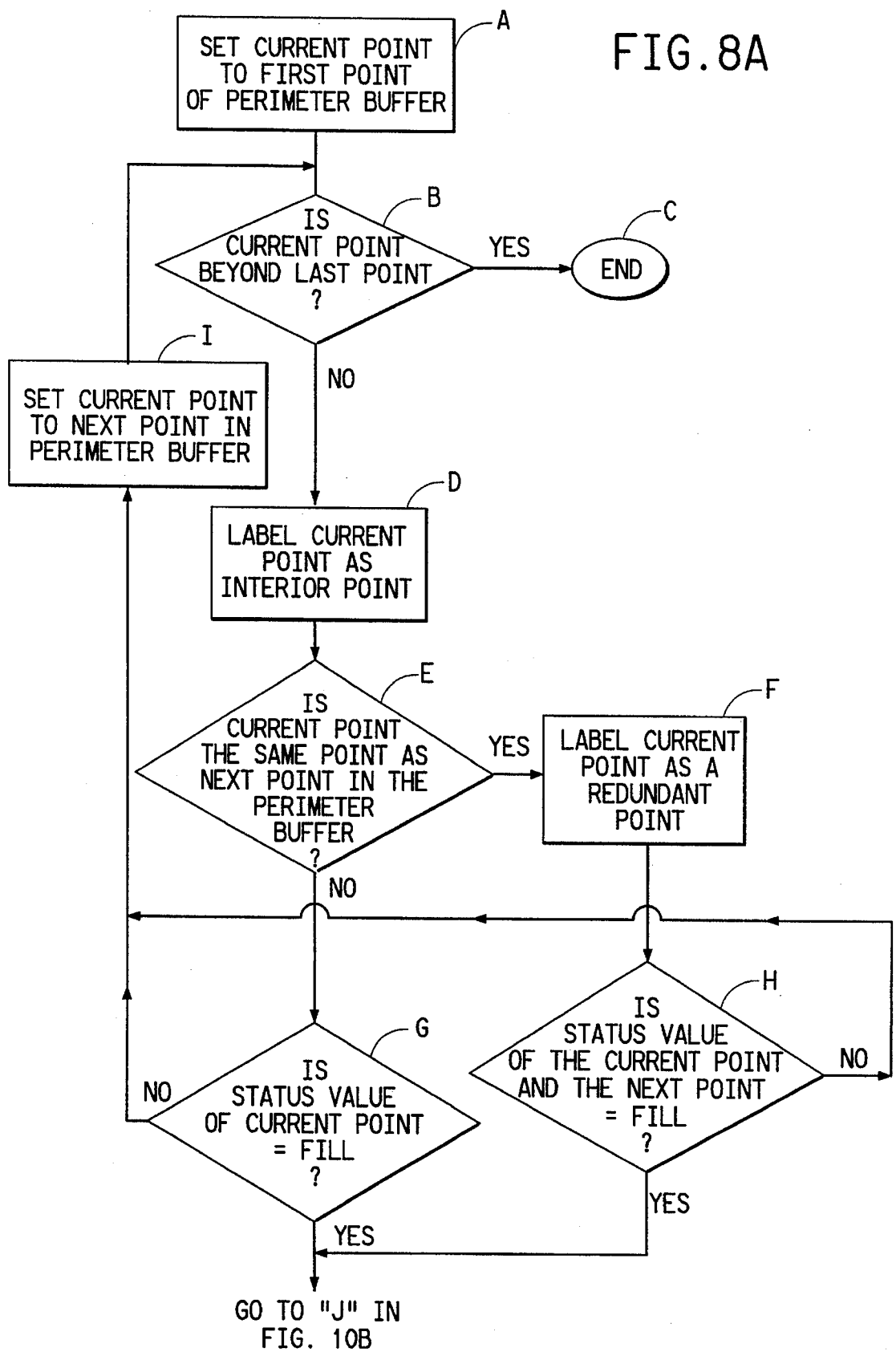

The step of determining the interior points of an object according to the embodiment which determines the status variable of a perimeter point further comprises the sub-step of designating as the interior points of the object each point on the same line segment as the perimeter point being examined and lying between the examined perimeter point and the next perimeter point in the sorted perimeter buffer, where the examined perimeter point is assigned the first value, FILL, of the status variable. This step is performed in the module WRITE BUF as shown in FIGS. 8A and 8B. FIGS. 8A and 8B are the flow chart for the first implementation of the first version of the method for determining exterior points by ignoring the interior points, it being understood that analogous flow charts exist for the other implementation of the first version and both implementations of the second version. In the first version, where the perimeter points in the perimeter buffer are first sorted by row, then by column, each point on the same row as the perimeter point being examined and lying between the examined perimeter point and the next perimeter point in the row-column sorted perimeter buffer are designated as the interior points. In the second version, where the perimeter points in the perimeter buffer are first sorted by column, then by row, each point on the same column as the perimeter point being examined and lying between the examined perimeter point and the next perimeter point in the column-row sorted perimeter buffer are designated as the interior points of the object.

FIGS. 8A and 8B illustrate the optional use of a first pass for the first method of the present invention prior to determining the exterior contour for an irregularly-shaped object, such as object 22 and its contour region 24 as shown in FIG. 11. In the first pass of the first method, the interior points of objects are labeled with a predetermined gray level value. As shown in block A of FIG. 8A, the first step of WRITE BUF which is run for the first implementation of the first embodiment is to set the current point to the first point of the perimeter buffer. Decision diamond B then asks whether the current point is beyond the last point of the perimeter buffer. If so, the module is done as shown in block C. If the current point is not beyond the last point, then the current point is labeled as an interior point as shown in block D. Then decision diamond E asks whether the current point is the same point as the next point in the buffer. If it is, then the current point is labeled as redundant as shown in block F. Then decision diamond H asks if the status variable of the current point and the next point are equal to FILL. If the answer is yes, then READ COLOR moves to the next point on the same row as the current point as shown in block J. If the answer is no, the current point is set to the next point in the buffer as shown in block I and the module returns to decision diamond B. Returning to decision diamond E, if the current point is not the same point as the next point in the buffer, then decision diamond G asks if the status value of the current point is equal to FILL. If it is not, the module returns to decision diamond B. The loop through B and D–I continues until the current point is beyond the last point, at which time the part of WRITE BUF as illustrated in FIGS. 8A and 8B is done as shown in block C of FIG. 8A. Returning to decision diamond G, if the status value of the current point is equal to FILL, then the module WRITE BUF moves to the next point on the same row as the current point, as shown in block J. Decision diamond K then asks if the column coordinate of the next point is less than or equal to the column coordinate of the next perimeter point in the perimeter buffer. If it is, then the next point is identified as an interior point as shown in block L. After identifying the interior points of an object as shown in block L of FIG. 8B, the gray level value of each interior point may be determined, and the object may be characterized by using the gray level values as described below. In addition, a predetermined gray level may be assigned to points in a buffer image corresponding to each interior point in order to label the object. The buffer image is a region of memory having the same dimensions as the image memory region. Each pixel in the image memory region has a corresponding location in the buffer image. By assigning a predetermined gray level value, it is meant either (1) choosing an unoccupied gray level value; or (2) choosing a gray level value, preferably a value which is sparsely occupied, and shifting all pixels which have that selected value to a new gray level value so that the chosen gray level value is unoccupied. After the next point is identified as the interior point as shown in block L, the loop through block J and diamond K continues until the column coordinate of the next point is greater than the column coordinate of the next perimeter point in the perimeter buffer. Then the current point is set to the next perimeter point in the buffer as shown in block M. The loop through B–M until the current point is beyond the last point in the buffer, at which point the part of WRITE BUF as illustrated in FIGS. 8A and 8B is done, as shown in block C of FIG. 8A.

The step of determining the interior points of an object according to the embodiment which determines the status variable of a perimeter point further comprises the step of checking for redundant perimeter points. This step is performed in the module, WRITE BUF, as illustrated in FIGS. 8A and 8B by decision diamond F and block G. A redundant perimeter point is one which has been accessed or traversed more than once during the sequential tracing of the object. For example, this could occur at cross-over points, which is a point which has been crossed over more than once during the tracing step. When this redundant interior point checking is performed, the step of designating all points lying between each redundant perimeter point and the next perimeter point on the same line segment as the interior points of the object occurs only when all instances of each redundant perimeter point are assigned the first value of the status variable (FILL).

The method for determining exterior points by ignoring interior points also comprises the step of defining an exterior contour region for each object. This step is shown in block F of FIG. 7. This step will be explained with reference to FIG. 11, which shows an object having an irregular shape and its contour region. The step of defining the exterior contour region for each object comprises the sub-steps of creating a perimeter buffer, where the perimeter buffer comprises the perimeter points, and sorting the perimeter points in the perimeter buffer by row and then by column in order to create a row-column sorted perimeter buffer. The step of creating a perimeter buffer is performed by the module, LOAD BUFFER, as shown in FIG. 6 and as described above. The perimeter buffer comprises the perimeter points as determined by the module GET PERIM, as shown in FIG. 3 and as described above.

The method for determining exterior points by ignoring interior points also comprises the step of designating as the exterior points of the object all the points in each row which are a predetermined number, N of pixels from the perimeter point having the lowest column-position coordinate value and the predetermined number of pixels from the perimeter point having the highest column-position coordinate value for each respective row. This step is shown in block K of FIG. 7. In addition, each designated exterior point is required to have a value other than the predetermined gray level value. If a designated exterior point possesses the predetermined gray level value, it is discounted as an exterior point. In this way, one assures that the designated points are not the interior points of the object or an adjacent object.

It will be apparent to those skilled in the art that various modifications and variations can be made in the method of the present invention without departing from the scope or spirit of the invention. For instance, in a modified alternative method of the first method, the exterior contour region may be defined by sorting the perimeter points in the perimeter buffer first by column and then by row, as opposed to first by row and then by column as described above, to create a column-row sorted perimeter buffer for the object. The points which are a predetermined number, which may be M or N as discussed above, of pixels from the perimeter point having the lowest row-position coordinate value and a predetermined number, which may be M or N or a different value, P, of pixels from the perimeter point having the highest row-position coordinate value for each respective column are designated as the exterior points of the object. As in the above description of the alternative first method, which sorts the perimeter points first by row and then by column, in this modified alternative first method, each designated exterior point has a value other than the predetermined gray level value.

Color may be used to characterize an object for which the exterior points have been designated, or as a predetermined attribute value to validate the object, as will be described below. When color is used in this way to characterize the object or as a predetermined attribute value to validate the object, at least one color parameter for at least one interior and/or exterior point of the candidate object may be calculated. By color parameter, it is meant any parameter which is related to the color content of the object. More specifically, three common parameters used in color theory are hue, saturation and lightness as defined in "Color Science, Concepts and Methods, Quantitative Data and Formulae", by G. Wyszecki and W. S. Stile, John Wiley & Sons (1967). In a preferred application of the first embodiment, only the color parameter, hue, is calculated. However, it is obvious that any color parameter or combination of color parameters could be used to identify or characterize a candidate object by its color content.

Figure 12A:
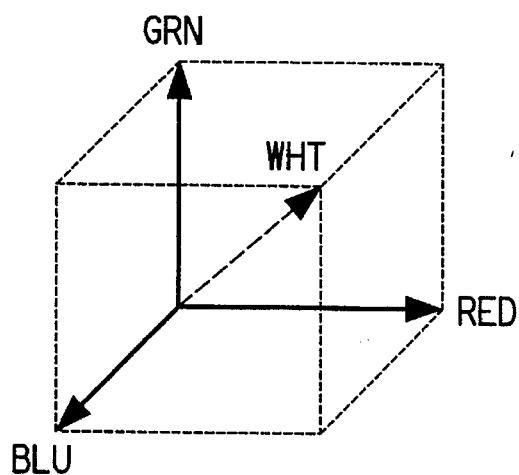
FIG. 12A is a schematic diagram showing a Red-Green-Blue color space.
Figure 12B:
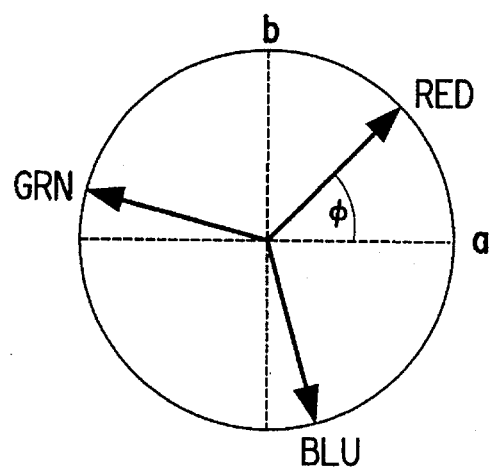
FIG. 12B is a schematic diagram showing a Red-Green-Blue hue circle.

The gray level of a point may be described using "RGB" information of standard color theory, with R designating red content, G designating green content, and B designating blue content. Shown in FIG. 12A is a description of RGB color space, and shown in FIG. 12B is a simplification of that space, known as the RGB hue circle. A simple way to calculate a relative hue parameter, known as hue angle, is illustrated with reference to FIGS. 12A and 12B. The value of the hue angle of an object can range from 0° –360°, as it is an angle θ in the RGB hue circle which is a measure of the relative admixture of red, green and blue colors. The angle, φ is a selected "offset angle" and is an adjustable parameter which can be optimized for a specific application. The angle φ is chosen such that for the problem of interest, none of the hue angles of the valid object come too close to 0° to 360°. The reason for avoiding the 0° (or 360°) angle is due to the discontinuity in the value of the hue angle for this angle. The hue angle of each interior point in an object can be calculated. The hue angle θ is calculated from the RGB hue circle using the following equations:

$$a = R\cos(\phi) + G\cos(120 + \phi) + B\cos(240 + \phi) \quad (1)$$

$$b = R\sin(\phi) + G\sin(120 + \phi) + B\sin(240 + \phi) \quad (2)$$

Where:

θ=hue angle =$\tan^{-1}(b/a)$

φ=adjustable offset angle, in degrees

R =gray level of a point in the image when the image is viewed through a red filter.

B =gray level of a point in the image when the image is viewed through a blue filter.

G =gray level of a point in the image when the image is viewed through a green filter.

a, b =projections of the R,G,B vector onto the hue circle.

The mean hue is derived by averaging the hue angle for each interior point over the object. The hue magnitude, which is the length of the hue angle vector in the RGB hue circle, is a measure of how much color an object has and is calculated as:

$$\text{Hue magnitude} = a^2 + b^2 \quad (3)$$

The mean hue angle and the hue magnitude can be used to determine the hue content of an object. These parameters used to characterize an object can be compared with predetermined attribute values in order to identify an object, as will be fully explained below.

The first method for determining exterior points is illustrated in more detail in FIGS. 13A–13D, which can be used by itself or as a second pass in conjunction with a first pass as described with respect to FIGS. 8A and 8B. As shown in block A of FIG. 13A, the first step of READ COLOR which is run for the first implementation of the first version of the first method is to set the current point to the first point of the perimeter buffer, and to set the FILLPREV status to false. FILLPREV is a status variable indicating the FILL status value of the point immediately preceding the current perimeter point. The status variable for FILLPREV and FILL is determined by the direction code vectors of the current points and the LUT's of FIGS. 8 and 9, depending on the direction of the trace. Decision diamond B then asks whether the current point is beyond the last point of the perimeter buffer. If so, the module is done as shown in block C. If the current point is not beyond the last point, then decision diamond D asks whether the FILLPREV status of the current point is false. If it is, then the current point is labeled as an interior point as shown in block E, and the module proceeds to decision diamond F, which asks if the current perimeter point is the first point on a given row. If FILLPREV is not equal to false, then the module proceeds directly to decision diamond F. If the current perimeter point is the first point on a given row, then the current exterior point is set to have the same row position coordinate value as the current point, and the column-position coordinate value is set to the column-position coordinate value of the current point minus a predetermined number, N, of pixels. This number, N, is the predetermined number as used above in the explanation of the designating step. The module then proceeds to decision diamond H of FIG. 13C. If the current perimeter point is not the first point on a given row, then the module proceeds to decision diamond L in FIG. 13B, as will be explained further below.

Figure 13B:
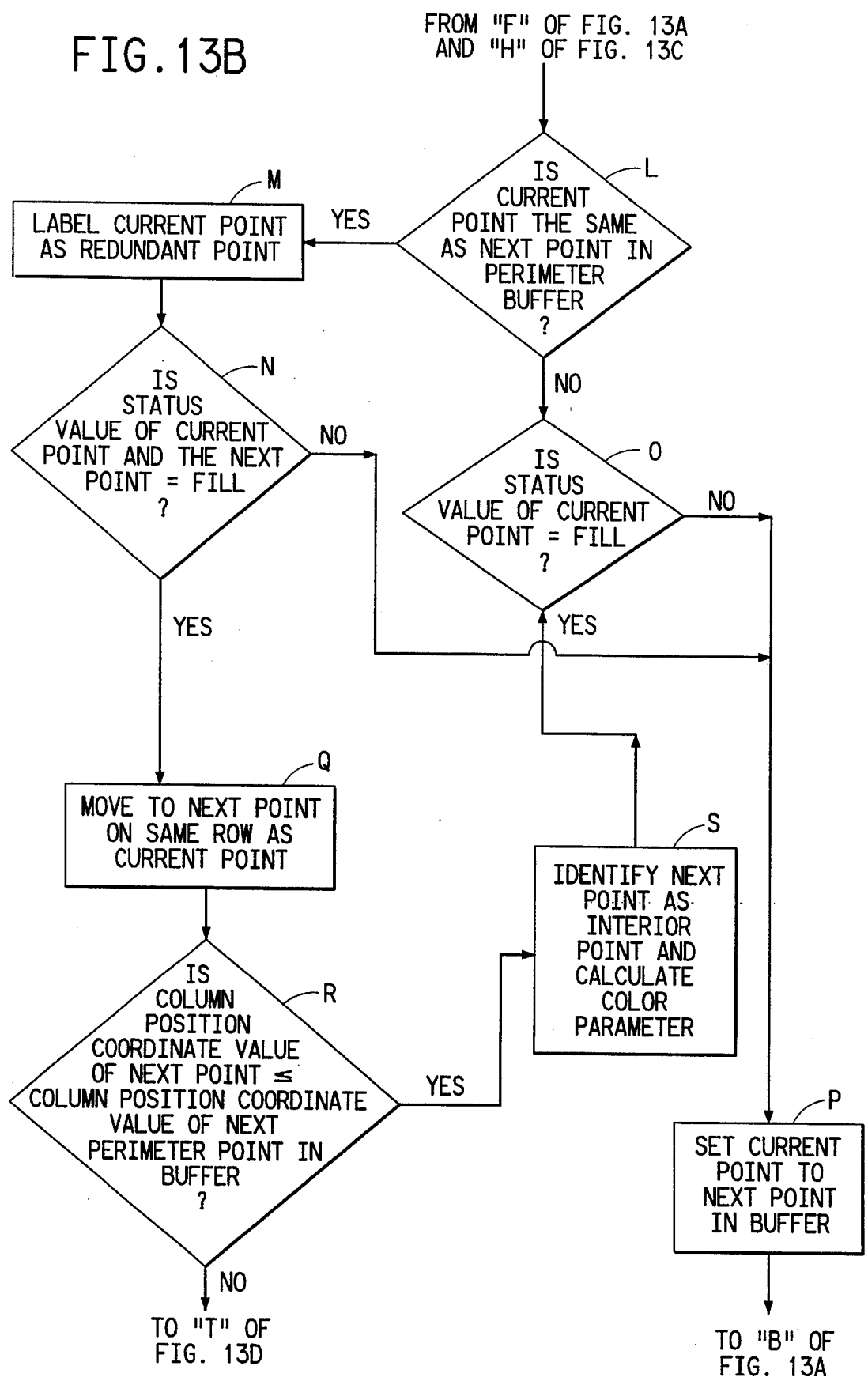

Decision diamond H of FIG. 13C asks whether the column-position coordinate value of the current exterior point is equal to the column-position coordinate value of the current point. If it is not, the decision diamond I of FIG. 13C asks whether the point corresponding to the current exterior point in the buffer image has a predetermined gray level value or whether the gray level value of the current exterior point equal to the border value. A border value is a different predetermined gray level value set at the time of searching the image to define the borders of the image of interest. If the answer to both of these questions is no, then the hue and the hue magnitude of the current exterior point are calculated as shown in block J, and the column-position coordinate value of the current exterior point is calculated as shown in block K. If the answer to one of the questions in decision diamond I is yes, then the module proceeds directly to block K, and the columnposition coordinate value of the current exterior point is calculated. The module then returns to decision diamond H, and the loop through diamonds H and I and blocks J and K continues until the column-position coordinate value of the current exterior point is equal to the column-position coordinate value of the current point. At this point, the module goes to decision diamond L of FIG. 13B.

Decision diamond L of FIG. 13B asks whether the current point is the same as the next point in the perimeter buffer. If it is, then the current point is labeled as a redundant point as shown in block M. Decision diamond N then asks whether the status value of the current point and the next point equal to fill. If it is not, then the current point is set to the next point in the buffer, and the module READ COLOR returns dto decision diamond B of FIG. 13A. The loop through B–P continues until the current point is beyond the last point in the perimeter buffer. Also, returning to decision diamond L, if the current point is not the same as the next point in the perimeter buffer, then the module proceeds to decision diamond O. If the status value of the current point is not equal to FILL, then the current point is set to the next point in the buffer, and the module returns to decision diamond B of FIG. 13A and the loop through B–P continues until the current point is beyond the last point in the perimeter buffer. At this point, the module is done as shown in block C. If the staus value of the current point and the next point is equal to fill, then the module proceeds to block Q and moves to the next point on the same row as the current point.

Returning to decision diamond 0, if the status value of the current point is equal to fill, then the module moves to the next point on the same row as the current point as shown in block Q. Decision diamond R as shown in FIG. 13B then asks whether the column-position coordinate value of the next point is less than or equal to the column-position coordinate value of the next perimeter point in the buffer. If it is, then the next point is identified as an interior point, and the color parameter is calculated as shown in block S of FIG. 13B. The module READ COLOR returns to block Q, and the loop through Q–S continues until the column-position coordinate value of the next point is greater than the column-position coordinate value of the next perimeter point in the buffer. If the column-position coordinate value of the next point is greater than the column-position coordinate value of the next perimeter point in the buffer, then the module proceeds to decision diamond T in FIG. 13D.

Figure 13D:
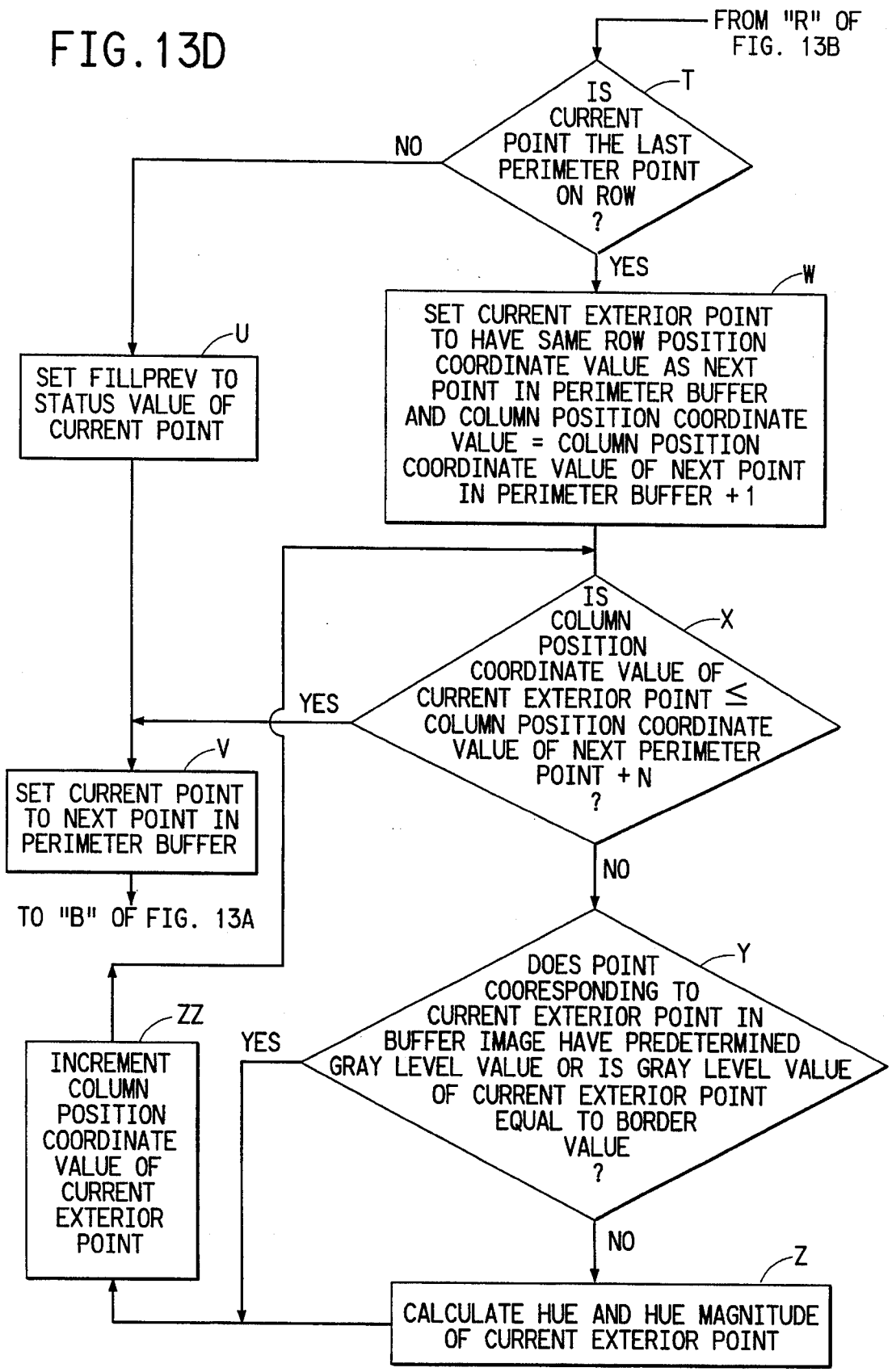

Decision diamond T of FIG. 13D asks whether the current point is the last perimeter point on the row. If it is not, then FILLPREV is set to the status value of the current point as shown in block U of FIG. 13D. The current point is then set to the next point in the perimeter buffer as shown in block V of FIG. 13D. The module then proceeds to decision diamond B of FIG. 13A, and the loop through B–V continues until the current point is beyond the last point, at which time the module is done as shown in block C. Returning to decision diamond T, if the current point is the last perimeter point on the row, then the current exterior point is set to have the same row position coordinate value as the next point in the perimeter buffer and a column-position coordinate value equal to the column-position coordinate value of the next point in the perimeter buffer plus one, as shown in block W. Then decision diamond X asks whether the column-position coordinate value of the current exterior point is less than or equal to the column-position coordinate value of the next perimeter point, plus some number, N as set forth above. If it is not, then decision diamond Y asks whether the point corresponding to the current exterior point in the buffer image has the predetermined gray level or whether the gray level value of the current exterior point is equal to the border value. If the answer to both of these questions is no, then the hue and the hue magnitude of the current exterior point is calculated as shown in block Z. The column-position coordinate value of the current exterior point is then incremented as shown in block ZZ. If the point corresponding to the current exterior point in the buffer image has the predetermined gray level or the gray level value of the current exterior point is equal to the border value, then the module proceeds directly to block ZZ and the column-position coordinate value of the current exterior point is incremented as shown in block ZZ. The loop through diamond X and Y and blocks Z and ZZ continues until the column-position coordinate value of the current exterior point is less than or equal to the column-position coordinate value of the next perimeter point plus some number, N, as set forth above. When this occurs, the current point is set to the next point in the permeter buffer, and the module returns to decision diamond B of FIG. 13A. The loop through B–ZZ continues until the current point is beyond the last point, at which time the module is done, as shown in block C.

Figure 14:
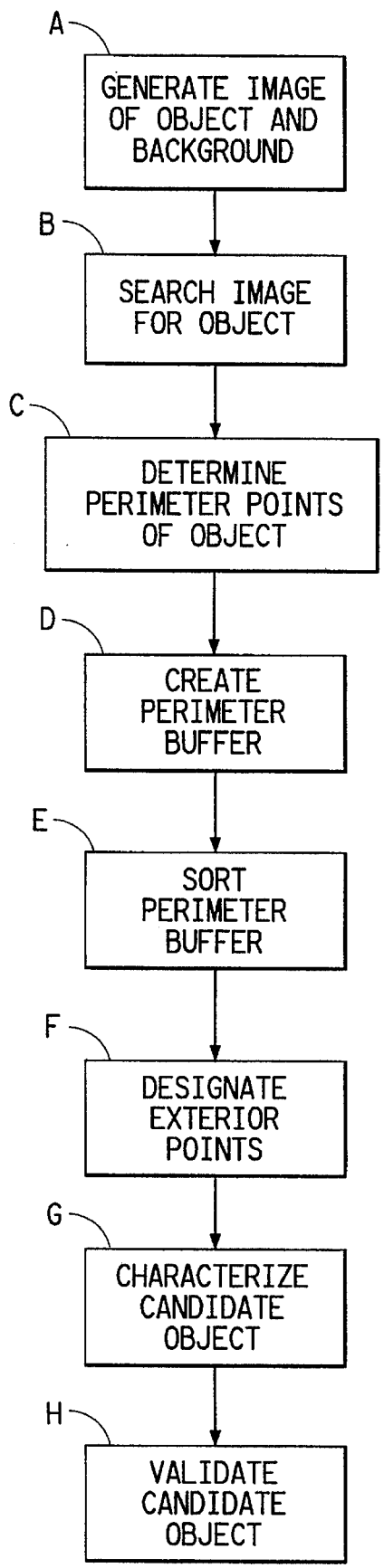
FIG. 14 is a block diagram showing the steps of the overall method of identifying a valid object which uses the first method for determining the exterior points of an object.

In accordance with a specific application of the first embodiment, there is provided a method of identifying at least one valid object having at least one valid object predetermined attribute value in a background. This specific application will hereinafter be referred to as the first identification method. The overall steps of this first identification method are shown in the block diagram of FIG. 14. The method comprises the step of generating an image of the object and the background as shown in block A of FIG. 14. The image of the object and the background is generated as described above with respect to the first embodiment.

The first identification method also comprises the step of searching the image for at least one candidate object using at least one automatically calculated threshold, wherein the candidate object has at least one candidate object attribute value. This step is shown in block B of FIG. 14. In this application, as in the first determining method, the entire object may be searched. However, in instances where it is known that an identifying feature, which may be a predetermined attribute value of an object in question lies in a particular portion of an object, the searching step may comprise searching only a portion of the object. The automatically calculated threshold may be determined in a variety of ways. For instance, the automatically calculated threshold is determined using the entropy derived from a histogram as described in Kapur et al., "A New Method for Gray-Level Picture Thresholding Using the Entropy of the Histogram", "Comp. Graphics and Image Proc.", 29, 1985, pp. 273–285, as will be described hereinbelow, or from a co-occurrence matrix as described in Pal and Pal in the article entitled "Entropic Thresholding", Signal Processing, Vol. 16, 1989, pp. 97–108.

The ability to automatically threshold an image in order to identify and validate candidate objects makes it possible to perform "on-line" image analysis for monitoring and controlling manufacturing and industrial processes. This capability would not be possible if a manual thresholding scheme were to be used, since the threshold (or thresholds) would have to be adjusted on an image-by-image basis. Performing unsupervised automatic object identification enables the use of image analysis techniques for a wide range of industrial applications. In environments where the background varies unpredictably, where many methods which do not use an automatically calculated threshold fail, the recursive calculation of multiple automatic thresholds, as described below, is particularly powerful.

The first identification method also comprises the step of determining the perimeter points of the candidate object. This step is shown in block C of FIG. 14. As described above, each perimeter point has a row-position coordinate value and a column-position coordinate value. The coordinate of each perimeter point of the object are determined by the module GET PERIM as described above with respect to FIG. 3. As described above, the step of determining the perimeter points may comprise tracing the object sequentially in the clockwise direction, or tracing the object sequentially in the counterclockwise direction.

The first identification method also comprises the step of creating a perimeter buffer. This step is shown in block D of FIG. 14 and is performed in the module, LOAD BUFFER, as described above with respect to FIGS. 6A and 6B.

The first identification method also comprises the step of sorting the perimeter points in the perimeter buffer first by row and then by column to create a row-column sorted perimeter buffer. This step is shown in block E of FIG. 14. The sorting step is performed as described above for the first method for tracing the object in either the clockwise or the counterclockwise direction.

The first identification method also comprises the step of designating as the exterior points of the object all the points on each row which are a predetermined number, N, of pixels before the perimeter point having the lowest column-position coordinate value and a predetermined number, M, of pixels beyond the perimeter point having the highest column-position coordinate value for each respective row. This step is shown in block F of FIG. 14 and is performed in the module READ COLOR as described above with respect to the flow chart in FIGS. 13A–13D. In a preferred embodiment, M=N, although M may be a different value than N as discussed above.

The method of identifying at least one valid object having at least one valid object predetermined attribute value also comprises the step of characterizing the candidate object by the candidate object attribute value. This step is shown in block G of FIG. 14. The step of characterizing the candidate object by the candidate object attribute value may include the sub-steps of determining the gray level value of each exterior point and characterizing the object by using the gray level values of the exterior points. In another embodiment of the method for identifying a valid object using the first method, the characterizing step may comprise determining the texture of the object and/or of the contour region around the object. Alternatively, or in addition, the characterizing step may comprise determining the color of the object and/or of the contour region around the object. Alternatively, or in addition, the characterizing step may comprise determining any patterns which are present in the object and/or in the contour region around the object.

The first identification method also comprises the step of validating the candidate object having the valid object predetermined attribute value to identify the valid object. This step is shown in block H of FIG. 14. The validating step includes the sub-steps of calculating the candidate object attribute values and comparing the candidate object attribute values to the valid object predetermined attribute values to validate candidate objects. The calculating sub-step may further include the sub-step of storing the candidate object attribute values. The validating step is performed by a module, COL FILT, as shown and described with respect to FIG. 15. In the preferred embodiment of the identification method which uses the first method for determining exterior points, COL FILT uses only size and color as valid object predetermined attributes. In general, other attributes may be used for the valid object predetermined attributes.

The validation step is performed by the module COL FILT for either inhomogeneous or inhomogeneous objects. The filter in step for filtering inhomogenous objects comprises three conditions under which objects should be deleted. The first condition deletes objects when an object has an area less than a predetermined minimum area. The second condition deletes objects when objects when the object has a mean hue angle less than a predetermined minimum and a hue magnitude greater than a predetermined minimum. The third condition deletes objects when an object has a mean hue angle greater than a predetermined maximum and has a hue magnitude greater than a predetermined minimum. Hue angle and hue magnitude are calculated as described above in equations (1) and (2) above.

Figure 15:
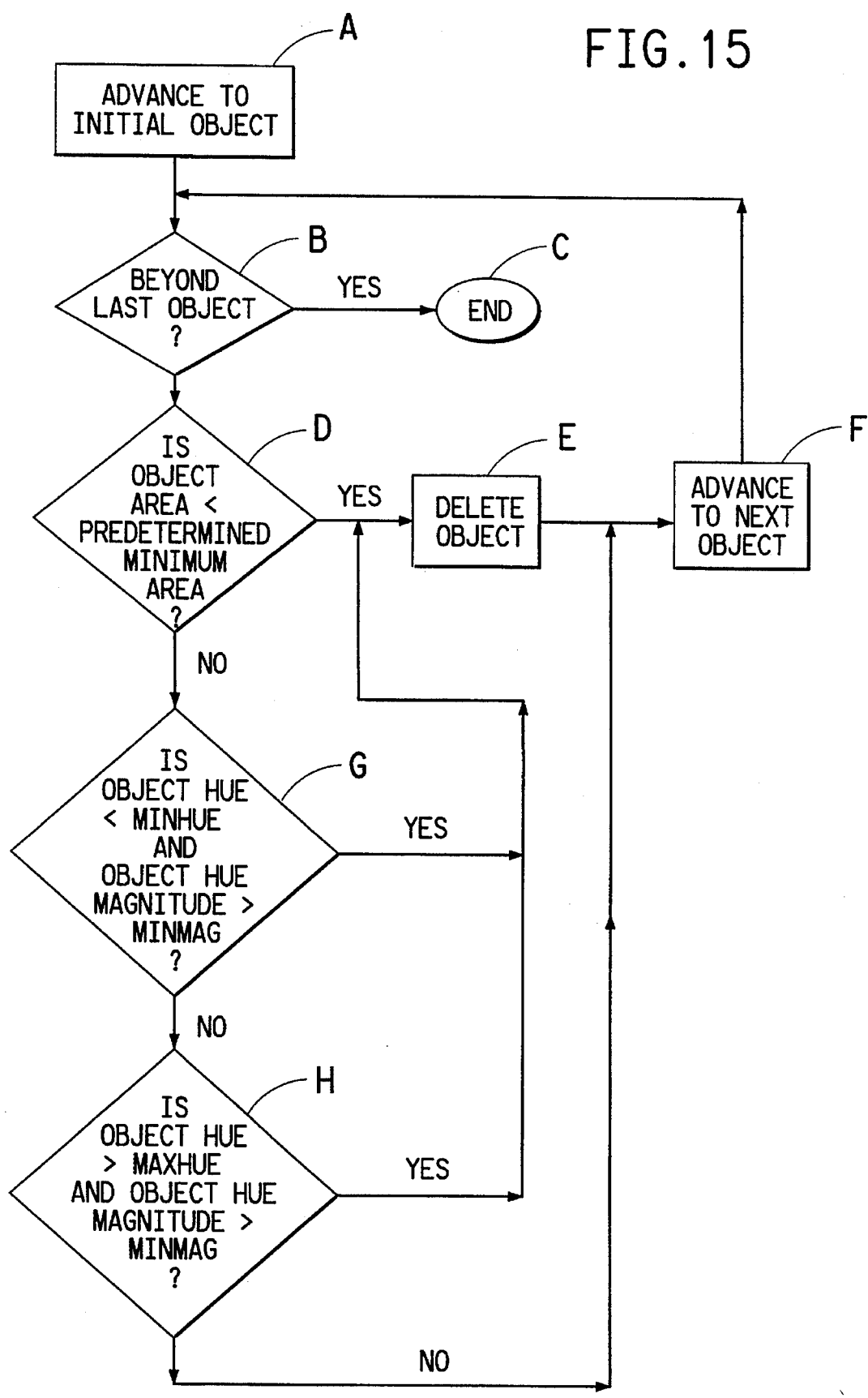
FIG. 15 is a flow chart showing the steps of a module, COL FILT, which is used to filter objects.

As shown in block A of FIG. 15, the first step of COL FILT for filtering objects is to advance to the initial object. Decision diamond B then asks whether COL FILT is beyond the last object. If it is, then the module is done as shown in block C. If it is not, then decision diamond D asks whether the object has an area greater than a predetermined minimum area. If the answer is yes, then the object is deleted as shown in block E, and the module advances to the next object as shown in block F. Decision diamond B then asks whether COL FILT is beyond the last object, and the loop through B–F continues until the object area is not less than the predetermined minimum area. At this point, decision diamond G asks whether the mean hue angle of the object is less than a predetermined minimum value, MINHUE, and whether the hue magnitude of the object is greater than a predetermined minimum value, MINMAG. If the answer to both these questions is yes, the object is deleted as shown in block E, and the module is advanced to the next object as shown in block F. The loop through A and B continues until COL FILT is beyond the last object, at which point it is done as shown in block C. If COL FILT is not beyond the last object, the loop through A - G continues until the object hue is greater than or equal to MINHUE, or the object hue magnitude is less than or equal to MINMAG. Then decision diamond H asks whether the mean hue angle of the object is greater than a predetermined maximum value, MAXHUE and whether the hue magnitude of the object is greater than the predetermined minimum value, MINMAG. If the answer to both these questions is yes, the object is deleted as shown in block E, and the module is advanced to the next object as shown in block F. The loop through A and B continues until COL FILT is beyond the last object, at which point it is done as shown in block C. If COL FILT is not beyond the last object, the loop through A–H continues until the object hue magnitude is less than or equal to the predetermined maximum value, MAXHUE or the object hue magnitude is less than or equal to the predetermined minimum value, MINMAG. If the answer to either of these questions is no, the object is retained, and the module advances to the next object as shown in block F. The loop through B–H continues until the module is beyond the last object. The module is then done as shown in block C.

The first identification method of the present invention employs a driver and a kernel for validating candidate objects. The driver stores the attribute values of the valid object, where each value represents the definition of a valid object, e.g., color, edge contrast, area, shape, etc. The driver of the present invention is specific to a given application. In an object-oriented environment, it is straight-forward in many instances to describe an object via a list of attributes such as size, shape, color, etc. For more complex objects, where a simple parametric description might not be possible, one could use a neural network in the driver to identify the object. Parameters derived from the candidate object can be fed into the neural network, which has been trained to recognize specific objects. At this point, the architecture of the present invention begins to resemble a neural vision architecture where there is a feedback loop between the brain and the eye. In the present invention, a high-order driver is intertwined with a lower-order kernel. In this case, a more complex description of the object is used to drive the searching process, which in turn identifies further candidate objects.

The driver drives the kernel. The kernel performs several functions. It automatically calculates an entropically selected threshold gray level value, searches the image and calculates the attribute values for a candidate object. In addition, it performs a validity check on candidate objects by comparing the attribute values of the candidate objects with the predetermined attribute values for the valid objects, which, as noted above, are contained in the driver. It also performs a redundancy check to prevent multiple identification of a valid object.

The first identification method may further include the step of determining the interior points of the object as described in FIGS. 8A and 8B. This may be done in any of the ways described above with respect to the first method. When the interior points are determined, the characterizing step may include the sub-steps of determining the gray level value of one or more exterior points and the gray level value of one or more interior points as described above, and characterizing the object by the relative normalized difference between the gray level values of the exterior and interior points. The difference is given by the following equation:

$$(I_1 - E_1)/(I_1 + E_1) \tag{4}$$

This feature makes the first identification method of the present invention able to do adaptive classification. In situations where there may be shading or other anomalies across the image, adaptive classification is a way of making the analysis independent of variations in imaging conditions, such as lighting, positioning, electronic amplification, etc.

Figure 16:
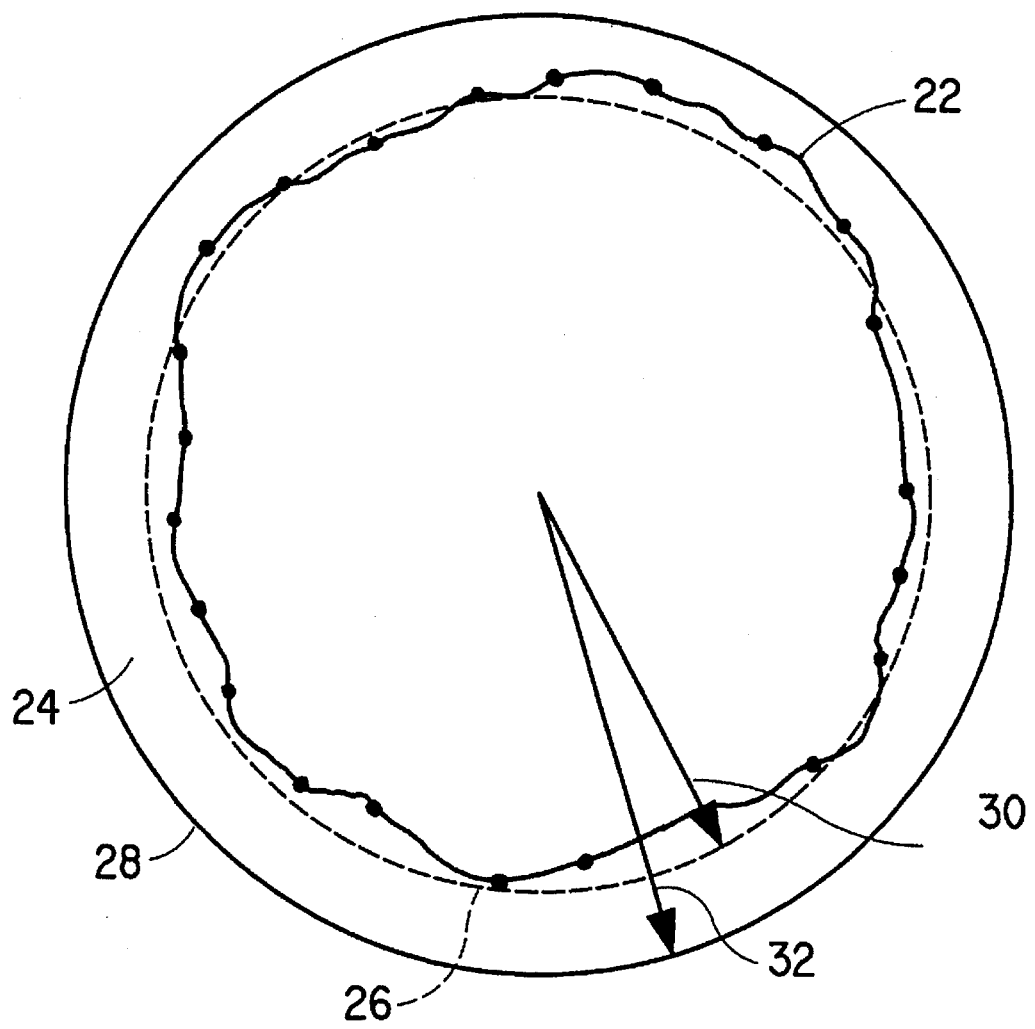
FIG. 16 is a schematic diagram of an object and a contour region for which the method of the second embodiment are used to determine the exterior points of the object.
Figure 17:
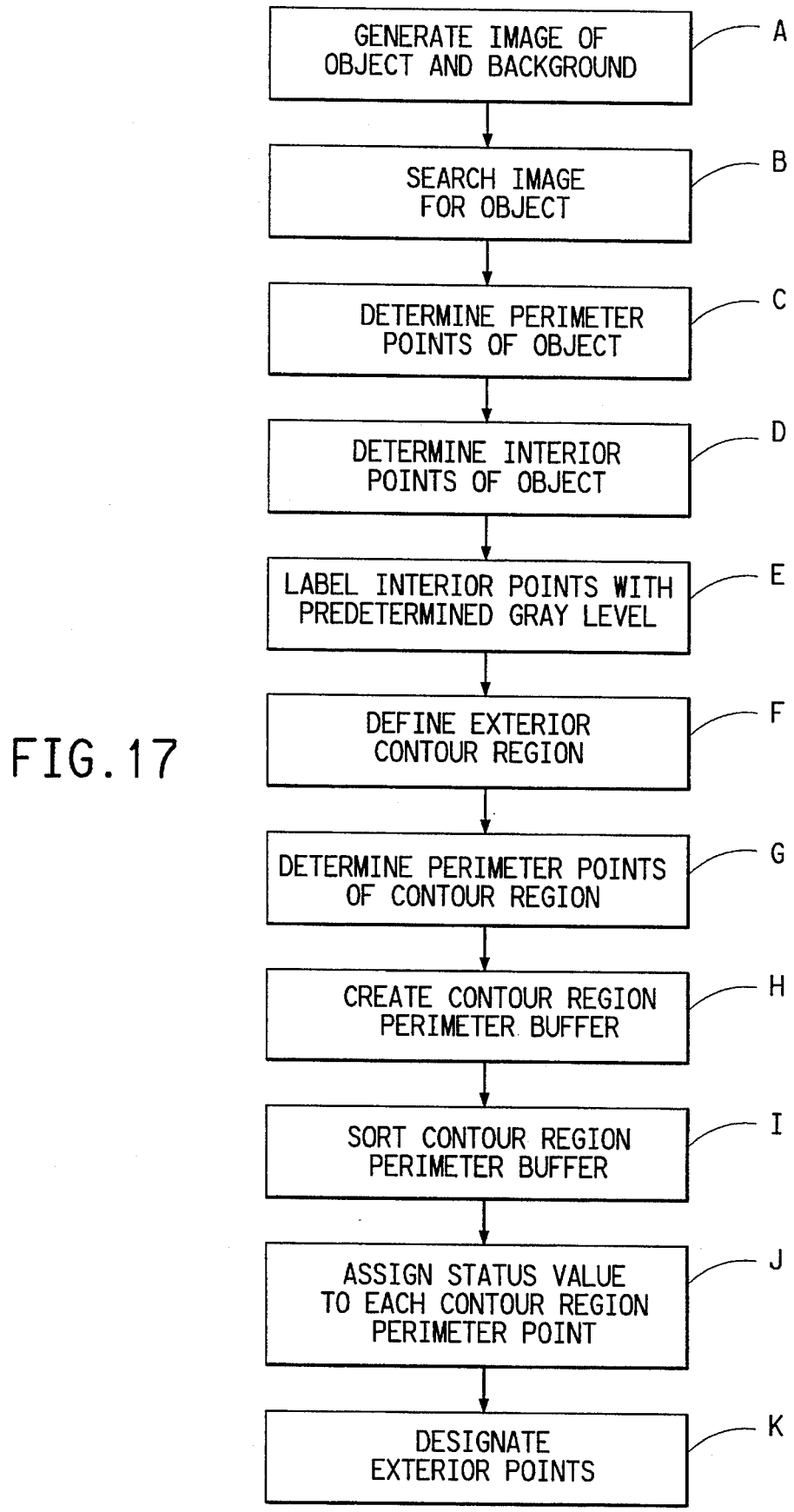
FIG. 17 is a block diagram showing the steps of the overall method of determining the exterior points of an object in a background in accordance with the second embodiment of the present invention.

In accordance with a second embodiment of the present invention, there is provided a second method for determining the exterior points of an object in a background. This method employs a predetermined shape, such as a circle, such as 28, drawn around object 22 as shown in FIG. 16. The steps of this method are shown generally in the block diagram of FIG. 17. The second method comprises the step of generating an image of the object and the background. This step is shown in block A of FIG. 17. This step may be performed as described above with respect to the first method.

The second method of determining the exterior points of an object also comprises the step of searching the image for the object. This step is shown in block B of FIG. 17. This step may be performed as described above with respect to the first method.

The second method of determining the exterior points of an object also comprises the step of determining the perimeter points of the object. This step is shown in block C of FIG. 17. The perimeter points are determined in the module GET PERIM as described above with respect to FIG. 2 for the first method.

The second method of determining the exterior points of an object also comprises the step of determining the interior points of the object. This step is shown in block D of FIG. 17. This determination of interior points may be done by determining the status variable of a perimeter point and from that variable designating the interior points on the same line segment as described above with respect to FIGS. 8A and 8B or by any other method for determining interior points, such as that described by Chang and Leu, supra. Redundant perimeter points may be checked for as described above with respect to FIGS. 8A and 8B.

The second method of determining the exterior points of an object also comprises the step of labeling the interior points of the object with a predetermined gray level. This step is shown in block E of FIG. 17 and may be done in the module READ COLOR as described above with respect to FIGS. 8A and 8B.

The second method of determining the exterior points of an object also comprises the step of defining an exterior contour region for each object. This step is shown in block F of FIG. 17. The exterior contour region is designated by reference numeral 24 in FIGS. 11 and 16. The step of defining a contour region may include the sub-steps of assigning a first predetermined shape to the object and assigning a second predetermined shape to the object. In the preferred embodiment, the first predetermined shape is a circle, the outer contour of which is approximated by a dashed line 26 in FIG. 16, and the second predetermined shape is a circle, the circumference of which is shown at 28 in FIG. 16. As can be seen from FIG. 16, the second predetermined shape is assigned to the area including the exterior contour region and the object.

Figure 18:
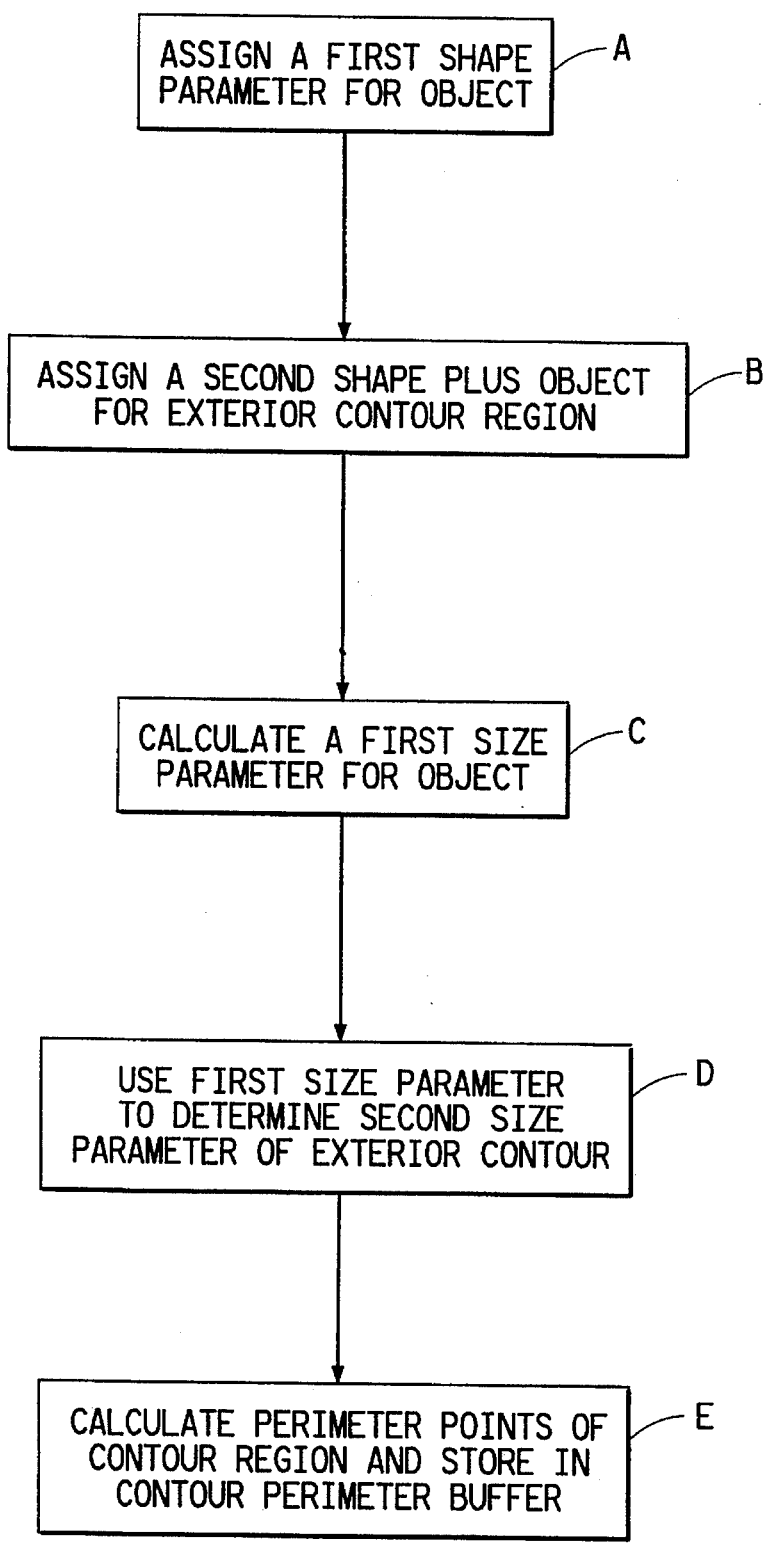
FIG. 18 is a flow chart showing the steps of a module CALC CIRCLE, which creates a contour region perimeter buffer.

The sub-steps of the step of defining an exterior contour region are shown in the flow chart of FIG. 18. The sub-step of creating a contour region perimeter buffer is performed in a module, CALC CIRCLE, and is illustrated in the flow chart of FIG. 18. As shown in block A of FIG. 18, the first step of creating a contour region perimeter buffer is to assign a first shape to the object. Often this shape approximates the shape of the object. The second step as shown in block B of FIG. 18 is to assign a second shape to the area including the exterior contour region plus the object. The second shape is larger than the first shape and encompasses the object. The second shape may be the same general shape as the first shape, or it may be different. As shown in block C of FIG. 18, the next step to create a contour region perimeter buffer is to calculate a first size parameter for the object. The second size parameter for the second predetermined shape is then calculated as shown in block D of FIG. 18. The second size parameter is larger than the first size parameter such that the second shape encompasses the object. It should be noted that it is within the scope of the present invention that the first and second predetermined shapes are not always the same. In one embodiment of the second method, the first size parameter is a first equivalent radius 30 as shown in FIG. 16, and the second size parameter is a second equivalent radius 32 as shown in FIG. 16. The first equivalent radius of the first predetermined shape is determined from the area of the object. When the first predetermined shape is a circle, the area is equal to $\Pi r^2$, where r is the first equivalent radius. The second equivalent radius of the second predetermined shape, which may be a circle, is determined from the area including the exterior contour region plus the object. It should also be noted that it is within the scope of the present invention that the conditions on the first and second predetermined shapes and size parameters are independent. The step of calculating a first size parameter may include using the first predetermined shape factor or may include the sub-steps of determining the four extremum points of the object, calculating the maximum distance between the extremum points of the object and setting the first size parameter to a diameter which is equal to the maximum distance between the extremum points of the object. As shown in block D of FIG. 18, the first size parameter is used to determine the second size parameter of the exterior contour region. As shown in block E of FIG. 18, the perimeter points of the contour region are calculated using the second size parameter and the second shape and are stored in the perimeter buffer.

The step of defining an exterior contour region for each object comprises the sub-step of determining the contour region perimeter points of the contour region. This is done as described above with respect to FIG. 3 in the module GET PERIM.

The step of defining an exterior contour region for each object also comprises the sub-step of creating a contour region perimeter buffer. As described above with respect to the first method, the contour perimeter buffer comprises the contour region perimeter points. Each contour region perimeter point has a row-position coordinate value, a column-position coordinate value and a direction code vector. The direction code vector comprises a first and a second direction code value for each contour region perimeter point. The first direction code value describes the relationship of each respective contour region perimeter point to the next contour region perimeter point and the second direction code value describes the relationship of each respective contour region perimeter point to the previous contour region perimeter point.

The step of defining an exterior contour region for the object also comprises the sub-step of sorting the contour region perimeter points in the contour region perimeter buffer in a predetermined order to create a sorted contour region perimeter buffer. This sorting step may be performed for tracing the object in either the clockwise or the counterclockwise direction by row and then by column, or by column and then by row as described above with respect to the first method.

Figure 19B:
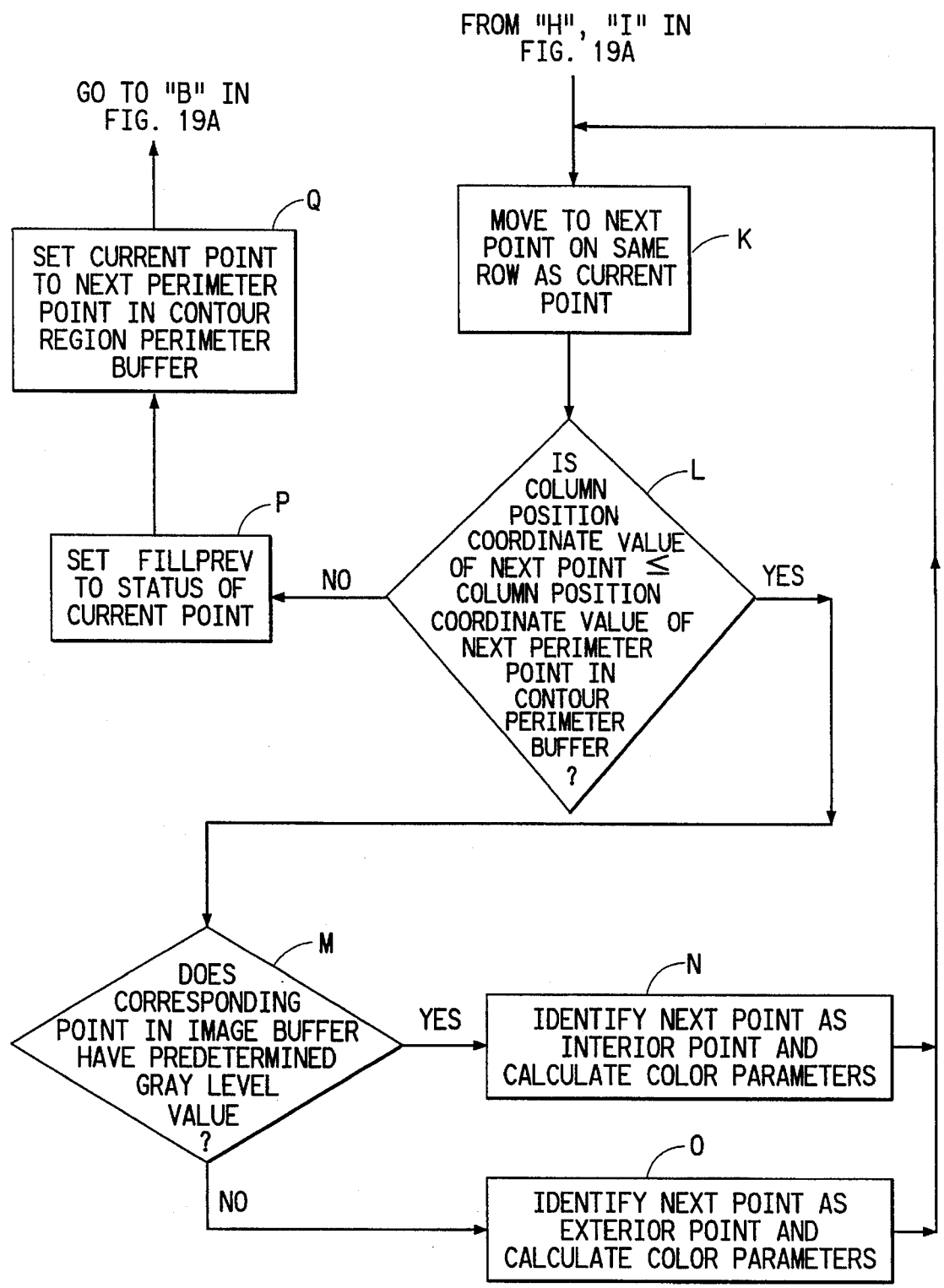

The step of defining an exterior contour region for the object also comprises the sub-step of assigning to each contour region perimeter point in the sorted perimeter buffer a status variable having one of a first and a second value. In a preferred embodiment, this status variable is a first status variable FILL. A second status variable, FILLPREV, is also assigned, as will be explained below. The value of the first status variable and of the second status variable is determined by the first and second direction code values. This is done in the module READ COLOR as shown in FIGS. 19A and 19B and as described below.

The step of defining an exterior contour region for the object also comprises the sub-step of designating the exterior points of the object. This step is shown in block K of FIG. 17 and is performed in the module READ COLOR as described below and as shown in FIGS. 19A and 19B. Each point on the same line segment as the contour region perimeter point being examined and lying between the examined contour region perimeter point and the next contour region perimeter point in the sorted perimeter buffer is designated as an exterior point if the examined contour region perimeter point is assigned the first value of the status variable, and if each designated exterior point has a value other than the predetermined gray level value.

As shown in block A of FIG. 19A, the first step of READ COLOR, which is run for the first implementation of the second method, is to set the current point to the first point of the contour region perimeter buffer and to set the FILLPREV status to false. Decision diamond B then asks whether the current point is beyond the last point of the contour region perimeter buffer. If so, the module is done as shown in block C. If the current point is not beyond the last point, then decision diamond D asks whether FILLPREV is false. If it is, then the current point is labeled as an exterior point as shown in block E. If it is not, or after the current point is labeled as an exterior point, decision diamond F then asks whether the current point is the same point as the next point in the contour region perimeter buffer. If it is, then the current point is labeled as redundant as shown in block G. Decision diamond I then asks if the status value of the current point and the next point is equal to FILL. The status variable for FILLPREV and FILL is determined by the direction code vectors of the current points and the LUT's of FIGS. 8 and 9, depending on the direction of the trace. If the answer is yes, then READ COLOR moves to the next point on the same row as the current point as shown in block K. If the answer to this question is no, the current point is set to the next point in the buffer as shown in block J, and the module returns to decision diamond B. The loop through B–G continues until the current point is beyond the last point, at which time the module is done, as shown in block C.

Returning to decision diamond F, if the current point is not the same point as the next point in the contour region perimeter buffer, then decision diamond H asks if the status value of the current point is equal to FILL. If it is not, then the current point is set to the next point in the buffer as shown in block J and the module returns to decision diamond B. The loop through B and D–J continues until the current point is beyond the last point, at which time the module is done, as shown in block C. Returning to decision diamond H, if the status value of the current point is equal to FILL, then the module proceeds to block K in FIG. 19B. Block K of FIG. 19B indicates that the module moves to the next point on the same row as the current point. Similarly, returning to decision diamond I, if the status value of the current point and the next point is equal to FILL, then the module proceeds to block K of FIG. 19B.

Decision diamond L then asks whether the column-position coordinate value of the next point is less than or equal to the column-position coordinate value of the next perimeter point in the contour region perimeter buffer. If it is, then decision diamond M asks whether the corresponding point in the image buffer has the predetermined gray level value. If it does, the the next point is identified as an interior point and the color parameters are calculated as shown in block N. If the corresponding point in the image buffer does not have the predetermined gray level value, then the next point is identified as an exterior point and the color parameter are calculated as shown in block 0. After the next point is identified as either an interior point or an exterior point as shown in blocks N and 0, respectively, the loop through block K and diamond L continues until the column-coordinate position value of the next point is greater than the column-coordinate position value of the next perimeter point in the contour region perimeter buffer. At this time, FILLPREV is set to the status value of the current point as shown in block P, and the current point is set to the next perimeter point in the contour region perimeter buffer as shown in block Q. The module then returns to decision diamond B in FIG. 19A, and the loop through B–Q continues until the current point is beyond the last point. At this time, the module is done as shown in block C.

The second method for determining the exterior points of an object may further include the steps of determining the gray level value of each exterior point and characterizing the object by using the gray level values of the exterior points. This is performed in the module READ COLOR as described above with respect to FIGS. 19A and 19B. The characterizing sub-step may comprise determining the color of the exterior points of the object. This feature makes the present invention particularly useful in characterizing listeria. As described above with respect to the first method, when color is used to characterize the object, at least one color parameter for at least one exterior or interior point of the object is calculated. Alternatively, or in addition, the characterizing step may comprise determining the texture of the object or the exterior contour of the object. Alternatively, or in addition, the characterizing step may comprise determining any patterns which are present in the object or in the exterior contour of the object.

Figure 20:
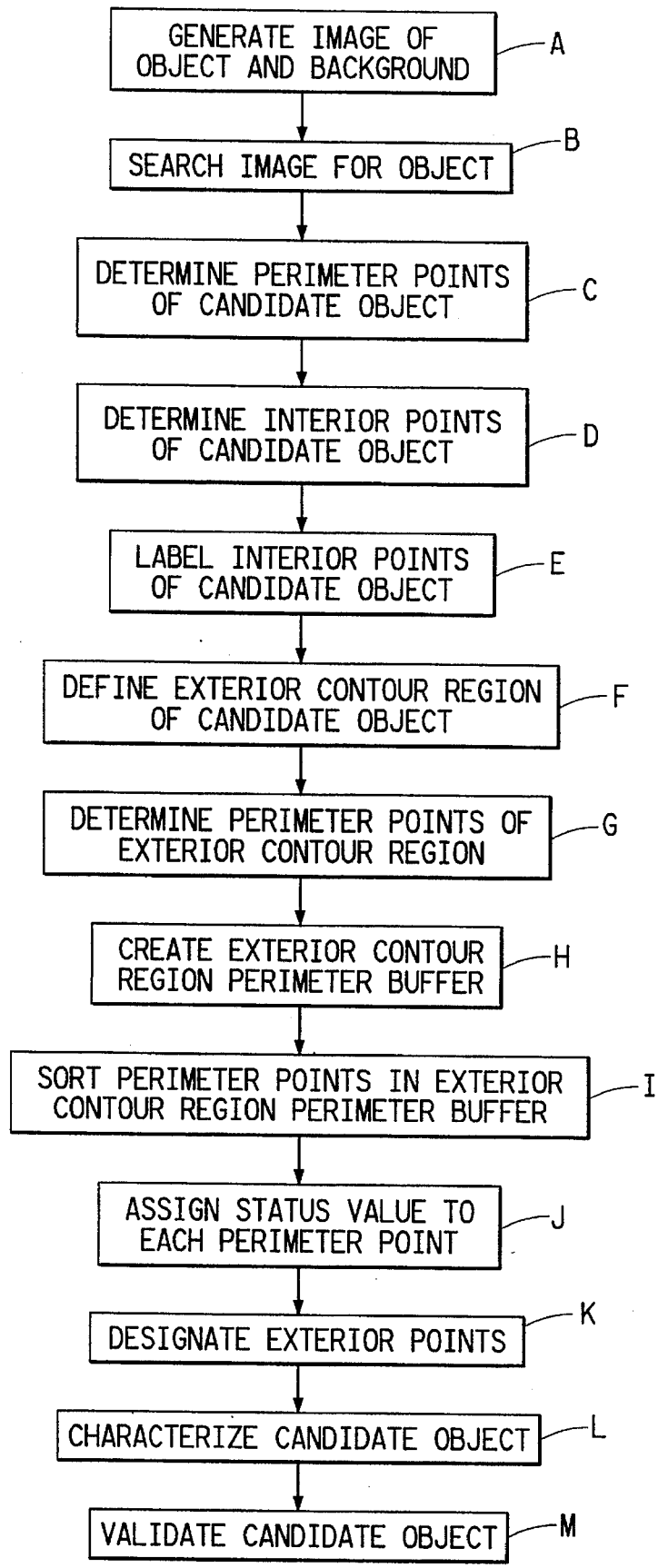
FIG. 20 is a block diagram showing the steps of the overall method of identifying a valid object in accordance which uses the second method for determining the exterior points of the object.

In accordance with the present invention, there is provided a second method of identifying at least one valid object having at least one valid object predetermined attribute value in a background which uses the second method for determining the exterior points of an object. This method will be referred to generally as the second identification method. The steps of this second method are shown generally in FIG. 20. The second identification method comprises the step of generating an image of the object and the background and searching the image for at least one candidate object using at least one automatically calculated threshold, where the candidate object has at least one candidate object attribute value. These steps are shown in blocks A and B, respectively of FIG. 20 and are performed as described above with respect to the first identification method.

The second identification method also comprises the step of determining the perimeter points of the candidate object. This step is shown in block C of FIG. 20 and is performed in the module GET PERIM as described above with respect to FIG. 3 as illustrated for the first method.

The second identification method also comprises the step of determining the interior points of the candidate object. This step is shown in block D of FIG. 20. This determination of interior points may be done by determining the status variable of the perimeter points and from each respective status variable, designating interior points on the same line segment in the module WRITE BUF as described above for the first method with respect to FIGS. 8A and 8B, or by any other method for determining interior points, such as Chang and Leu, supra.

The second identification method also comprises the step of labeling the interior points of the candidate object with a predetermined gray level value. This step is shown in block E of FIG. 20 and is performed in the module READ COLOR as described above with respect to FIGS. 8A and 8B.

The second identification method also comprises the step of defining an exterior contour region for each candidate object. This step is shown in block F of FIG. 20. This exterior contour region is shown at 24 in FIGS. 11 and 16. The step of defining an exterior contour region for each object comprises the sub-step of determining the perimeter points of the contour region. This step is shown in block G of FIG. 20. This is done as described above with respect to the first method.

The step of defining an exterior contour region for each object also comprises the sub-step of creating a contour region perimeter buffer. This step is shown in block H of FIG. 20. As described above with respect to the first method, the contour perimeter buffer comprises the contour region perimeter points. Each contour region perimeter point has a row-position coordinate value, a column-position coordinate value and a direction code vector. The direction code vector comprises a first and a second direction code value for each contour region perimeter point. The first direction code value describes the relationship of each respective contour region perimeter point to the next contour region perimeter point and the second direction code value describes the relationship of each respective contour region perimeter point to the previous contour region perimeter point.

The step of defining an exterior contour region for the object also comprises the sub-step of sorting the contour region perimeter points in the contour region perimeter buffer in a predetermined order to create a sorted contour region perimeter buffer. This step is shown in block I of FIG. 20. This sorting step may be performed for tracing the object in either the clockwise or the counterclockwise direction by row and then by column, or by column and then by row as described above with respect to the first method.

The step of defining an exterior contour region for the object also comprises the sub-step of assigning to each contour region perimeter point in the sorted perimeter buffer a status variable having one of a first and a second value. This step is shown in block J of FIG. 20. The value of the first statue variable is determined by the first and second direction code values. This is done in the same manner as in the step of determining the interior points as described above with respect to the first method.

The step of defining an exterior contour region for the object also comprises the sub-step of designating the exterior points of the object. This step is shown in block K of FIG. 20 and is performed in the module READ COLOR as shown in FIGS. 19A and 19B. Each point on the same line segment as the contour region perimeter point being examined and lying between the examined contour region perimeter point and the next contour region perimeter point in the sorted perimeter buffer and whose corresponding point in the buffer image does not have the predetermined gray level value is designated as an exterior point. In this step, the examined contour region perimeter point is assigned the first value of the status variable.

The second identification method also comprises the step of characterizing the candidate object by the candidate object attribute value. This step is shown in block L of FIG. 20. The step of characterizing the candidate object by the candidate object attribute value may include the sub-steps of determining the gray level value of each exterior point and characterizing the object by using the gray level values of the exterior points. When characterization is performed by determining the gray level values, the characterizing step may include the sub-steps of determining the gray level value of each exterior point and the gray level value of each interior point and characterizing the object by the relative difference between the gray level values of the exterior and the interior points. This relative difference is given by the following equation:

$$(I_1 - E_1)/(I_1 + E_1) \tag{5}$$

In another embodiment of the second identification method, as in the first identification method, the characterizing step may comprise determining the texture of the object and/or the contour region around the object. Alternatively, or in addition, the characterizing step may comprise determining the color of the object and/or the contour region around the object. Alternatively, or in addition, the characterizing step may comprise determining any patterns which are present in the object and/or the contour region around the object. When color is used to as a predetermined attribute value to validate the object, the second identification method may include the sub-step of calculating at least one color parameter for at least one interior point of the candidate object.

The second identification method also comprises the step of validating the candidate object having the valid object predetermined attribute value to identify the valid object. This step is shown in block M of FIG. 20. The validating step includes the sub-steps of calculating the candidate object attribute values and comparing the candidate object attribute values to the valid object predetermined attribute values to validate candidate objects. The calculating sub-step may further include the sub-step of storing the candidate object attribute values. The validating step is performed by the module, COL FILT, as shown and described above with respect to FIG. 15. In the preferred embodiment of the identification method which uses the second method for determining exterior points, COL FILT uses only size and color as valid object predetermined attribute values. In general, other attribute values may be used for the valid object predetermined attribute values.

In a specific application of either the first or second methods for determining exterior points, the concept of entropic thresholding is employed for searching the image. The concept of entropy in information theory for signal processing was first proposed by Shannon in an article entitled "A Mathematical Theory of Communication", Bell System Technology J., Vol. 27, July 1948, pp. 379–423. Shannon showed that the entropy function:

$$H(p_1, p_2, \ldots, p_n) = -\lambda \sum_{k=1}^{n} p_k \ln p_k \quad (6)$$

uniquely satisfies the following three properties:

(a) $H(p_1, p_2, \ldots p_n)$ is a maximum for: $p_k = 1/n$ for $k=1, \ldots n$;

(b) $H(AB) = H(A) + H_A(B)$, where A and B are two finite partitions and $H_A(B)$ is the conditional entropy of partition B given partition A;

$$H(p_1, p_2, \ldots p_n, 0) = H(p_1, p_2, \ldots p_n) \quad (7)$$

In addition, $H_{max}(1/n, \ldots 1/n) = \ln n$. \quad (8)

The idea of using entropy to analyze a gray level histogram of an image was originally proposed by Pun in an article entitled "Entropic Thresholding, a New Approach", Comp. Graphics and Image Proc., Vol. 16, 1981, pp. 210–239. The entropy analysis of Pun was further refined by Kapur et al. in an article entitled "A New Method for Grey-Level Picture Thresholding Using the Entropy of the Histogram", Comp. Graphics and Image. Proc. 29, 1985, pp. 273–285. As shown by Pun and refined by Kapur, the concept of entropy can be extended to two dimensions if the gray level histogram of the image is used to define a probability distribution:

$$P_s = f_s/N \text{ for } s=1, \ldots, N_{gray} \quad (9)$$

where $f_s$=frequency of gray level s

N=#pixels in image $N_{gray}$=#gray levels

It follows that the entropy function of a histogram describing an image with a uniform gray level distribution is at a maximum. The more peaks in the distribution, the lower the entropy.

Figure 21:
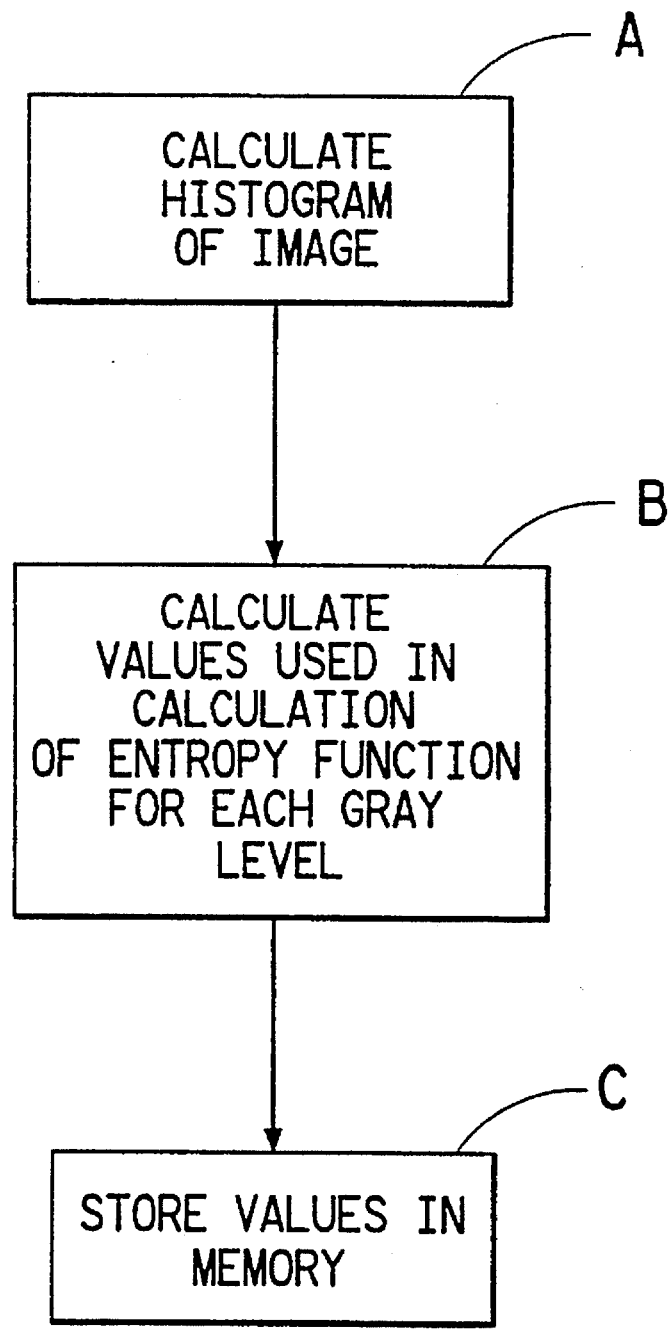
FIG. 21 is a flow chart showing the steps of a module, HISTOGRAM, which is used to generate a gray level histogram of an image.

In this specific application, where entropic thresholding is employed, the searching step includes the sub-steps of generating a gray level histogram of the image, where the gray level histogram has an entropy function and entropically selecting a threshold gray level such that the entropy function of the histogram is maximized. A module, HISTOGRAM, is used to generate the gray level histogram of the region of interest of the image. The steps for generating the gray level histogram are shown in the flow chart of FIG. 21. As shown in block A of FIG. 21, HISTOGRAM first calculates a histogram of the region of interest of the image. It then calculates the values to be used subsequently in the calculation of the entropy function, Hs, for each gray level, s, as shown in block B of FIG. 21. The results of this calculation are stored in memory as shown in block C. This ensures that for subsequent calculations of the entropic threshold gray level, only a simple look-up operation is required.

Figure 22:
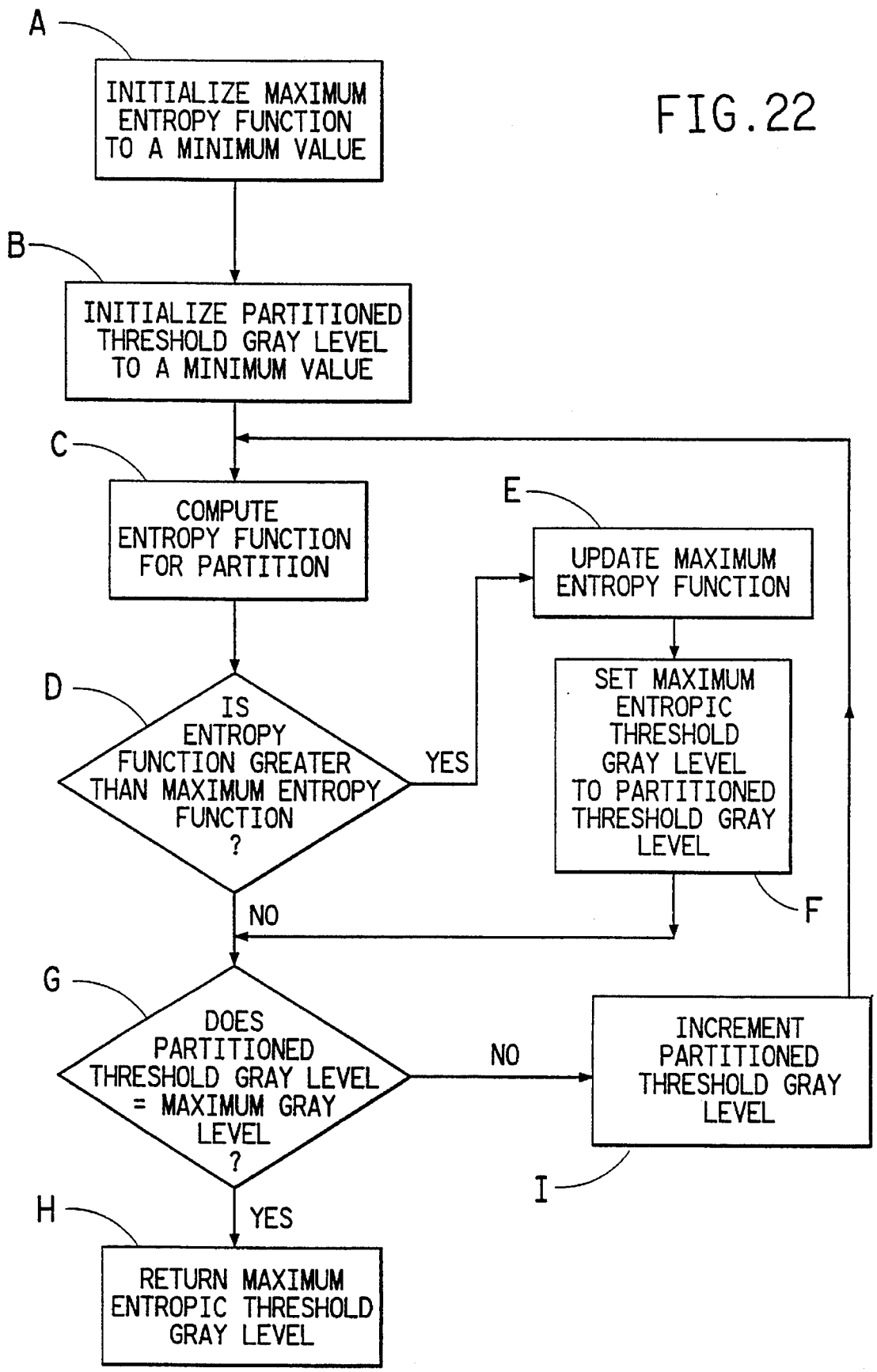
FIG. 22 is a flow chart showing the steps of a module, ENTROPY, which is used to entropically select a threshold gray level such that the entropy function of the histogram is maximized according to a specific implementation of either the first or the second embodiments.

The entropic thresholding application of the method for determining exterior points of the present invention also includes the step of entropically selecting a threshold gray level value such that the entropy function of the histogram is maximized. This step is performed by the ENTROPY module as shown in FIG. 22. As shown in block A of FIG. 22, the first step in maximizing the entropy function of the histogram is to initialize the maximum entropy function to a minimum value.

The step of entropically selecting a threshold gray level includes the sub-step of sequentially partitioning the gray level histogram at each gray level value into a first partition and a second partition. To illustrate the simple case where a single, simple object in a varying background is identified, a gray level histogram of an image is shown in FIG. 22. The first and second partitions are shown in the histogram of FIG. 22, where the gray level values of the background are represented by a first partition A, and the gray levels of the valid object are represented by a second partition B. In the ENTROPY module, the partitioned threshold gray level value is initialized to a minimum value as shown in block B of FIG. 22.

The step of entropically selecting a threshold gray level also includes the sub-step of computing the entropy function for each partition, where the total entropy function of the histogram is defined as the sum of the entropy function $H_s(A)$ of first partition, A, and the entropy function Hs(B) of second partition, B. This step is shown in block C of FIG. 22 and is mathematically expressed as follows:

For a given threshold gray level value, s,:

$$H_s(A) = -\sum_{i=1}^{S} \frac{p_i}{p_s} \ln\left(\frac{p_i}{p_s}\right) \quad (10)$$

with $$p_i = \frac{f_i}{N}, \quad P_s = \frac{1}{N} \sum_{i=1}^{S} f_i \quad (11)$$

Thus, $$\frac{p_i}{p_s} = \frac{f_i}{s} = \frac{f_i}{N_s} \text{ with } N_s = \sum_{i=1}^{S} f_i \quad (12)$$

$$\sum_{i=1}^{S} f_i$$

So, $$\begin{aligned} H_s(A) &= -\sum_{i=1}^{S} \frac{f_i}{N_s} \ln\left(\frac{f_i}{N_s}\right) \\ &= \frac{-1}{N_s} \sum_{i=1}^{S} f_i \ln f_i + \ln N_s \end{aligned} \quad (13)$$

Similarly, $$H_s(B) = \frac{-1}{N_{s'}} \sum_{i=s+1}^{N_{gray}} f_i \ln f_i + \ln N_{s'} \quad (14)$$

where $N_{s'} = N - N_s$ and $$H_s(A) + H_s(B) = \ln N_s + \ln N_{s'} - \frac{1}{N_s} \sum_{i=1}^{S} f_i \ln f_i - \frac{1}{N_{s'}} \sum_{i=s+1}^{N_{gray}} f_i \ln f_i \quad (15)$$

The sum $H_s(A) + H_s(B)$ represents the total entropy function of the gray level histogram of the image. The maximum entropic threshold gray level value is the value of s which maximizes the total entropy function.

Decision diamond D of FIG. 22 asks whether the entropy function of the histogram is greater than the maximum entropy function as initialized in block A. If it is, then the maximum entropy function is updated using the partitioned threshold gray level as shown in block E of FIG. 22. The maximum entropic threshold gray level value is then set to the partitioned threshold gray level value as shown in block F. After the maximum entropic threshold gray level value has been set, or if the entropic function of the histogram is not greater than the maximum entropy function, then decision diamond G of the ENTROPY module as illustrated in FIG. 22 asks whether the partitioned threshold gray level value equals the maximum threshold gray level value. If so, the maximum entropic threshold gray level value is returned as shown in block H of FIG. 22. If not, then the partitioned threshold gray level value is incremented as illustrated in block I of FIG. 22, and the incremented partitioned threshold gray level value is returned to block C, where the entropy function of the incremented, partitioned threshold gray level value is computed. The loop through C–G is repeated until the partitioned threshold gray level value equals the maximum threshold gray level value, at which point the maximum entropic threshold gray level value is returned as shown in block H.

Figure 23:
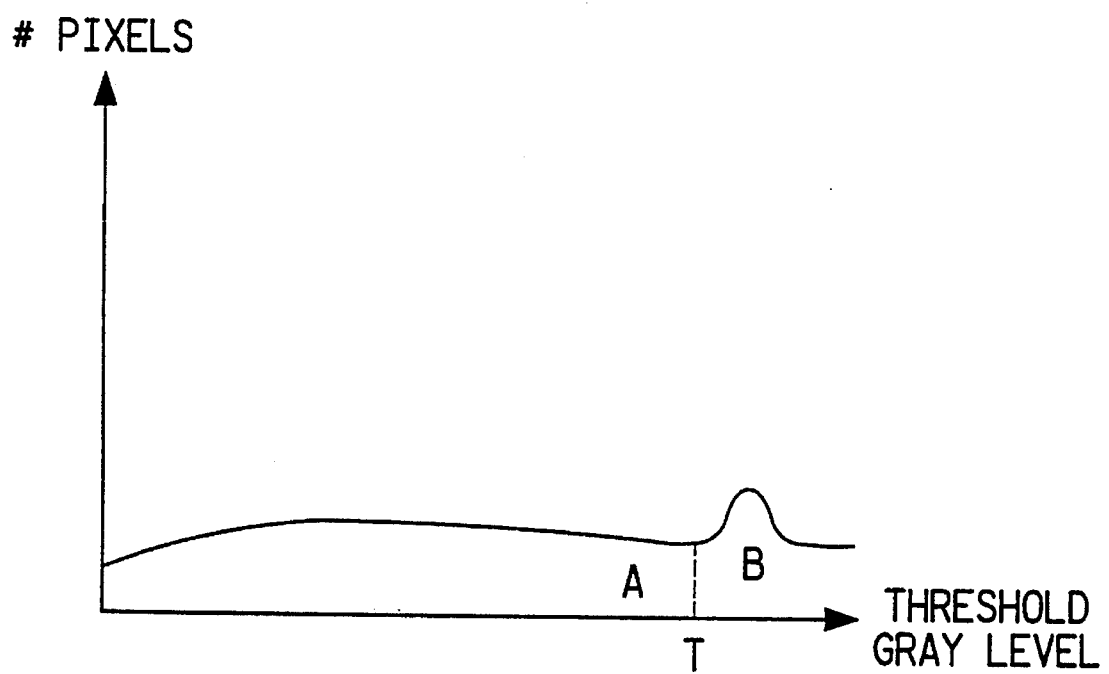
FIG. 23 is a gray level histogram of an image of a single, simple object in a varying background.

The probability distributions are renormalized in $H_s(A)$ and $H_s(B)$ to include only the gray level values within each of the partitions. With this renormalization, the maximum entropy function occurs right at the edge of the object peak in the gray level histogram as shown at T in FIG. 23. Thus, a new threshold gray level value is selected such that the entropy function of the histogram is maximized. With this maximum choice of threshold for the simple case as illustrated in FIG. 23, the renormalized distribution of the background becomes the least peaky and the most uniform. The total entropy function of the histogram is dominated by the entropy function of the background, since the number of gray level values in the background partition is much larger than the number of gray level values in the object partition.

In the specific application when the entropic threshold gray level is maximized for both methods of the present invention for determining exterior points, the searching step further includes the sub-step of scanning the image for at least one object using the entropically selected threshold gray level value. More specifically, the portion of the image scanned may comprise a plurality of pixels, and each pixel has a gray level value less than the upper delimiter plus an increment. The upper delimiter also has the notation MAX. The increment is equal to the difference between MAX, the maximum gray level value of the region being searched, and MIN, the minimum gray level value of the region being searched, resulting in a new maximum gray level value, Gray level$_{max}$:

$$\text{Gray level}_{max} = 2 \times \text{MAX} - \text{MIN} \qquad (16)$$

Regions in the image where the gray level value exceeds gray level$_{max}$ are ignored in the search.

The searching step further includes the sub-step of tracing the candidate object having boundary gray level values determined by the entropically selected threshold gray level value. In this application, the searching step is performed by a module SEARCH IMAGE as shown in FIG. 24, a module FIND OBJECT as shown in FIG. 25, and the module GET PERIM as shown in FIG. 3.

Figure 24:
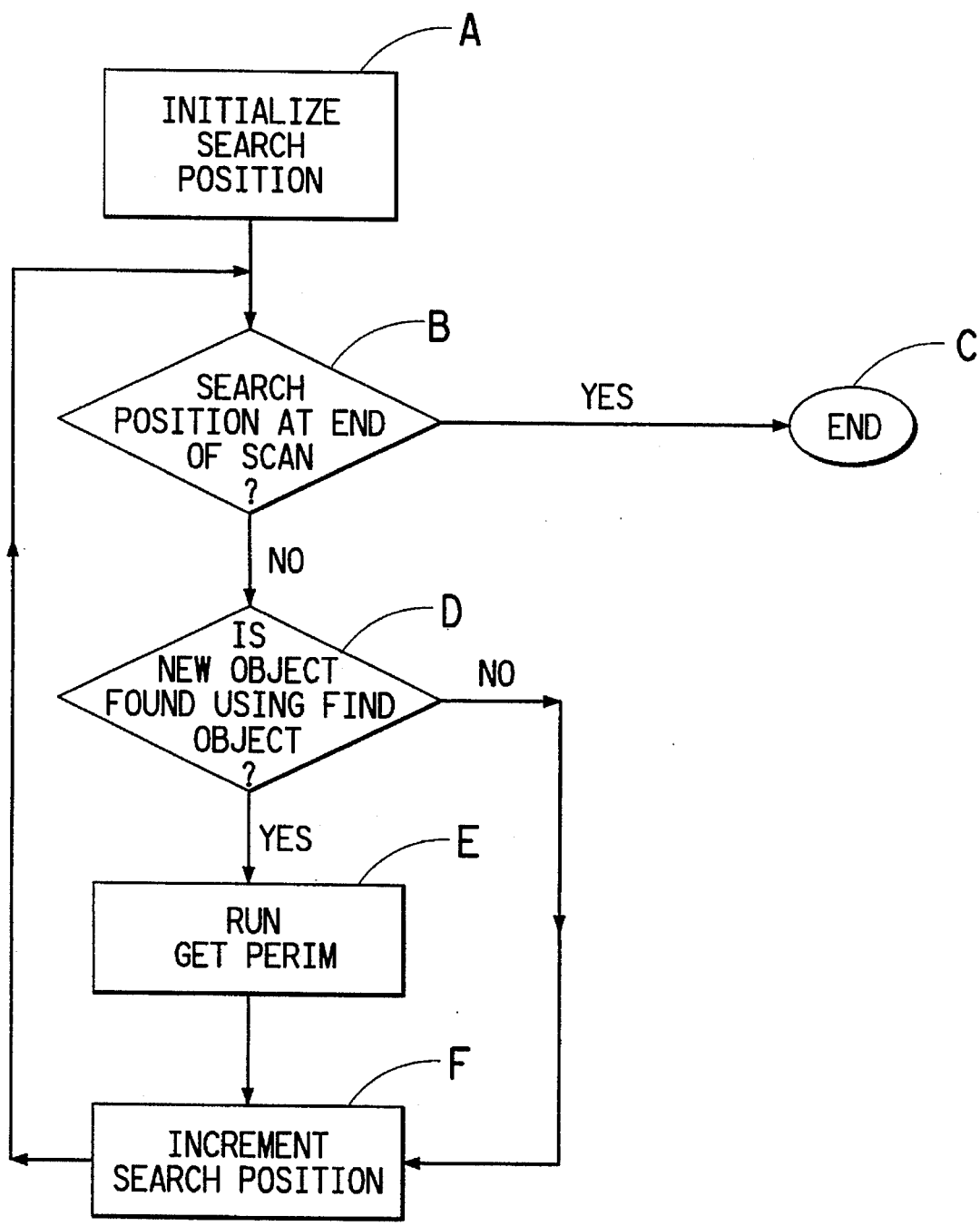
FIG. 24 is flow chart showing the steps of a module, SEARCH IMAGE, which is used to search an image for at least one candidate object.

As illustrated by block A of FIG. 24, the first step of SEARCH IMAGE is to initialize the search position. The module SEARCH IMAGE searches the region of interest with the current entropically selected threshold gray level value. Decision diamond B of FIG. 24 then asks whether the search position is at the end of the scan. If so, SEARCH IMAGE is done.

If the search position is not at the end of the scan, then the module SEARCH IMAGE searches the region of interest with the current entropically selected threshold gray level value until it finds a point which has a gray level value exceeding the entropically selected threshold gray level value using a module FIND OBJECT. To identify objects darker than the background, the image is inverted immediately after it has been generated. Such a point might be the first point of a new object. Decision diamond D of FIG. 24 asks whether a new object has been found using the module FIND OBJECT. If the object has not already been traced in the current search, the module SEARCH IMAGE proceeds to trace the object by running the module GET PERIM, as shown by block E of FIG. 24. The module GET PERIM is described in detail above with respect to FIG. 3. After the object has been traced, the search position is incremented as illustrated in block F of FIG. 24. The loop through B–F is continued until the module SEARCH IMAGE is at the end of the search as indicated by decision diamond B. Alternatively, if a new object has not been found as indicated by decision diamond D, then the search position is incremented as illustrated in block F, thus bypassing the tracing step, and the loop through B–I is continued until SEARCH IMAGE is at the end of the search.

The steps of the module FIND OBJECT are illustrated in FIG. 25. The first step in FIND OBJECT is to initialize the search position to the current location of the image being searched as shown in block A. Decision diamond B then asks whether the search position is inside the object. If so, then the search position is incremented as illustrated by block C, and decision diamond D asks whether the FIND OBJECT is at the end of its search. If so, then no new object is found as indicated in block E. If not, then decision diamond B asks whether the incremented search position is inside the object. This process of looping through B–E continues until the search position is not inside the object. At this point, decision diamond F asks whether a next object has been found. If not, then the search position is incremented as illustrated in block G of FIG. 25, and decision diamond H asks whether SEARCH IMAGE module is at the end of its search. If so, then no new object found is returned as indicated by block I. If not, then decision diamond F again asks whether a next object has been found using the incremented search position. This process of looping through F–I continues until a next object has been found. Decision diamond J asks whether the object which has been found has already been traced. If so, the new object found is returned as indicated by block K. If the object which has been found has not already been traced, then the search position is updated as illustrated by block L, and a new object found is returned as indicated by block M of FIG. 25. By running SEARCH IMAGE, FIND OBJECT and GET PERIM as described above, the object returned in block M of FIG. 25 is then traced to determine the perimeter points thereof as shown in block C of FIG. 1.

According to the entropic thresholding application of either of the first or second embodiments of the present invention where a candidate object is validated, the searching step further includes the sub-step of scanning a portion of the image for at least one candidate object using the entropically selected threshold gray level value. The searching step further includes the sub-step of tracing the candidate object having boundary gray levels determined by the entropically selected threshold gray level. In this application, the searching step is performed by the module SEARCH IMAGE as described above with respect to FIG. 24, the module FIND OBJECT as described above with respect to FIG. 25, and a module TRACE OBJECT as described in FIGS. 26A and 26B. The basic principles of the TRACE OBJECT module are similar to those described in "Digital Image Processing" by Rafael C. Gonzalez and Paul Wintz, Second Ed., Addison-Wesley Publishing Company, Reading, Mass. (1987).

As shown in block A of FIG. 26A, the first step in the TRACE OBJECT module is to initialize the candidate object attribute values. The TRACE OBJECT module then asks in decision diamond B whether a neighboring perimeter point has been found. If not, the traced object is invalid as illustrated by block C. If the neighboring perimeter point has been found, then decision diamond D asks whether the TRACE OBJECT module is at the first perimeter point of the candidate object. If not, then the candidate object attribute values are updated as illustrated in block E of FIG. 26A. The loop through B–E is then repeated, using the updated candidate object attribute values, until the TRACE OBJECT module is at the first perimeter point of the candidate object. The center of mass coordinate is then calculated as shown in block F of FIG. 26A. Decision diamond G then asks if the candidate object area is too large. If it is, the traced object is invalid as indicated by block H of FIG. 26A.

Figure 26B:
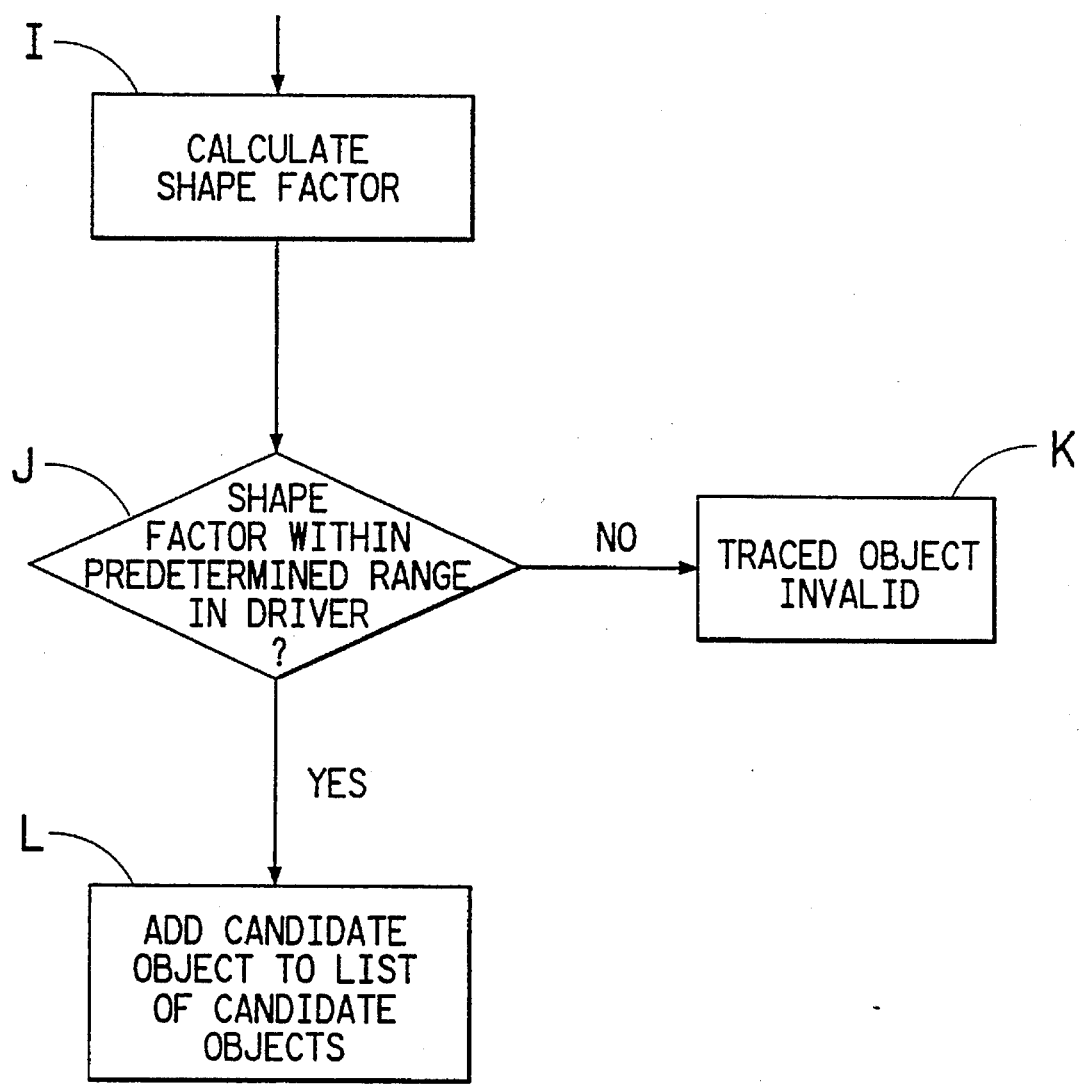

If the candidate object area is not too large, then a shape factor is calculated as shown in block I in FIG. 26B. The definition of the shape factor may vary, depending on the geometry of the object being identified. For instance, the definition of the shape factor for circular objects is:

$$\text{Shape Factor} = 1 - \frac{P^2}{4pA} \tag{17}$$

where:

P is the perimeter of a candidate object; and

A is the area of the candidate object.

TRACE OBJECT then checks if the shape factor is within a predetermined range as contained in the driver as shown in decision diamond J in FIG. 26B. If the shape factor does not fall within the predetermined range, then the traced object is invalid as illustrated by block K of FIG. 26B. If the shape factor falls within the predetermined range, then the candidate object is added to the list of valid objects maintained by the kernel as shown in block L.

The entropic thresholding application as described thus far can be referred to as a screening process. For example, it can be used to screen for the presence of pathological bacteria in food or in blood or soil samples. A screening process results in a yes—no answer; absolute quantitation is not necessary. For a more stringent identification process, it is necessary to apply the entropic thresholding application of the first and second embodiments of the present invention, which performs validation recursively as described below. When this recursive validation is done, the search is done recursively, and then the exterior and the interior points are determined as described above.

The recursive version of the entropic thresholding application may further comprise the steps of subdividing the gray level histogram into an upper histogram and a lower histogram using the entropic threshold gray level which was selected to maximize the entropy function of the histogram as an upper delimiter and a lower delimiter. The selection, searching, validating and subdividing steps are recursively repeated for each of the upper and lower histograms. The repetition of the selection step selects a next successive entropic threshold gray level, thereby recursively partitioning the gray level histogram to identify the valid objects until a predetermined minimum number of new valid objects is identified. In the preferred implementation of this application, the predetermined minimum number is zero. However, there may be cases where the predetermined number is greater than zero, such as when a complete identification is not required.

Figure 27A:
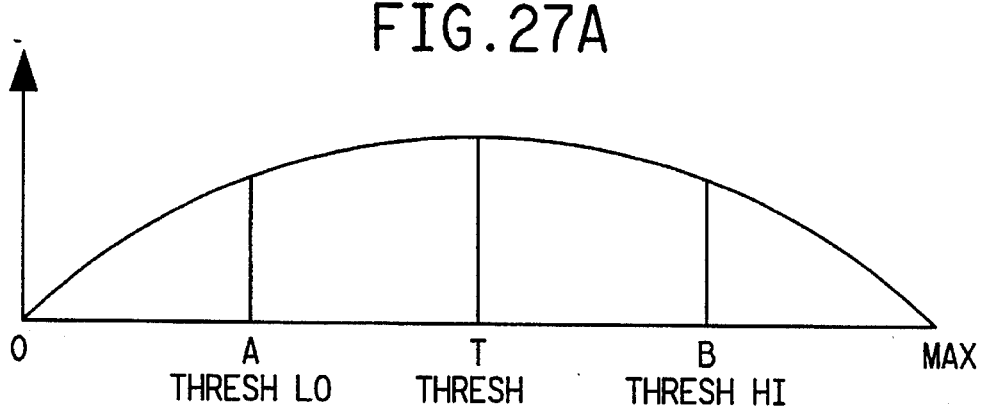
FIGS. 27A–27C are original, upper and lower gray level histograms, respectively, of an image for a specific implementation of the first and second embodiments of the present invention where identification of a valid object is performed.
Figure 27B:
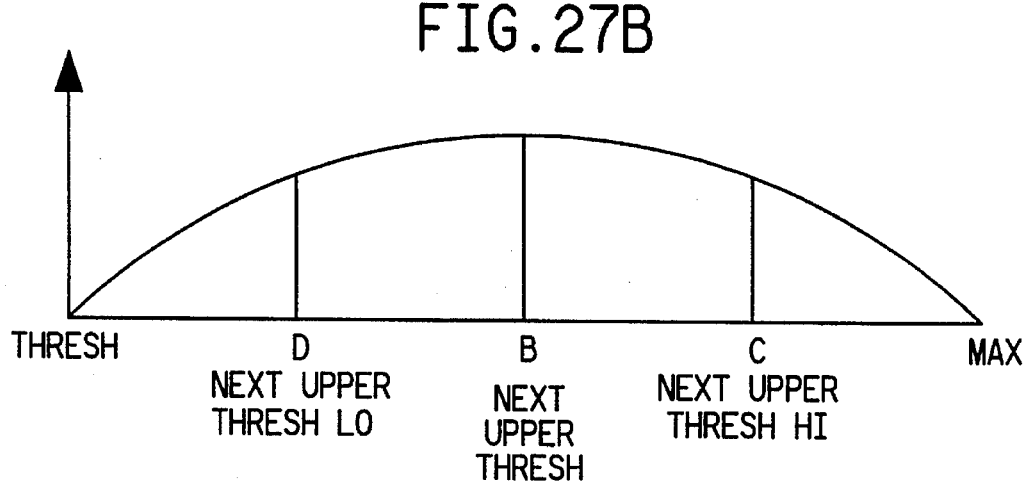
Figure 27C:
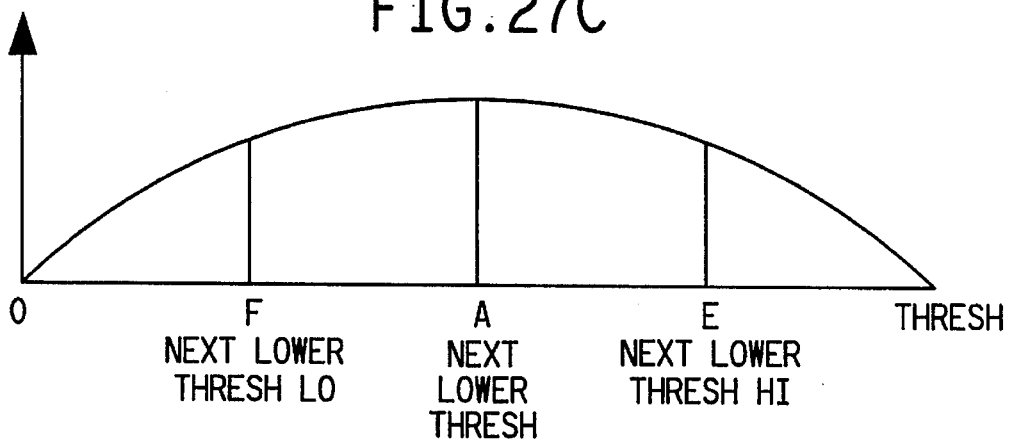

FIGS. 27A–27C illustrate the concept of subdividing a histogram into an upper histogram and a lower histogram. An original histogram is shown in FIG. 27A. THRESH, as shown at T in FIG. 27A, is the entropically selected threshold gray level for the gray level histogram corresponding to the gray level region between the minimum gray level being searched and the maximum gray level being searched. For the original histogram as shown in FIG. 27A, the minimum gray level being searched is zero and the maximum gray level being searched is MAX. THRESH HI, as shown at B, is the entropically selected threshold gray level for the gray level histogram corresponding to the gray level region between THRESH and MAX. THRESH LO, as shown at A, is the entropically selected threshold gray level for the gray level histogram corresponding to the gray level region between zero and THRESH.

According to the recursive version of the entropic thresholding application, the subdividing, selection, searching and validating steps are then recursively repeated. By recursion is meant the process of continuously dividing a histogram into upper and lower histograms, searching each upper histogram, which upper histogram is itself continuously divided into upper and lower histograms, for new valid objects until the number of new valid objects found in an upper histogram is less than or equal to a predetermined minimum number, and subsequently searching each lower histogram corresponding to the most recently searched upper histogram, which lower histogram is itself continuously divided into upper and lower histograms, until the number of new valid objects found in a lower histogram is less that. or equal to the predetermined minimum number.

The upper histogram is shown in FIG. 27B. The repetition of the subdividing step subdivides the upper histogram into a next successive upper and lower histogram as shown in FIG. 27B. The repetition of the selection step for the upper histogram selects a next upper successive entropic threshold gray level value, as shown at B in FIG. 27B. Thus, point B, which was THRESH HI in the original histogram, becomes the threshold for the upper histogram, or NEXT UPPER THRESH. In FIG. 27B, the minimum gray level value being searched is now THRESH and the maximum gray level value being searched is now MAX. The NEXT UPPER THRESH HI, shown at C, is the entropically selected threshold gray level value for the gray level histogram corresponding to the gray level region between B and MAX. The NEXT UPPER THRESH LO, shown at D, is the entropically selected threshold gray level value for the gray level histogram corresponding to the gray level region between THRESH and B. The selection, searching and validating steps are then repeated recursively using the next upper successive entropic threshold gray level value, B, as the entropic threshold gray level value.

FIG. 27C shows the lower histogram. The repetition of the subdividing step subdivides the lower histogram into a next successive upper and lower histogram as shown in FIG. 27C. The repetition of the selection step for the lower histogram selects a next lower successive entropic threshold gray level value, as shown at A in FIG. 27C. Thus, point A, which was THRESH LO in the original histogram, becomes the threshold for the partitioned lower histogram, or NEXT LOWER THRESH. In FIG. 27C, the minimum gray level value being searched is now zero and the maximum gray level value being searched is now THRESH. The NEXT LOWER THRESH HI, shown at E, is the entropically selected threshold gray level value for the gray level histogram corresponding to the gray level region between A and THRESH. The NEXT LOWER THRESH LO, shown at F, is the entropically selected threshold gray level value for the gray level histogram corresponding to the gray level region between zero and A. The selection, searching and validating steps are then repeated recursively for the lower histogram using the next lower successive entropic threshold gray level value, A, as the entropic threshold gray level value.

Figure 28:
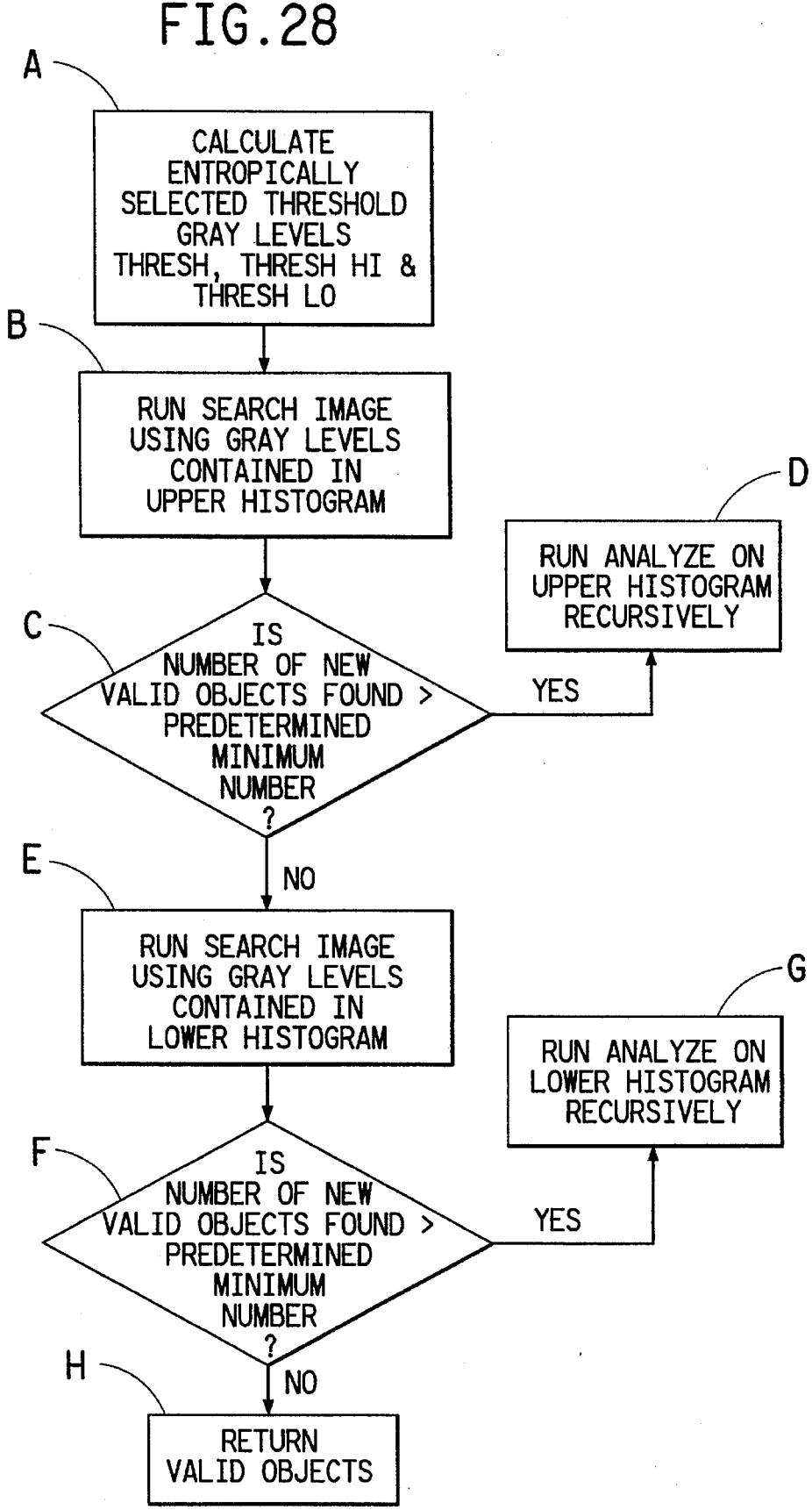
FIG. 28 is a flow chart showing the steps of a module, ANALYZE, which is used to recursively search the image for candidate objects according to the specific implementation of the first and second embodiments where identification of a valid object is performed.

The ANALYZE module as shown in FIG. 28 constitutes the core recursive kernel of the recursive version of the entropic thresholding application. The ANALYZE module effectively zooms in on a specific region in gray level space to search for instances of the candidate object and recursively partitions the histogram. The first step in the ANALYZE module as shown in FIG. 28 is to calculate the entropically selected threshold gray level values THRESH, THRESH HI AND THRESH LO as described above and as shown in block A of FIG. 28. As shown in block B, the module SEARCH IMAGE is run using the gray level values contained in the upper histogram. Decision diamond C then asks whether the number of new valid objects found is greater than the predetermined minimum number. If it is, then the module ANALYZE is run on the upper histogram recursively. If the number of valid objects found is not greater than the predetermined minimum number, then the module SEARCH IMAGE is run again using the gray level values contained in the lower histogram as shown in block E. Decision diamond F then asks whether the number of new valid objects found is greater than the predetermined minimum number. If it is, then ANALYZE is run on the lower histogram recursively as shown in block G. If it is not, then ANALYZE stops running, and the valid objects are returned as shown in block H of FIG. 28. With the present invention, there is some latitude in selecting the range of values of the number of attributes to be checked for in the validation step during the recursive process.

According to the entropic thresholding application of the first and second embodiments, the validating step further includes the sub-step of checking for redundancies to prevent multiple identification of the valid object. Such redundancy checking is necessary since an object which has been recognized as valid after the current search may have been recognized as a valid object in an earlier search. In order to perform the redundancy checking sub-step, valid objects are classified as either homogeneous or inhomogeneous. Inhomogenous objects are described in the example given below, where color colonies are identified. Valid objects are also further classified as either a relatively large valid object or a small valid object. In addition, valid objects are classified as either contained in another valid object (interior valid objects), or never contained in another valid object (exterior valid objects).

According to entropic thresholding application of the first and second embodiments, the redundancy checking sub-step may be performed to delete inhomogeneous valid objects. When it is, the method of identifying valid objects of the first and second embodiments further includes the sub-step of deleting the large object when the large object contains more than one small object. Also, when the redundancy checking sub-step is performed to delete inhomogeneous valid objects, the method identifying valid objects of the first and second embodiments also includes the sub-steps of calculating the average edge contrast of the large and the small valid objects and deleting the object having the smaller edge contrast when the large object contains only one small object. These sub-steps are performed by a module, CHK LIST, as shown in FIGS. 29A–29D for inhomogeneous valid objects.

Figure 29A:
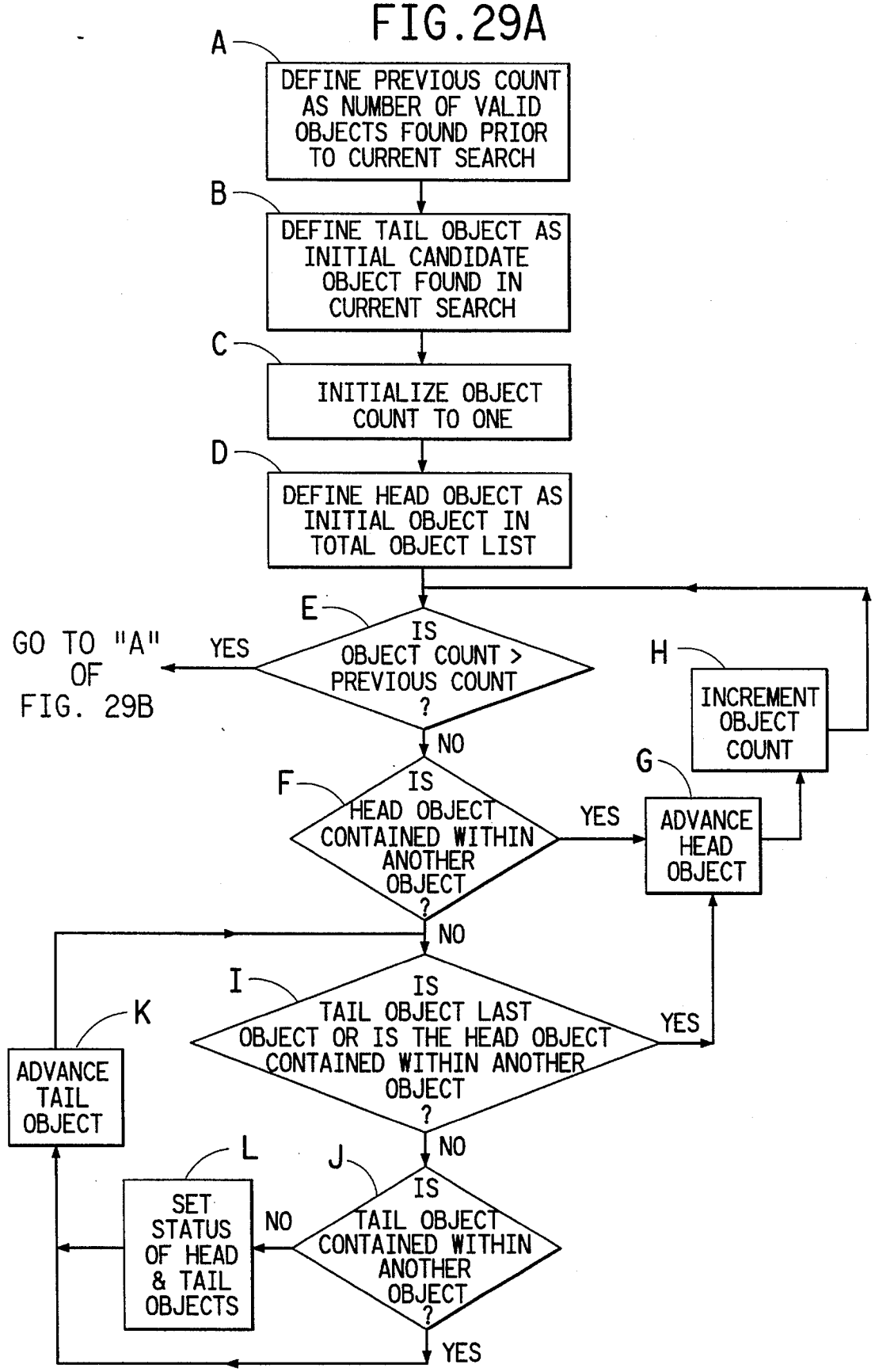
FIGS. 29A–29D are a flow chart showing the steps of a module, CHK LIST, which is used to resolve redundancies in inhomogeneous objects.

As shown in block A of FIG. 29A, the first step of the CHK LIST module for deleting inhomogeneous objects is to define the previous count as the number of valid objects found prior to the current search. Then the tail object is defined as the initial candidate object found in the current search as shown in block B. The object count is initialized to one as shown in block C, and the head object is defined as the initial object in the total object list (i.e., the list of all objects found to date) as shown in block D. Decision diamond E asks whether the object count is greater than the previous count.

Figure 29B:
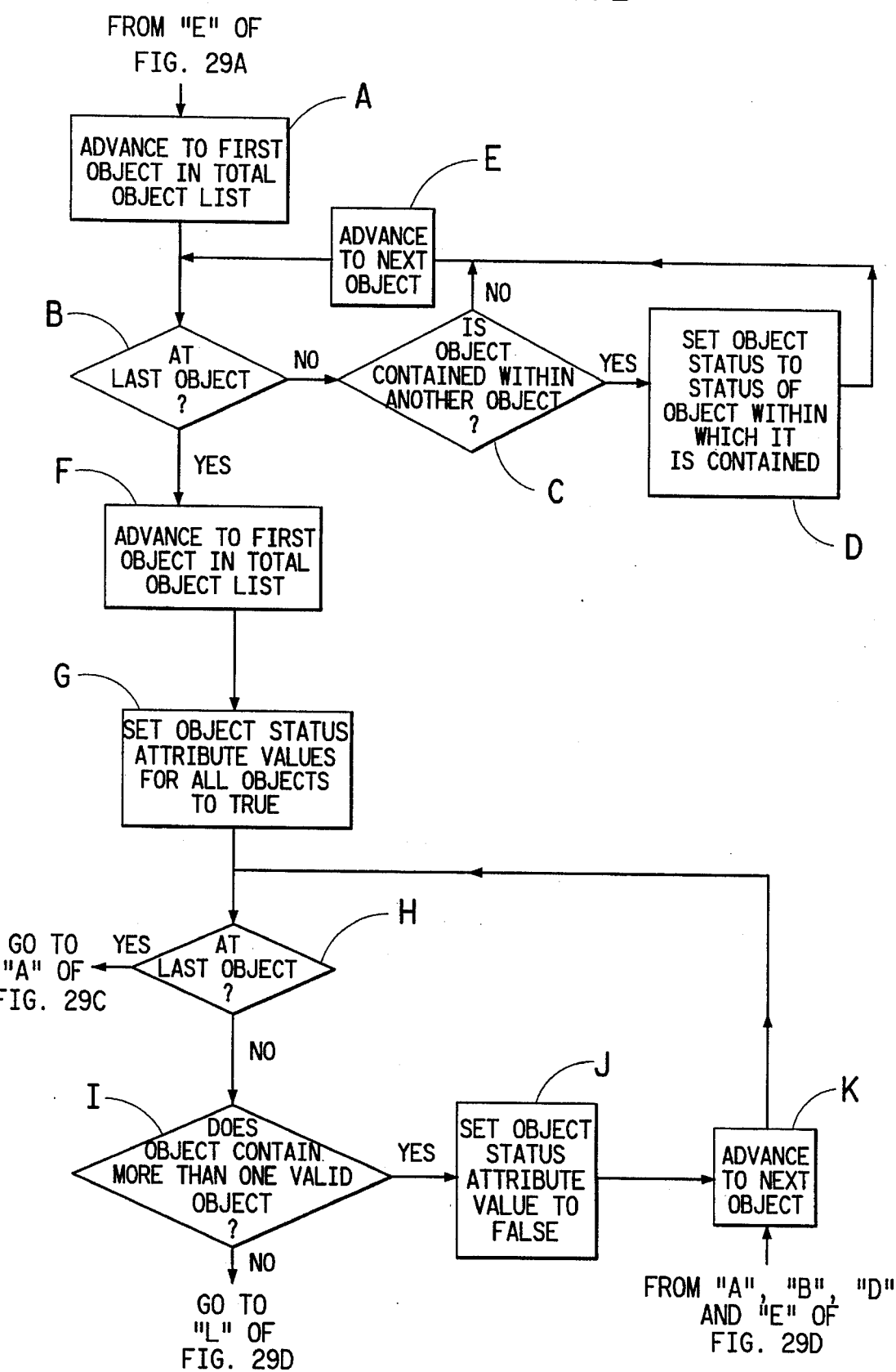

If the object count is greater than the previous count, CHK LIST advances to the first object in the total object list as shown in block A of FIG. 29B. Decision diamond B of FIG. 29B asks if CHK LIST is at the last object. If not, then decision diamond C asks whether the valid object is contained within another valid object. If so, the object status is set to the status of the object within which it is contained as shown in block D, and CHK LIST advances to the next object as shown in block E. Also, if the object is not contained within another object, then CHK LIST advances to the next object as shown in block E. The loop through B–E continues until the next object of block E is the last object, at which point CHK LIST advances to the first object in the total object list as shown in block F. The object status attribute values for all the objects is set to "true" as shown in block G. "True" in this context means valid, and "false" means invalid. Decision diamond H then asks if CHK LIST is at the last object.

Figure 29C:
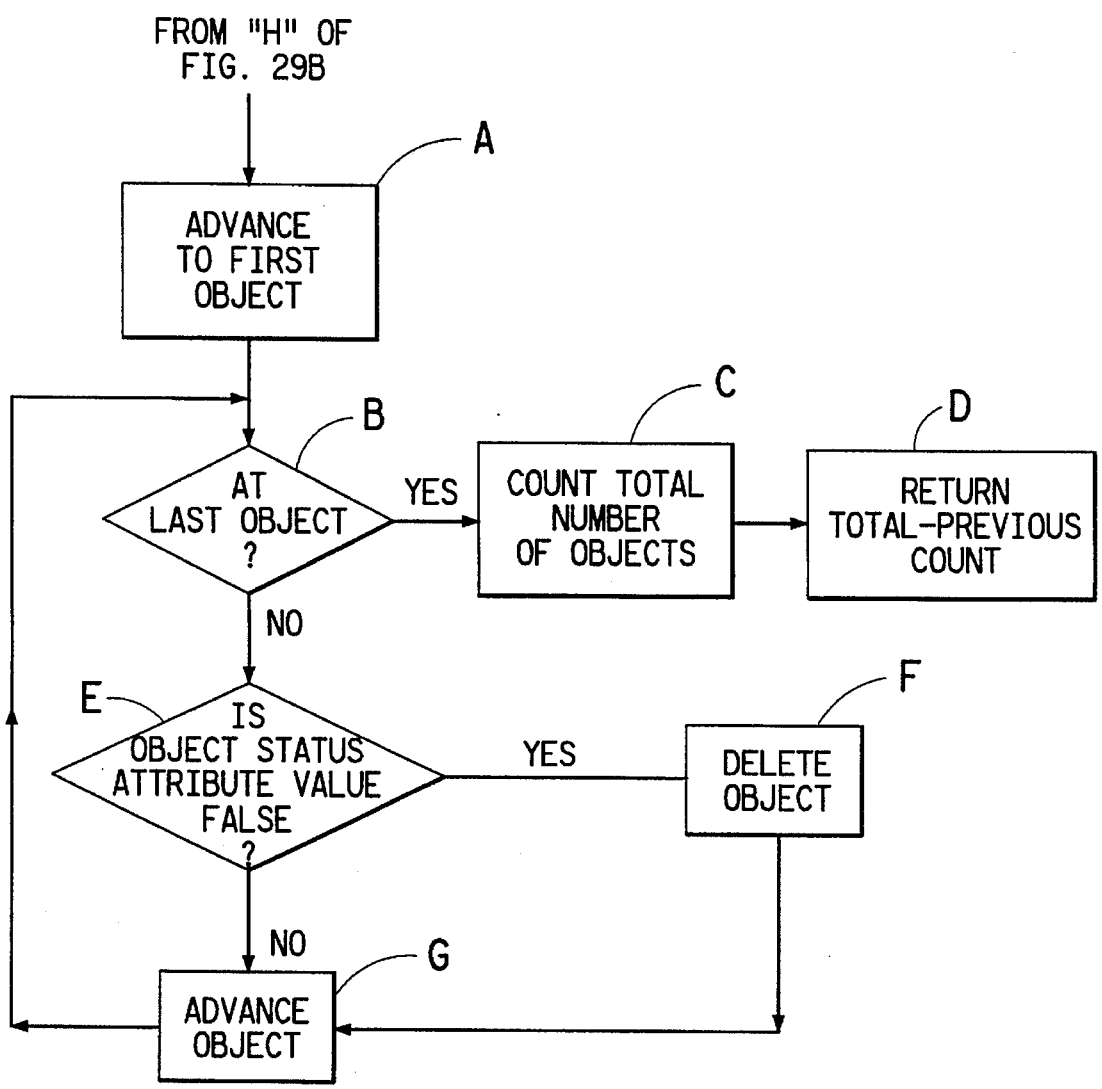

If it is, CHK LIST advances to the first object as shown in block A of FIG. 29C. Decision diamond B then asks again whether CHK LIST is at the last object. If it is, then the total number of objects is counted as shown in block C, and the difference between the total number of objects and the previous count is returned as shown in block D. If CHK LIST is not at the last object, decision diamond E asks whether the object status attribute value is false. If so, the object is deleted as shown in block F. If not, then CHK LIST advances the object as shown in block G, and CHK LIST asks again whether it is at the last object as shown in decision diamond B. The loop through B, E, F, and G continues until the advanced object of block G is the last object. At this point, the total number of objects is counted as shown in block C, and the difference between the total number of objects and the previous count is returned as shown in block D.

Figure 29D:
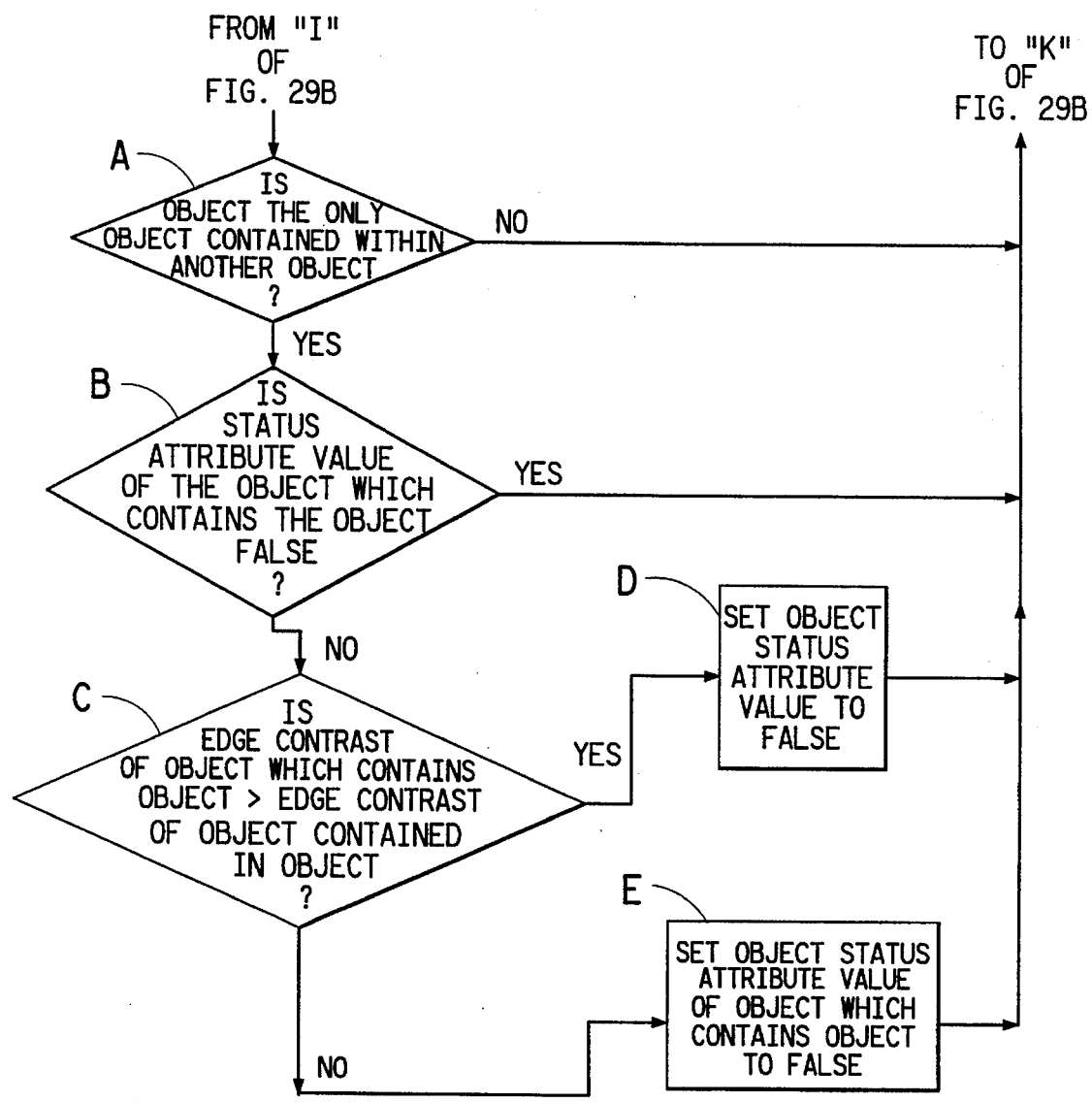

Returning to decision diamond H in FIG. 29B, if CHK LIST is not at the last object at this point, then it goes to decision diamond I, which asks whether the object contains more than one valid object. If so, then the object status attribute value is set to false as shown in block J, and CHK LIST advances to the next object as shown in block K. CHK LIST then returns to decision diamond H, asks whether it is at the last object and continues this process until the object does not contain more than one valid object. Then decision diamond A of FIG. 29D asks if the object is the only object contained within another object. If not, then CHK LIST advances to the next object as shown in block K of FIG. 29B, and the loop through H–K of FIG. 29B and A of FIG. 29D is repeated until the object is the only object contained within another object. If the object is the only object contained within another object, then decision diamond B asks whether the status attribute value of the object which contains the object is false. If so, then CHK LIST advances to the next object as shown in block K of FIG. 29B, and the loop through H–K of FIG. 29B and A–B of FIG. 29D is repeated until the status attribute value of the object which contains the object is not false. At this point, decision diamond N asks whether the edge contrast of the object which contains another object is greater than the edge contrast of the object. If so, then CHK LIST sets the object status attribute value to false as shown in block D, it advances to the next object as shown in block K in FIG. 29B, and the loop through H–K of FIG. 29B and A–C of FIG. 29D is repeated until the edge contrast of the object which contains another object is not greater than the edge contrast of the object contained in another object. Then CHK LIST sets the status of the object which contains the object to false as shown in block E of FIG. 29D, and it advances to the next object as shown in block K of FIG. 29D until it is at the last object.

Figure 30:
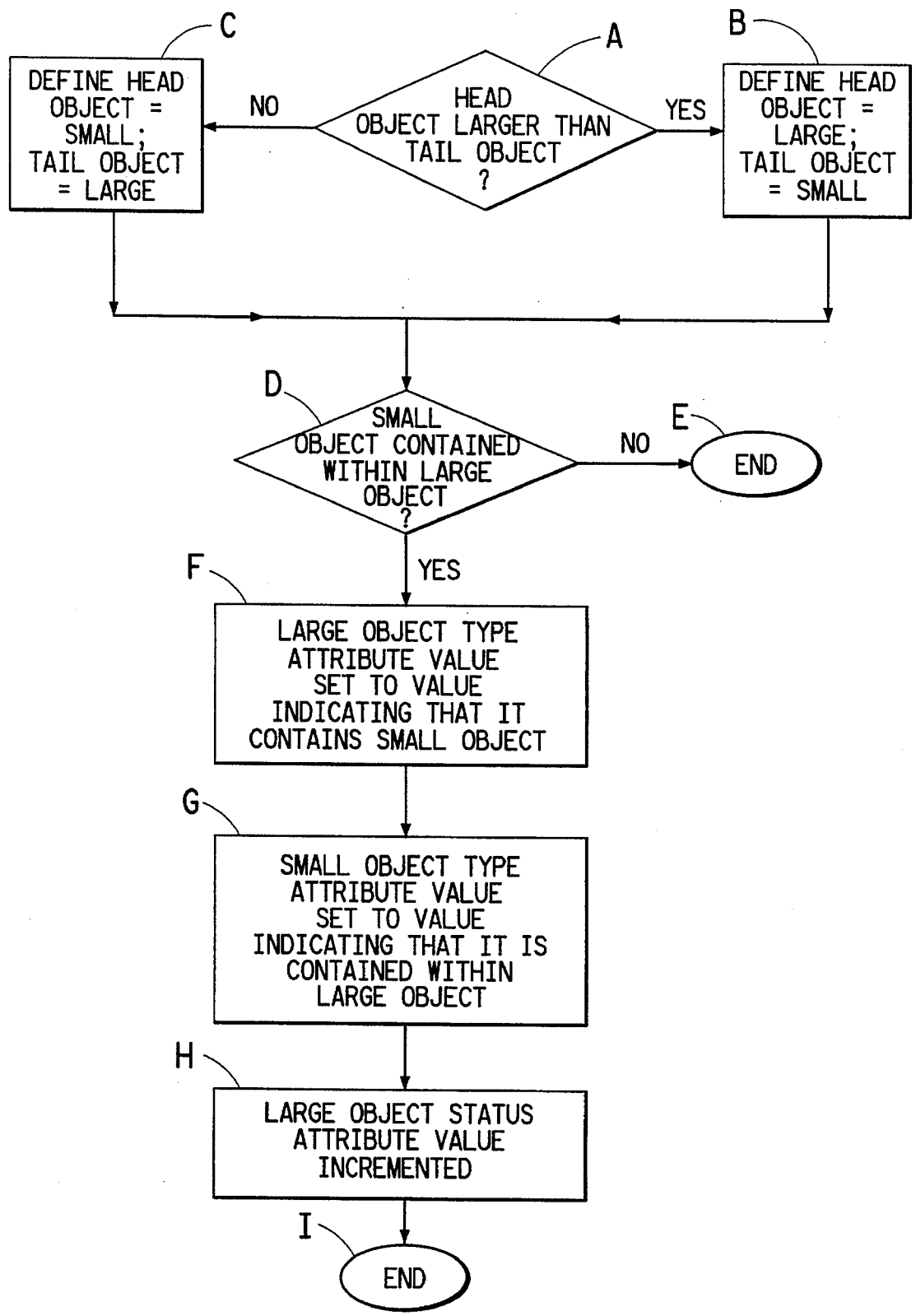
FIG. 30 is a flow chart showing the steps of a module, SET STAT, which is used with the module CHK LIST as shown in FIGS. 29A–29D.

Returning to decision diamond E in FIG. 29A, if the object count is not greater than the previous count, then decision diamond F asks if the head object is contained within another object. If so, then the head object is advanced as shown in block G, and the object count is incremented as shown in block H. Decision diamond E again asks if the incremented object count is greater than the previous count. If so, CHK LIST advances to block A of FIG. 29B as explained above. If the incremented count is not greater than the previous count, the loop through F, G, H and E in FIG. 29A is repeated until the head object is not contained within another object. Then CHK LIST advances to decision diamond I of FIG. 29A, which asks if the tail object is the last object, or if the head object is contained within another object. If the tail object is the last object, or if the head object is contained within another object, then CHK LIST advances the head object as shown in block G, and the count is incremented as shown in block H. The loop through E, F, I, G and H is repeated until the tail object is not the last object or the head object is not contained within another object. Decision diamond J then asks whether the tail object is contained within another object. If it is, then the tail object is advanced as shown in block K of FIG. 29A, and the loop through I, J and K is repeated until the tail object is not contained within another object. Then CHK LIST goes to the module SET STAT as shown in FIG. 30 to set the status of the head and tail objects as shown in block L of FIG. 29A.

The redundancy checking sub-step further includes the sub-steps of comparing the areas of a plurality of valid objects and designating one of the valid objects as a large valid object and the other of the first and second valid objects as a small valid object and determining whether the small valid object is contained in the large valid object as defined by the four extremum points of the larger object for inhomogeneous objects. The module SET STAT as shown in FIG. 30 performs these sub-steps for inhomogeneous objects. The first step of SET STAT as shown in decision diamond A of FIG. 30 is to ask whether the head object is larger than the tail object. If so, then the head object is defined as the large valid object, and the tail object is defined as the small valid object as shown in block B. If the head object is not larger than the tail object, then the head object is defined as the small valid object, and the tail object is defined as the large valid object as shown in block C. Then decision S diamond D asks whether the small object is contained within the large object. If not, then SET STAT is finished, as indicated by END oval E. If the small object is contained within the large object, then the large object type attribute value is set to a value indicating that it contains a small object as shown in block F. The type attribute value tells SET STAT whether an object is contained within another object or whether the object contains another object. Also, the small object type attribute value is set to a value indicating that it is contained within a large object as shown in block G. Finally, the large object status attribute value is incremented as shown in block H. SET STAT is then finished, as indicated by the END oval I and returns to block L of FIG. 29A.

According to the entropic thresholding application of the first and second embodiments, the redundancy checking sub-step may be performed to resolve redundancies in the homogeneous objects. When it is, the entropic thresholding application further includes the sub-steps of calculating the edge contrast of the large and small valid objects and deleting the large object where the average edge contrast of the large object is less than the average edge contrast of the small object and is less than a predetermined minimum edge contrast. The redundancy checking sub-step for resolving redundancies also includes the sub-steps of calculating the edge contrast of the large and small valid objects and deleting the small object where the average edge contrast of the large object is greater than the average edge contrast of the small object and is greater than the predetermined minimum contrast. These sub-steps are performed using the module CHK LIST for homogeneous objects as illustrated by the flow charts of FIGS. 31A and 31B.

Figure 31A:
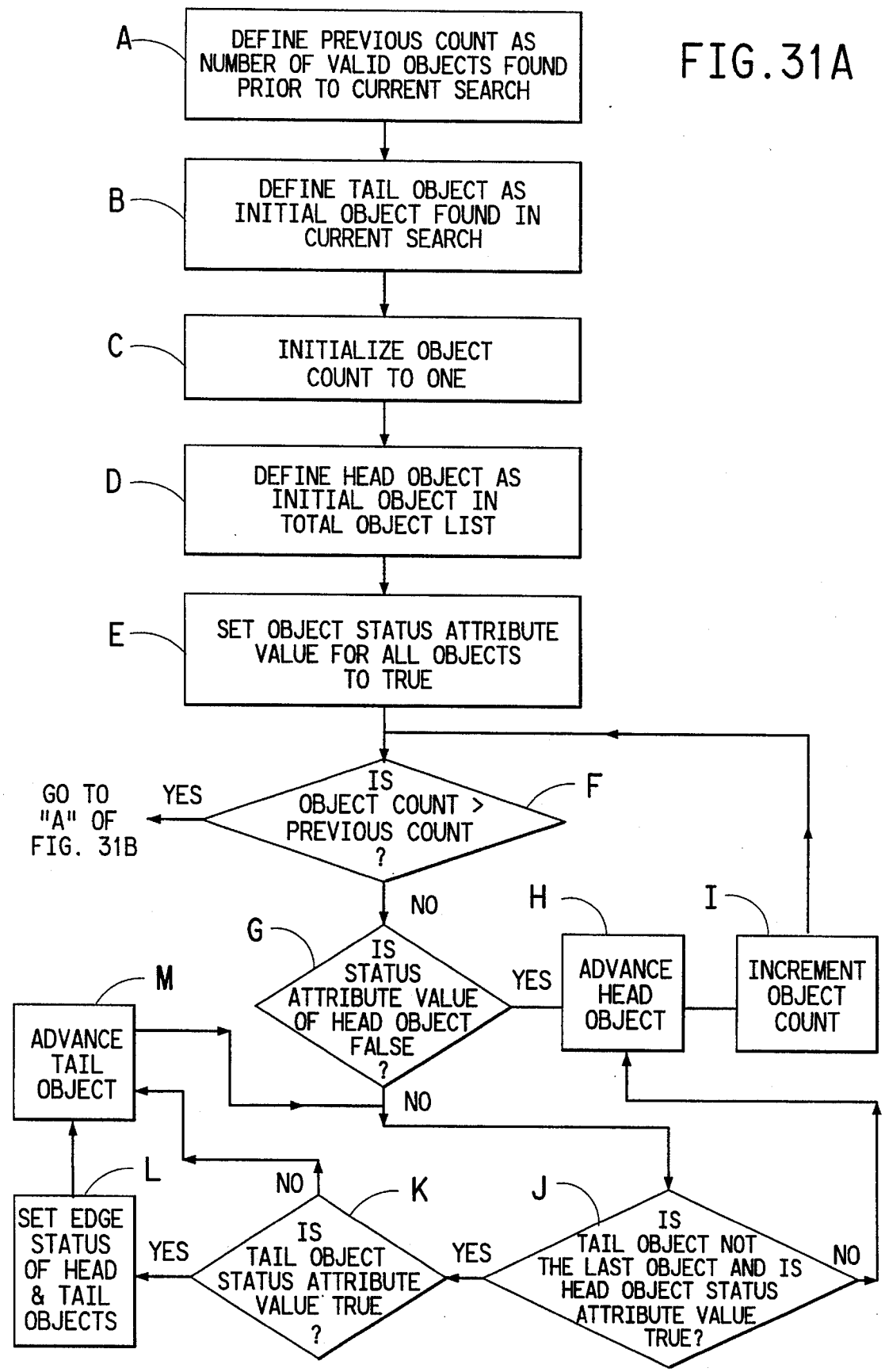
FIGS. 31A–31B are a flow chart showing the steps of a module, CHK LIST, which is used to resolve redundancies in homogeneous objects.
Figure 31B:
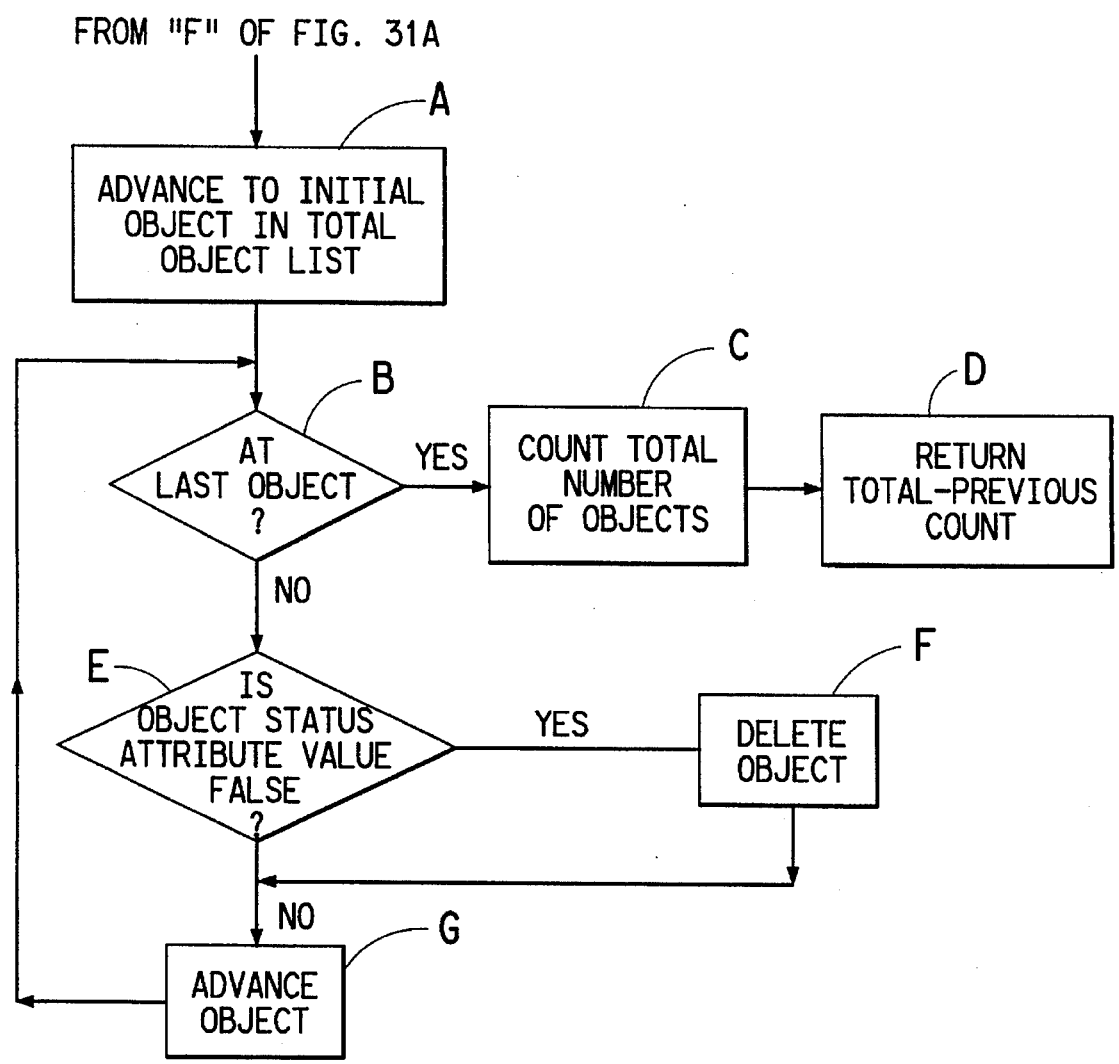

As shown in block A of FIG. 31A, the first step of the CHK LIST module, when run to delete homogenous objects, is to define the previous count as the number of valid objects found prior to the current search. Then the tail object is defined as the initial candidate object found in the current search as shown in block B. The object count is initialized to one as shown in block C, and the head object is defined as the initial object in the total object list as shown in block D. The object status attribute value is then set to true for all objects as shown in block E. Decision diamond F asks whether the object count is greater than the previous count. If the object count is greater than the previous count, CHK LIST advances to the initial object in the total object list as shown in block A of FIG. 31B. Decision diamond B of FIG. 31B asks if CHK LIST is at the last object. If so, the total number of objects is counted as shown in block C, and the difference between the total number of objects and the previous count is returned as shown in block D. If CHK LIST is not at the last object, then decision diamond E asks whether the object status attribute value is false. If so, the object is deleted as shown in block F. If the object status is not false, then object is advanced as shown in block G, and the CHK LIST module asks again whether it is at the last object as shown in decision diamond B. This process continues until CHK LIST reaches the last object, at which point the total number of objects is counted as shown in block C, and the difference between the total number of objects and the previous count is returned as shown in block D.

Returning to decision diamond F in FIG. 31A, if the object count is not greater than the previous count, then decision diamond G of FIG. 31A asks if the status attribute value of the head object is false. If it is, then the head object is advanced as shown in block H, and the count is incremented as shown in block I. Decision diamond F then asks if the incremented object count is greater than the previous count. If so, CHK LIST advances to block A of FIG. 29B as explained above. The loop through G, H and I in FIG. 31A is repeated until the status of the object is not false. Then CHK LIST advances to decision diamond J of FIG. 31A, which asks if the tail object is not the last object and if the had object status attribute value is true. The answer to both these questions must be yes. If not, then CHK LIST advances the head object as shown in block H, and the count is incremented as shown in block I. The loop through F, G, H, I and J is repeated until the tail object is the last object and the head object status attribute value is true. Decision diamond K then asks whether the tail object status attribute value is true. If it is, then the edge status of the head and tail object is set as shown in block L of FIG. 31A and as shown in detail in FIG. 32 by a module SET STAT. CHK LIST then advances the tail object as shown in block M, and the loop through J, K, L and M is repeated. If the tail object status is not true, then CHK LIST advances the tail object as shown in block M, and the loop through J, K and M is repeated.

Figure 32:
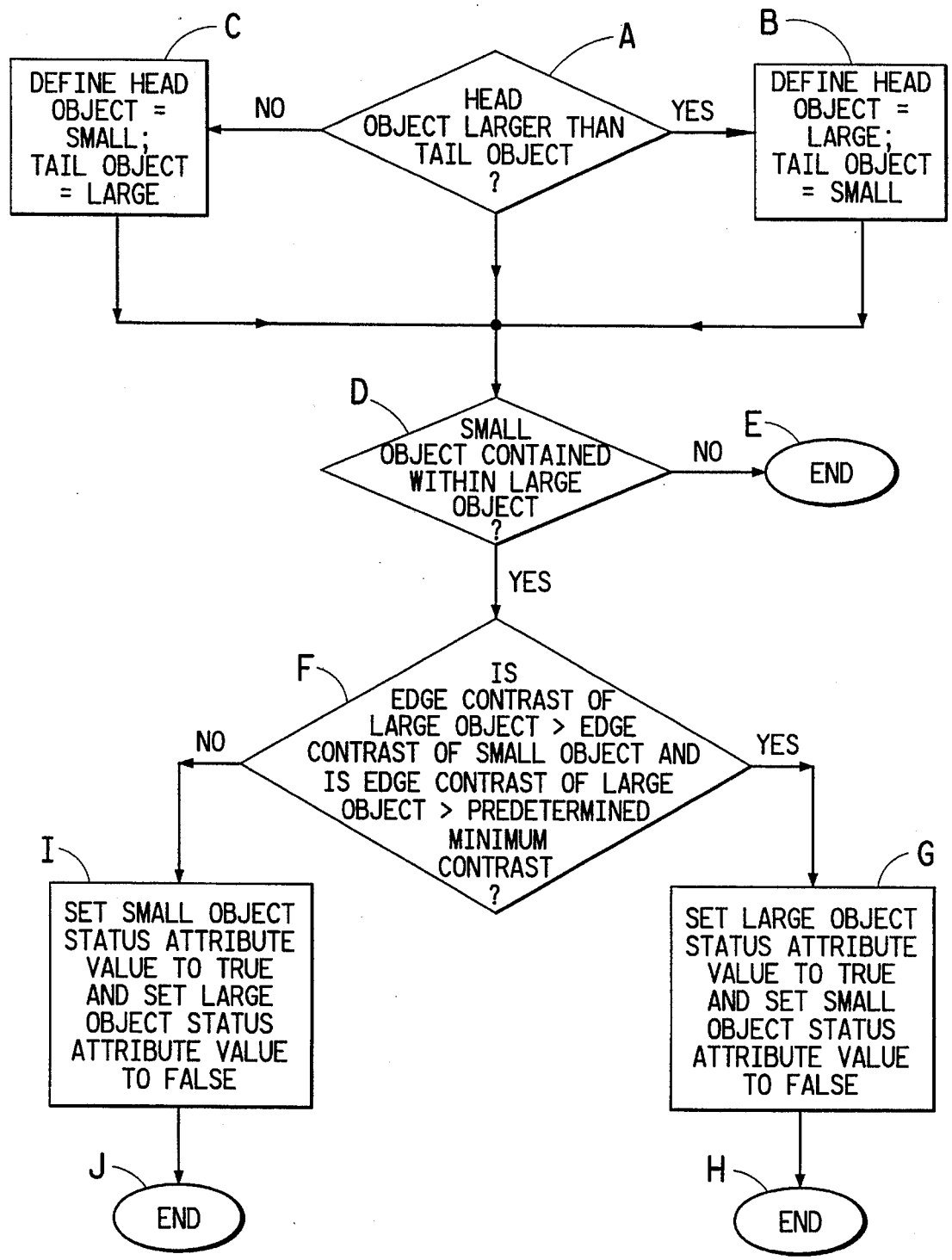
FIG. 32 is a flow chart showing the steps of a module, SET STAT, which is used with the module CHK LIST as shown in FIGS. 31A–31B.

The module SET STAT as shown in FIG. 32 performs the sub-steps of comparing the areas of a plurality of valid objects and designating one of the valid objects as a large valid object and the other of the first and second valid objects as a small valid object and determining whether the small valid object is contained in the large valid object as defined by the four extremum points of the large object for homogeneous objects. As shown in decision diamond A of FIG. 32, the first step of SET STAT is to ask whether the head object is larger than the tail object. If so, the head object is defined as a large valid object, and the tail object is defined as the small valid object as shown in block B. If the head object is not larger than the tail object, then the head object is defined as the small valid object, and the tail object is defined as the large valid object. Decision diamond D of SET STAT then asks whether the small object is contained within the large object. If not, SET STAT stops running as shown by oval E. If the small object is contained within the large object, then decision diamond F asks whether the edge contrast of the large object is greater than the edge contrast of the small object, and whether the edge contrast of the large object is greater than the predetermined minimum edge contrast. If the answer to both of these questions is yes, then the large object status attribute value is set to true, and the small object status attribute value is set to false as indicated by block G, and the module stops running as indicated by oval H. If the answer to at least one of the questions in decision diamond F is no, then the small object status attribute value is set to true, the large object status attribute value is set to false as indicated by block I, and the module stops running as indicated by oval J.

The method of the entropic thresholding application of the first and second embodiments further includes the step of performing a final check for redundancies of the valid object and resolving the redundancies to prevent multiple identification of the valid object. The final redundancy checking step further includes the sub-steps of comparing the areas of a plurality of valid objects and designating one of the valid objects as a large valid object and the other of the first and second valid objects as a small valid object and removing the large valid object when the small valid object and the large valid object overlap. The final redundancy checking step is performed by a module, FINAL CHK, as illustrated by the flow chart of FIGS. 33A and 33B and a module INT STAT, as illustrated by the flow chart of FIG. 34. The modules FINAL CHK and INT STAT are the same for both homogeneous and inhomogeneous objects, and are thus only illustrated once.

Figure 33A:
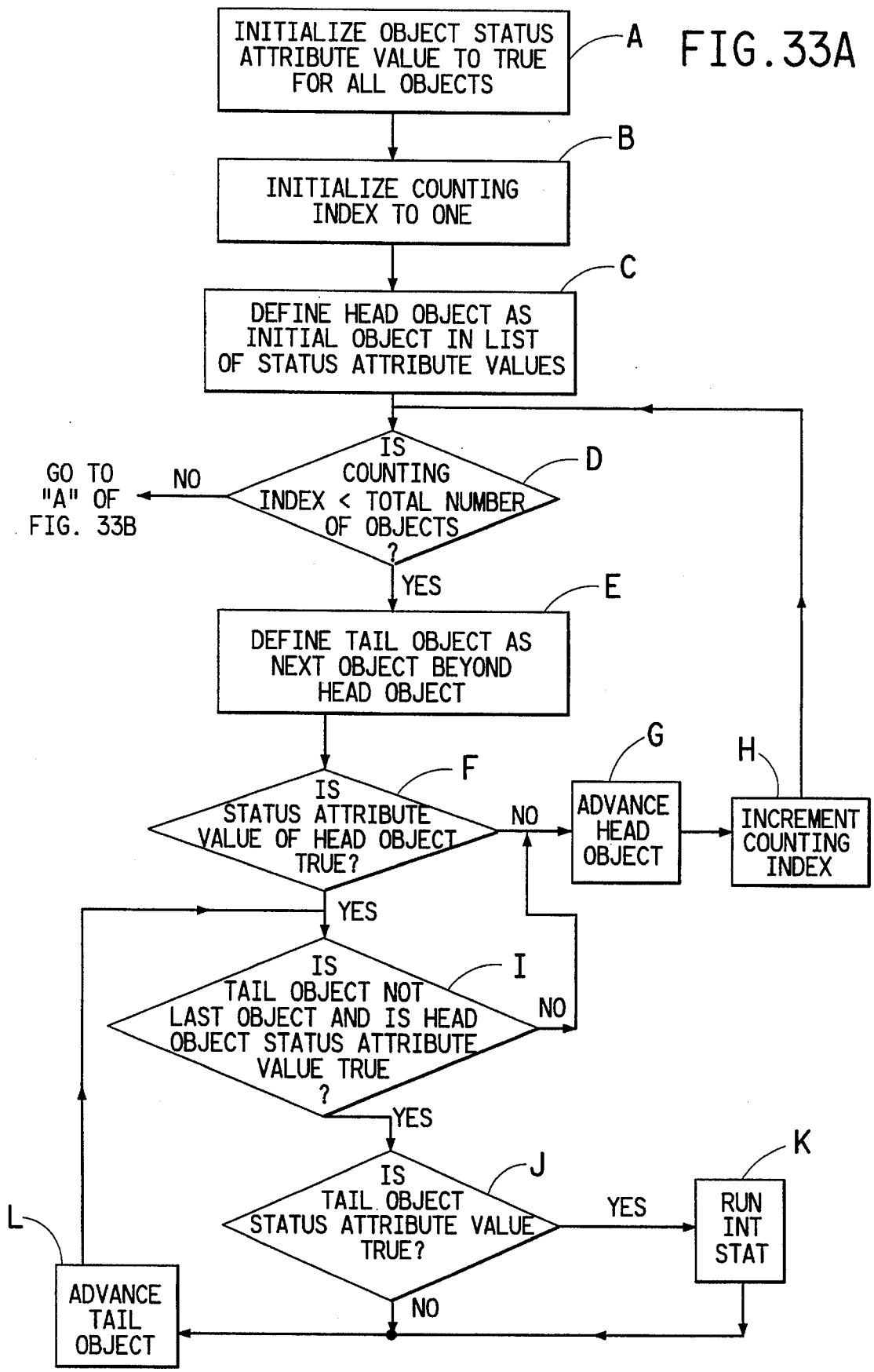
FIGS. 33A–33B are a flow chart showing the steps of a module, FINAL CHK, which is used to perform a final check to resolve redundancies in inhomogeneous and homogeneous objects.

The first step of FINAL CHK is to initialize the object attribute value to true for all objects as shown in block A of FIG. 33A. The counting index for counting valid objects is the initialized to one as shown in block B. The head object is defined as the initial object in a list of status attribute values as illustrated in block C. Decision diamond D then asks whether the counting index is less than the total number of objects. If not, the module FINAL CHK goes to block A of FIG. 33B.

Figure 33B:
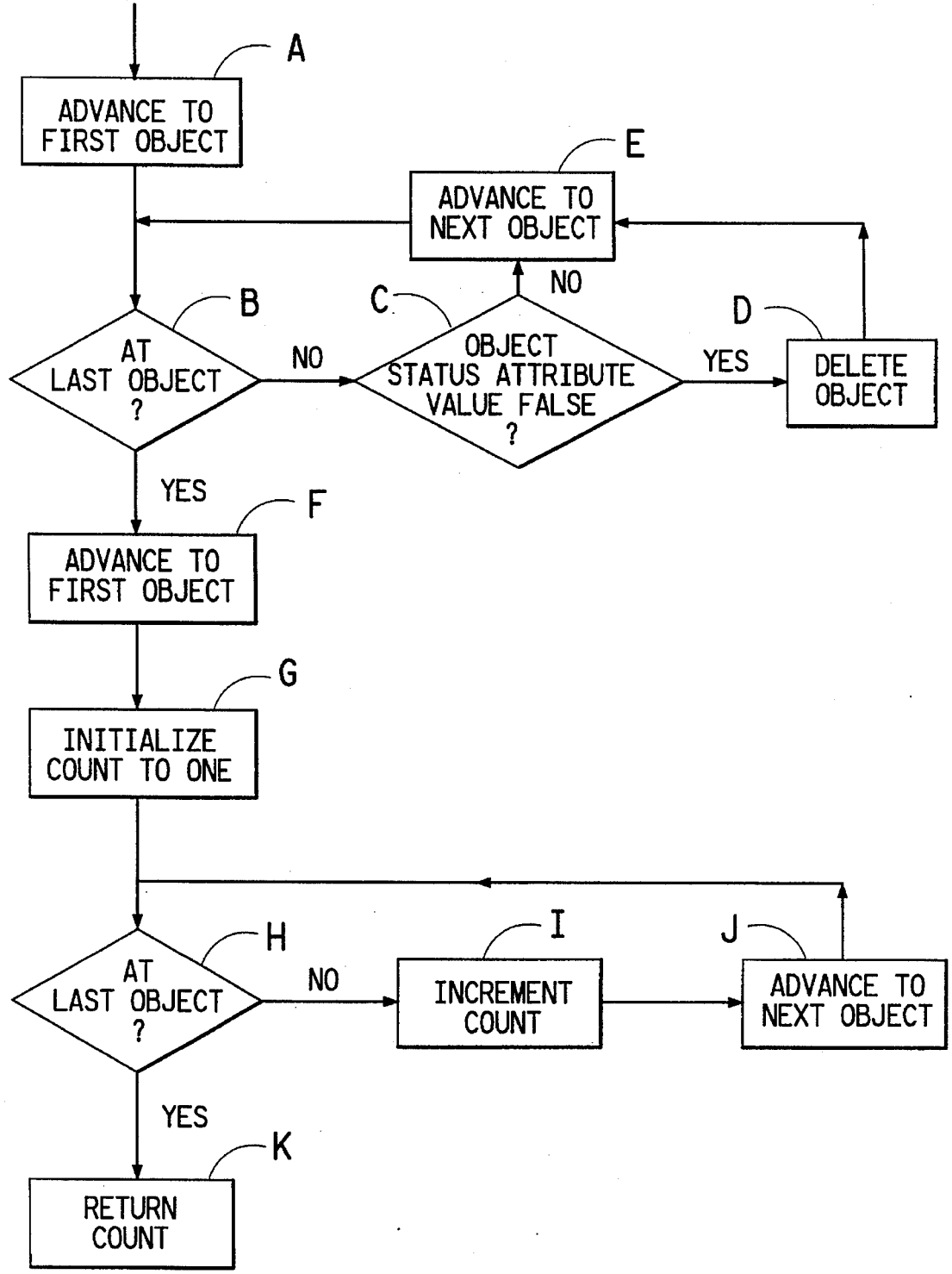

As shown in block A of FIG. 33B, FINAL CHK advances to the first object. Decision diamond B asks whether FINAL CHK is at the last object. If it is not, then decision diamond C asks whether the object status attribute value is false. If not, then FINAL CHK advances to the next object as shown in block E, and decision diamond B again asks whether FINAL CHK is at the last object. The loop through B, C and E continues until FINAL CHK is at the next object. If the object status attribute value is false, then the object is deleted as shown in block D. FINAL CHK then advances to the next object as shown in block E, and decision diamond B asks whether the FINAL CHK at the last object. The loop through B - E continues until the next object is the last object, at which point FINAL CHK advances to the first object as shown in block F. The count is then initialized to one as shown in block G. Decision diamond H then asks whether FINAL CHK is at the last object. If it is not, then the count is incremented as shown in block I, and FINAL CHK advances to the next object is shown in block J. Decision diamond H again asks whether FINAL CHK is the last object, and the loop through H, I and J continues until FINAL CHK is at the last object. Then the total number of valid objects as contained in count is returned as shown by block K of FIG. 33B.

Returning to decision diamond D of FIG. 33A, if the counting index is less than the total number of objects, then the tail object is defined as the next object beyond the head object as shown in block E. Decision diamond F then asks if the status attribute value of the head object is true. If not, the FINAL CHK advances the head object as shown in block G and increments the counting index as shown in block H. FINAL CHK then returns to decision diamond D, and the loop through D–I continues until the status attribute value of the head object is true. Then decision diamond I asks whether the tail object is not the last object and whether the head object status attribute value is true. If at least one of these conditions is not met, then FINAL CHK advances the head object as shown in block G and increments the index as shown in block H. FINAL CHK then returns to decision diamond D, and the loop through D–I continues until the answer to both questions in decision diamond I is yes. Then decision diamond J asks whether the tail object status attribute value is true. If not, FINAL CHK advances the tail object as shown in block L of FIG. 33A, and the loop through I, J and L is repeated until the tail object status attribute value is true. Then FINAL CHK runs a module INT STAT, as shown in block K of FIG. 33A and advances the tail object as shown in block L.

Figure 34:
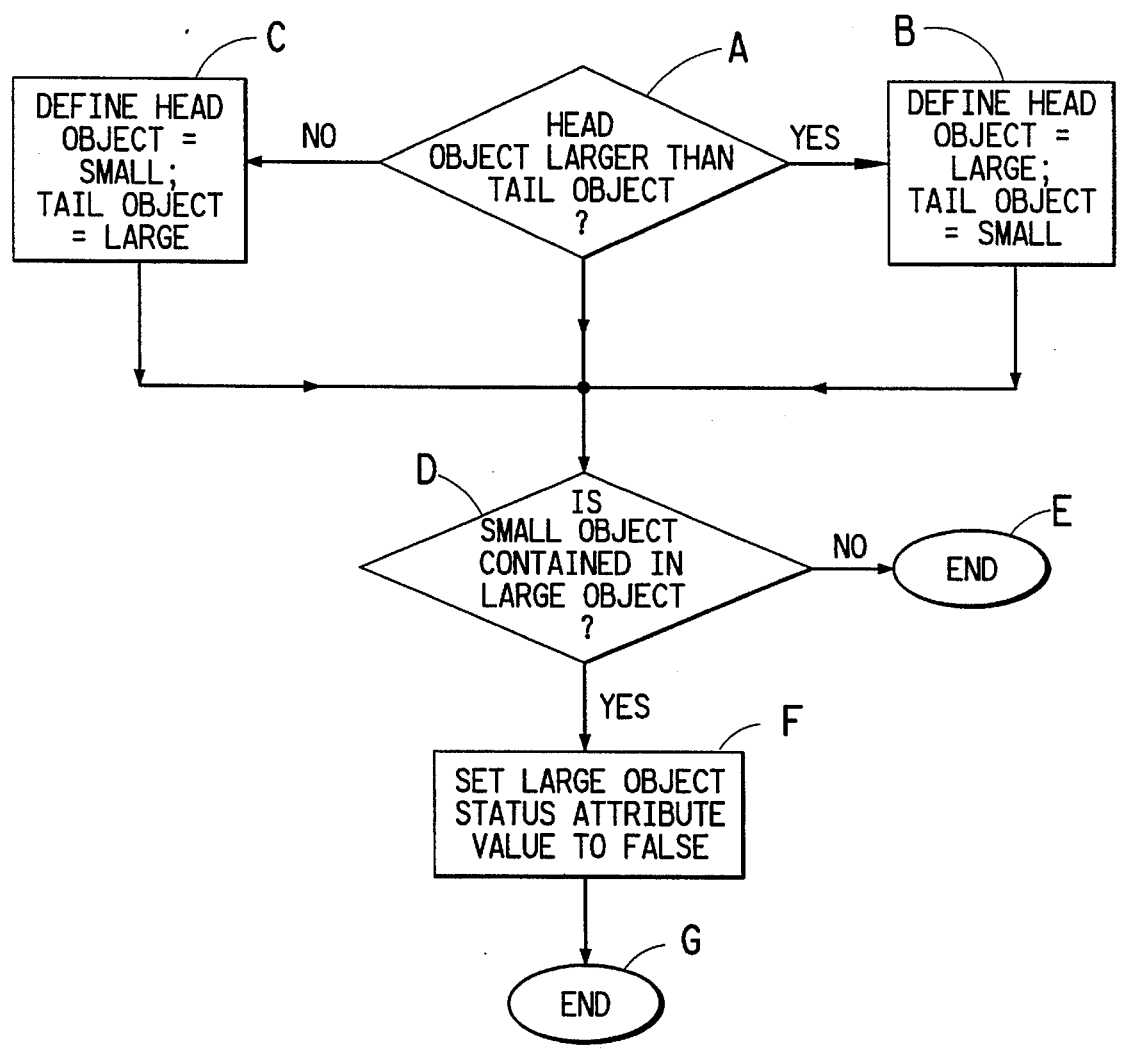
FIG. 34 is a flow chart showing the steps of a module, INT STAT, which is used with the module FINAL CHK as shown in FIGS. 33A–33B.

The steps of the module INT STAT as illustrated in block K of FIG. 33A are shown in detail in FIG. 34. Decision diamond A of FIG. 34 asks whether the head object is larger than the tail object. If so, the head object is defined as the large valid object, and the tail object is defined as the small valid object as shown in block B. If the head object is not larger than the tail object, then the head object is defined as the small valid object, and the tail object is defined as the large valid object as shown in block C. Decision diamond D then asks whether the small valid object is contained in the large valid object. If not, then INT STAT is at its end, as shown by oval E. If the small valid object is contained in the large valid object, then the large object status attribute value is set to false as shown in block F, and INT STAT is at its end as shown by oval G.

Figure 35:
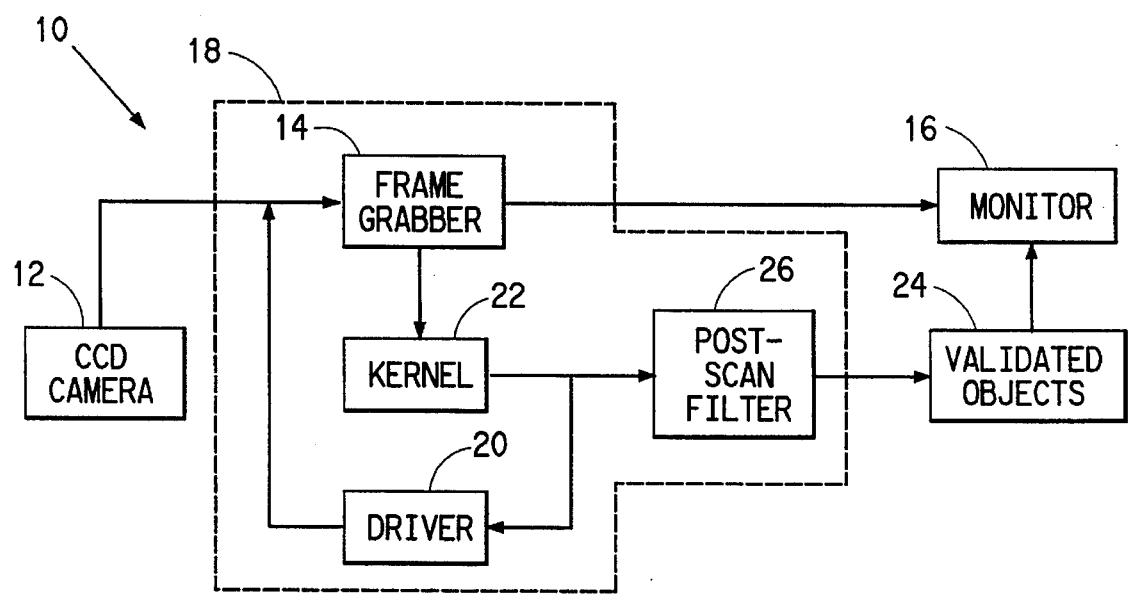
FIG. 35 is a schematic diagram showing the components of a system used with the first and second embodiments of the present invention when identification of a valid object is performed.

In accordance with the first and second embodiments of the present invention, there is provided an image analysis system for identifying at least one valid object in a background. The valid object has at least one predetermined attribute value which represents the definition of a valid object of an object to be identified. A block diagram of the system of the present invention is shown in FIG. 35. A system for identifying at least one valid object in a background is shown generally at 10 in FIG. 35.

The system of the present invention comprises means for generating an image of the object and the background. As shown in FIG. 35, the means for generating an image of the object and the background comprises a camera 12. Although a CCD camera is generally used with the present invention, any type of camera may be used without departing from the general principles of the present invention.

The system of the present invention also comprises means for digitizing and storing the image. The means for digitizing and storing the image comprises a frame grabber 14 as shown in FIG. 35. The frame grabber digitizes and stores the video image in one frame, as known to one skilled in the image processing art. Alternatively, the means for digitizing and storing the image comprises a video digitizer, which also digitizes and stores the image, although not necessarily in one frame. The system of the present invention further comprises means for displaying the image. The means for displaying the image comprises a monitor 16 as shown in FIG. 35.

The system of the present invention also comprises computer means. The computer means comprises a computer system 18 as shown in FIG. 35. The computer system comprises a central processing unit (CPU) and a memory. The computer means also includes a driver 20, a kernel 22 and a post-scan filter 26 as shown in FIG. 35. Driver 20 stores the definition of the valid object. The entropic kernel 22 generates a gray level histogram of the image and entropically selects a threshold gray level such that the entropy function of the histogram is maximized. Entropic kernel 22 also searches the image for at least one candidate object and validates the candidate object having the valid object predetermined attribute value to identify the valid object. The validated objects are represented by box 24 in FIG. 35. The driver and the kernel may comprise software incorporated in the memory. Alternatively, the driver and the kernel may be programmed into a programmable, read-only memory (PROM) from which the software may be retrieved. The post-scan filter is shown at 26 in FIG. 35 and provides a final check to remove redundancies in overlapping objects as described above.

It will be apparent to those skilled in the art that various modifications and variations can be made in the methods of the present invention without departing from the scope or spirit of the invention. For example, any type of entropic thresholding may be employed, such as entropic thresholding of a co-occurrence matrix as disclosed by Pal and Pal, supra.

The invention will be clarified by the following Example, which is intended to be purely exemplary of the invention.

EXAMPLE

In this Example, a colony counting system is described. Colony counting is a task routinely performed in microbiology laboratories for quantifying the amount of bacteria in a sample. The sample can be one of a number of different types such as blood, food, cosmetics, soil, etc. This system identified colonies in varying backgrounds and was also able to unclump highly clumped colonies.

In order to perform accurate colony counting, it is important to classify colonies versus artifacts. In this Example, colonies of *Staphylococcus aureus* were distinguished from artifacts, such as dirt particles or streaks which are present on a plate. Bacterial colonies will generally alter the hue of the local exterior region of the surrounding agar on which they are grown. Artifacts, which are inorganic materials such as dirt or dust, will tend to preserve the hue of the surrounding agar. One of the attributes used in identifying *Staphylococcus aureus* colonies is the hue of the exterior of the colony, as represented by the hue of the surrounding agar. Furthermore, the local rate of change in hue of the surrounding agar can be used as an indicator of bacterial presence. Therefore, for this Example, the hues of the agar at locations which were five pixels from the perimeter points of the identified object were averaged. Similarly, the hues of points which were three pixels and then one pixel from the perimeter points were averaged.

By using the method of the first embodiment as described above, this Example was able to classify the *Staphylococcus aureus* colonies by interior and exterior hues and thus distinguish them from artifacts of non-organic material on the plate. In this Example, the agar plate was BHI (Brain Heart Infusion) agar having a characteristic yellow color, hue of agar greater than 2.5. As shown in Table 3, the *Staphylococcus aureus* colonies were a yellow-green color, hue of approximately 2.10, and their local exterior region a paler shade of yellow-green in the range of 2.16–2.3. The artifacts had a hue of greater than 2.4 for their interiors and hues of greater than 2.4 for their local exteriors. The interior hue of an object was determined by 1) determining the hue of its center of mass; and 2) obtaining a mean average of the hues for all of its interior points. The hue of the local exterior of an object was obtained by averaging the hues of pixels located five, three and then one pixel from the perimeter points of the object as discussed above.

The apparatus used in this Example to count colonies comprised a Petri dish holder to hold the plate, an optical system for illuminating the plate and an image acquisition system to generate an image of the sample on the plate as described above with respect to FIG. 35. A video signal from a camera was fed into a frame grabber, which occupied a slot in a PC. The frame grabber digitized the image.

The Petri dish holder comprised a movable, machined member which can accept standard Petri dishes. The member had a countersunk circular indent capable of accepting the dishes and was slid into place via a bearing-based support. Below the holder, there was room to insert an appropriate background sheet to enhance image contrast.

The illumination source used comprised a Philips FC 8T9/CW circular fluorescent lamp (8" diameter) (20.32 cm.) which surrounded the Petri dish. The lamp was mounted approximately 1" (2.54 cm.) above the dish and illuminated the dish uniformly from all sides. The distance between the lamp and the dish was important. If the lamp was too high, the resulting image would have revealed significant "glaring" and "haloing" from the curved surfaces of the colonies. The colonies can be considered small 3D lenses, and oblique, grazing angle illumination was necessary so that light scattering from the lens-like surfaces did not enter the camera. The lamp was actively stabilized using a Mercron FL0416-2 controller which kept the light level constant, to prevent fluctuations in output. In addition, the controller was remotely programmable to adjust the brightness of the lamp. This feature was especially useful for colony plates, where the inherent contrast is variable. For low contrast plates, the light level can be increased to improve the contrast.

The optical system comprised a Sony XC-77 monochrome CCD video camera with a 16 mm. F2.8 Nikkon lens.

The camera was centered above the Petri dish at a distance of approximately 1.5 feet (0.05 m.). The distance from the camera to the dish was such that the disk just filled the surface of the CCD sensor in order to maximize spatial resolution.

A filter wheel was placed between the lens and the camera sensor. The filter wheel had four positions. The filter combination in each position are described below:

TABLE 1

| Position | Filter COMBINATION |
|---|---|
| 1 (BW) | 1.2 ND filter (ND = neutral density) |
| 2 (RED) | Kodak filter #25 (catalog #149 5605) + 0.5 ND filter |
| 3 (GREEN) | Kodak filter #58 (cat# 149 5860) + 0.3 ND filter |
| 4 (BLUE) | Kodak filter #58 (cat# 149 5860) + 0.3 ND filter |

A black light shield made from crystalline homopolymer of formaldehyde, sold under the trademark "DELRIN" by E. I. Du Pont de Nemours and Company of Wilmington, Del., extended from the camera to the plate to prevent stray light from entering the camera. The video signal from the camera went directly to the frame grabber on the PC.

The image acquisition system comprised a Data Translation DT2851 frame grabber board which occupied an expansion slot on the PC. A Dell 33 MHZ 386AT system was used to store images and execute the method of the present invention. The frame grabber board had a 512×512 pixel video buffer in which the digitized image was stored. In order to minimize "shot"0 noise from the camera, several image frames were averaged, and the resulting averaged image was stored and used for further analysis. The output of the frame grabber was connected to a Sony TRINITRON monitor to display the image.

The following (1)–(4) were computer specifications: (1) Driver:

The attributes and their ranges for valid colonies are shown in Table 2 below.

TABLE 2

| Range of Attribute values for screening | | |
|---|---|---|
| Attribute | | Valid Range |
| (1) | xcm = x coordinate of object center of mass | DESCRIPTOR |
| (2) | ycm = y coordinate of object center of mass | DESCRIPTOR |
| (3) | perim = total length of perimeter of object | DESCRIPTOR |
| (4) | npts = number of perimeter points in object | npts > 3 |
| (5) | obj_type = type of object (Exterior or Interior) Exterior = object never contained within another object Interior = object previously contained within another object | DESCRIPTOR |
| (6) | area = area of object | area > 0.0 |
| (7) | shape = shape factor of object | shape > –1.2 |
| (8) | status = status value of object which is used in artifact removal and redundancy checking in several different ways | DESCRIPTOR |
| (9) | edge = data structure containing coordinates of extremum points of object | DESCRIPTOR |
| (10) | thresh = threshold at which object was detected | DESCRIPTOR |
| (11) | max = maximum gray level value of histogram partition in which object was detected | DESCRIPTOR |
| (12) | clump_shape = maximum shape factor for a clump of candidate objects | UNUSED |
| (13) | clump_size = minimum area for a clump of candidate objects | UNUSED |
| (14) | worst_shape = minimum shape factor for a clump of candidate objects | UNUSED |
| (15) | hue_cm = hue vector of center of mass of object | DESCRIPTOR |

Note: Only some of the attribute values required valid ranges. Others were "descriptors" which did not influence object validity.

(2) Artifact Removal:

The following rules were used to eliminate artifacts in the agar:

o If the mean hue of a candidate colony was less than 1.90 and the hue magnitude was greater than 200, the candidate colony was deleted.

o If the mean hue of a candidate colony was less than 1.90 and the hue magnitude was greater than 200, the candidate colony was deleted.

o If the means hue of a candidate colony was greater than 3.40 and the hue magnitude was greater than 200, the candidate colony was deleted.

(3) Redundancy check:

The redundancy check for inhomogeneous objects described above with respect to FIGS. 29A–29D and 30 was used for redundancy checking in this Example.

(4) Colony Classification:

The interior and exterior hues were used as part of a multi-linear regression procedure in order to train the computer to distinguish between colonies and artifacts.

Table III shows the interior and exterior hue values for representative colonies as well as artifacts.

TABLE III

| | Summary of Results | | | | |
|---|---|---|---|---|---|
| | Interior hue center | Interior hue mean | Exterior 1 pixel mean | Exterior 3 pixels mean | Exterior 5 pixels mean |
| Colony 1 | 2.02 | 2.08 | 2.16 | 2.28 | 2.68 |
| Colony 2 | 2.11 | 2.09 | 2.15 | 2.16 | 2.16 |
| Artifact 1 | 2.73 | 2.46 | 2.51 | 2.42 | 2.51 |
| Artifact 2 | 2.46 | 2.46 | 2.42 | 2.66 | 2.45 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for determining the exterior points of an object in a background, comprising the steps of:

(a) generating an image of the object and the background;

(b) searching the image for the object;

(c) determining the perimeter points of the object, each perimeter point having a row-position coordinate value and a column-position coordinate value;

(d) creating a perimeter buffer, the perimeter buffer comprising the perimeter points;

(e) sorting the perimeter points in the perimeter buffer first by row and then by column to create a row-column sorted perimeter buffer; and (f) designating as the exterior points of the object all the points on each row which are a first predetermined number of pixels before the perimeter point having the lowest column-position coordinate value and a second predetermined number of pixels beyond the perimeter point having the highest column-position coordinate value for each respective row.

2. A method for determining the exterior points of an object in a background, comprising the steps of:

(a) generating an image of the object and the background;

(b) searching the image for the object;

(c) determining the perimeter points of the object, each perimeter point having a row-position coordinate value and a column-position coordinate value;

(d) creating a perimeter buffer, the perimeter buffer comprising the perimeter points;

(e) sorting the perimeter points in the perimeter buffer first by column and then by row to create a column-row sorted perimeter buffer; and (f) designating as the exterior points of the object all the points on each column which are a first predetermined number of pixels before the perimeter point having the lowest row-position coordinate value and a second predetermined number of pixels beyond the perimeter point having the highest row-position coordinate value for each respective column.

3. The method of claim 1, further comprising the steps of:

(g) sorting the perimeter points in the perimeter buffer by column and then by row to create a column-row sorted perimeter buffer; and (h) designating as the exterior points of the object all the points in each column which are a predetermined number of pixels before the perimeter point having the lowest row position coordinate value and a predetermined number of pixels beyond the perimeter point having the highest row-position coordinate value for each respective column.

4. The method of claim 2, further comprising the steps of:

(g) sorting the perimeter points in the perimeter buffer by row and then by column to create a row-column sorted perimeter buffer; and (h) designating as the exterior points of the object all the points in each row which are a predetermined number of pixels before the perimeter point having the lowest column-position coordinate value and a predetermined number of pixels beyond the perimeter point having the highest column-position coordinate value for each respective row.

5. A method for determining the exterior point of an object in a background, comprising the steps of:

(a) generating an image of the object and the background;

(b) searching the image for the object;

(c) determining the perimeter points of the object;

(d) determining the interior points of the object;

(e) labeling the interior points of the object with a predetermined gray level value; and (f) defining an exterior contour region for each object by:

(i) creating a perimeter buffer for the object, the perimeter buffer comprising the perimeter points, each perimeter point having a row-position coordinate value and a column-position coordinate value, (ii) sorting the perimeter points in the perimeter buffer first by row and then by column to create a row-column sorted perimeter buffer for the object, and (iii) designating as the exterior points of the object all the points in each row which are a predetermined number of pixels from the perimeter point having the lowest column-position coordinate value and the highest column-position coordinate value for each respective row, wherein each designated exterior points has a value other than the predetermined gray level value.

6. A method for determining the exterior points of an object in a background, comprising the steps of:

(a) generating an image of the object and the background;

(b) searching the image for the object;

(c) determining the perimeter points of the object;

(d) determining the interior points of the object;

(e) labeling the interior points of the object with a predetermined gray level valve; and (f) defining an exterior contour region for the object by:

(i) determining the perimeter points of the contour region, (ii) creating a contour region perimeter buffer, the contour perimeter buffer comprising the contour region perimeter points, each contour region perimeter point having a row-position coordinate value, a column-position coordinate value and a direction code vector, the direction code vector comprising a first and a second direction code value for each contour region perimeter point, the first direction code value describing the relationship of each respective contour region perimeter point to the next contour region perimeter point and the second direction code value describing the relationship of each respective contour region perimeter point to the previous contour region perimeter point, (iii) sorting the contour region perimeter points in the contour region perimeter buffer in a predetermined order to create a sorted contour region perimeter buffer, (iv) assigning to each contour region perimeter point in the sorted contour region perimeter buffer a status variable having one of a first and a second value, the value of the first status variable being determined by the first and second direction code values, and (v) designating as the exterior points of the object each point on the same line segment as the contour region perimeter point being examined and lying between the examined contour point and the next contour perimeter point in the sorted contour region perimeter buffer, the examined contour region perimeter point being assigned the first value of the status variable, where each designated exterior point has a value other than the predetermined gray level value.

7. The method of claim 6, wherein the step of defining a contour region includes the sub-steps of:

(i) assigning a first predetermined shape to the object, (ii) assigning a second predetermined shape to an area including the exterior contour region and the object, (iii) calculating a first size parameter for the object, and (iv) calculating a second size parameter for the second predetermined shape, wherein the second size parameter is larger than the first size parameter and the second size parameter encompasses the object.

8. The method of claim 7, wherein the first predetermined shape is a circle and the first size parameter is a first equivalent radius.

9. The method of claim 7, wherein the second predetermined shape is a circle and the second size parameter is a second equivalent radius.

10. The method of claim 7, wherein the sub-step of calculating a first size parameter includes the further sub-steps of:

(A) determining the four extremum points of the object, (B) calculating the maximum distance between the extremum points of the object, and (C) setting the first size parameter to a diameter which is equal to the maximum distance between the extremum points of the object.

11. The method of claim 6, further including the steps of:

(l) determining the gray level value of each exterior point, and (m) characterizing the object by using the gray level values of the exterior points.

12. The method of claim 11, wherein the characterizing step comprises determining the color of the exterior points of the object.

13. A method of identifying at least one valid object having at least one valid object predetermined attribute value in a background, comprising the steps of:

(a) generating an image of the object and the background;

(b) searching the image for at least one candidate object, wherein the candidate object has at least one candidate object attribute value;

(c) determining the perimeter points of the candidate object, each perimeter point having a row-position coordinate value and a column-position coordinate value;

(d) creating a perimeter buffer, the perimeter buffer comprising the perimeter points;

(e) sorting the perimeter points in the perimeter buffer first by row and then by column to create a row-column sorted perimeter buffer;

(f) designating as the exterior points of the object all the points on each row which are a predetermined number of pixels before the perimeter point having the lowest column-position coordinate value and a predetermined number of pixels beyond the perimeter point having the highest column-position coordinate value for each respective row;

(g) characterizing the candidate object by the candidate object attribute value; and (h) validating the candidate object having the valid object predetermined attribute value to identify the valid object.

14. The method of claim 13, wherein the searching step comprises searching the image using at least one automatically calculated threshold.

15. The method of claim 13, wherein the characterizing step includes the sub-steps of:

(i) determining the gray level value of each exterior point, and (ii) characterizing the object by using the gray level values of the exterior points.

16. The method of claim 13, further including the step of determining the interior points of the object.

17. The method of claim 16, wherein the characterizing step includes the sub-steps of:

(i) determining the gray level value of each exterior point and the gray level value of each interior point, and (ii) characterizing the object by the relative normalized difference between the gray level values of the exterior and the interior points.

18. A method of identifying at least one valid object having at least one valid object predetermined attribute value in a background, comprising the steps of:

(a) generating an image of the object and the background;

(b) searching the image for at least one candidate object using at least one automatically calculated threshold, wherein the candidate object has at least one candidate object attribute value;

(c) determining the perimeter points of the candidate object;

(d) determining the interior points of the candidate object;

(e) labeling the interior points of the candidate object with a predetermined gray level value;

(f) defining an exterior contour region of the candidate object by:

(i) determining the perimeter points of the contour region;

(ii) creating a contour region perimeter buffer, the contour region perimeter buffer comprising the perimeter points of the contour region, each contour region perimeter point having a row-position coordinate value, a column-position coordinate value and a direction code vector, the direction code vector comprising a first and a second direction code value for each contour perimeter point, the first direction code value describing the relationship of each respective contour region perimeter point to the next contour region perimeter point and the second direction code value describing the relationship of each respective contour region perimeter point to the previous contour region perimeter point;

(iii) sorting the perimeter points in the contour region perimeter buffer in a predetermined order to create a sorted contour region perimeter buffer;

(iv) assigning to each contour region perimeter point in the sorted contour region perimeter buffer a status variable having one of a first and a second value, the value of the first status variable being determined by the first and second direction code values;

(v) designating as the exterior points of the candidate object each point on the same line segment as the contour region perimeter point being examined and lying between the examined contour region perimeter point and the next perimeter point in the sorted contour region perimeter buffer, the examined contour region perimeter point being assigned the first value of the status variable, wherein the designated points have a value other than the predetermined gray level value;

(l) characterizing the candidate object by the candidate object attribute value; and (m) validating the candidate object having the valid object predetermined attribute value to identify the valid object.

19. The method of claim 18, wherein the characterizing step includes the sub-step of:

(i) determining the gray level value of each exterior point, and (ii) characterizing the object by using the gray level values of the exterior points.

20. The method of claim 18, wherein the characterizing step includes the sub-steps of:

(i) determining the gray level value of each exterior point and the gray level value of each interior point, and (ii) characterizing the object by the relative difference between the gray level values of the exterior and the interior points.

21. The method of one of claims 1, 5, 6, 15, 17, 18, 19 or 20, wherein the step of searching the image includes the sub-steps of:

(i) generating a gray level histogram of the image, the gray level histogram having an entropy function, (ii) entropically selecting a threshold gray level value such that the entropy function of the histogram is maximized, (iii) scanning the image for at least one object using the entropically selected threshodl gray level value, and (iv) tracing the candidate object having boundary gray level values determined by the entropically selected threshold gray level value.

22. The method of one of claims 5, 6 or 18, wherein the step of determining the interior points of the object comprises the sub-steps of:

(i) creating a perimeter buffer, the perimeter buffer comprising the perimeter points of the object, each perimeter point having a row-position coordinate value, a column-position coordinate value and a direction code vector, the direction code vector comprising a first and a second direction code value for each perimeter point, the first direction code value describing the relationship of each respective perimeter point to the next perimeter point and the second direction code value describing the relationship of each respective perimeter point to the previous perimeter point, (ii) sorting the perimeter points in the perimeter buffer in a predetermined order to create a sorted perimeter buffer, (iii) assigning to each perimeter point in the sorted buffer a status variable having one of a first and a second value, the value of the status variable being determined by the first and second direction code values, and (iv) designating as the interior points of the object each point on the same line segment as the perimeter point being examined and lying between the examined perimeter point and the next perimeter point in the sorted perimeter buffer, the examined perimeter point being assigned the first value of the status variable.

* * * * *